(12) United States Patent
Takehara et al.

(10) Patent No.: US 12,009,482 B2
(45) Date of Patent: Jun. 11, 2024

(54) NONAQUEOUS ELECTROLYTIC SOLUTION AND ELECTRICAL STORAGE DEVICE INCLUDING THE SAME

(71) Applicants: Mitsubishi Chemical Corporation, Tokyo (JP); MU IONIC SOLUTIONS CORPORATION, Tokyo (JP)

(72) Inventors: Masahiro Takehara, Tokyo (JP); Daisuke Kawakami, Tokyo (JP)

(73) Assignees: Mitsubishi Chemical Corporation, Tokyo (JP); MU IONIC SOLUTIONS CORPORATION, Tokyo (JP)

(*) Notice: Subject to any disclaimer, the term of this patent is extended or adjusted under 35 U.S.C. 154(b) by 952 days.

(21) Appl. No.: 17/001,922

(22) Filed: Aug. 25, 2020

(65) Prior Publication Data

US 2020/0388887 A1 Dec. 10, 2020

Related U.S. Application Data

(63) Continuation of application No. PCT/JP2019/013280, filed on Mar. 27, 2019.

(30) Foreign Application Priority Data

Mar. 27, 2018 (JP) .................. 2018-060482

(51) Int. Cl.
H01M 10/0569 (2010.01)
H01M 10/0525 (2010.01)
H01M 10/0567 (2010.01)

(52) U.S. Cl.
CPC ... H01M 10/0569 (2013.01); H01M 10/0525 (2013.01); H01M 2300/0022 (2013.01); H01M 2300/0028 (2013.01); H01M 2300/0051 (2013.01)

(58) Field of Classification Search
CPC .......... H01M 10/0566–0569; H01M 10/0525; H01M 2300/002–0042
See application file for complete search history.

(56) References Cited

U.S. PATENT DOCUMENTS

| | | | |
|---|---|---|---|
| 8,574,757 B2 | 11/2013 | Kotato et al. | |
| 8,685,562 B2 | 4/2014 | Kotato et al. | |
| 8,962,192 B2 | 2/2015 | Kotato et al. | |
| 2004/0076886 A1* | 4/2004 | Mori ...................... | H01G 9/028 429/317 |
| 2005/0014071 A1 | 1/2005 | Noda et al. | |
| 2007/0087270 A1 | 4/2007 | Noda et al. | |
| 2010/0035147 A1 | 2/2010 | Kotato et al. | |
| 2012/0129968 A1 | 5/2012 | Bishop | |
| 2012/0156557 A1 | 6/2012 | Kotato et al. | |
| 2012/0264011 A1 | 10/2012 | Kotato et al. | |
| 2013/0034759 A1 | 2/2013 | Funada et al. | |
| 2016/0039851 A1 | 2/2016 | Müller et al. | |
| 2017/0054178 A1 | 2/2017 | Sakaguchi et al. | |
| 2017/0275311 A1 | 9/2017 | Kotou et al. | |
| 2018/0237461 A1 | 8/2018 | Sakaguchi et al. | |
| 2018/0301756 A1 | 10/2018 | Sakaguchi et al. | |

FOREIGN PATENT DOCUMENTS

| | | |
|---|---|---|
| CN | 107799841 A | 3/2018 |
| EP | 2 128 923 A1 | 12/2009 |
| JP | 5704277 B1 | 4/2015 |
| JP | 2015-167129 A | 9/2015 |
| JP | 2017-004947 A | 1/2017 |
| JP | 2017-036273 A | 2/2017 |
| KR | 10-2017-0112122 A | 10/2017 |
| WO | WO 2008/123038 A1 | 10/2008 |
| WO | WO 2012/012067 A1 | 1/2012 |
| WO | WO 2014/095724 A1 | 6/2014 |
| WO | WO 2015/016186 A1 | 2/2015 |
| WO | WO 2015/016187 A1 | 2/2015 |

OTHER PUBLICATIONS

Extended European Search Report dated Jun. 2, 2021 in European Patent Application No. 19776765.0, 10 pages.
Japanese Office Action dated Nov. 8, 2022 in Japanese Patent Application No. 2020-509219 (with unedited computer generated English Translation), 5 pages.
International Search Report dated Jul. 2, 2019 in PCT/JP2019/013280 filed on Mar. 27, 2019, 2 pages.

* cited by examiner

*Primary Examiner* — James Lee
(74) *Attorney, Agent, or Firm* — Oblon, McClelland, Maier & Neustadt, L.L.P.

(57) ABSTRACT

A nonaqueous electrolytic solution including an electrolyte, a nonaqueous solvent, and a compound represented by Formula (1) below.

(1)

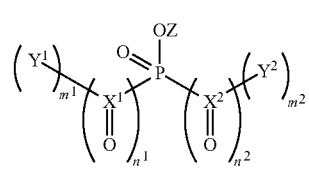

(in Formula (1), $X^1$ and $X^2$ each independently represent C, S, or P; $n^1$ and $n^2$ each independently represent 1 when $X^1$ and $X^2$ represent C or P and 2 when $X^1$ and $X^2$ represent S; $n^1$ represents 1 or 2; $n^2$ represents 1 or 2; $Y^1$ and $Y^2$ each independently represent a hydrocarbon group that may have a substituent or an —OW group (where W represents a hydrocarbon group that may have a substituent); $m^1$ represents 1 or 2, and $m^2$ represents 1 or 2; and Z represents a hydrocarbon group that may have a substituent, an —$SiV_3$ group (where V represents a hydrocarbon group that may have a substituent), an organic onium, or a metal).

11 Claims, No Drawings

NONAQUEOUS ELECTROLYTIC SOLUTION AND ELECTRICAL STORAGE DEVICE INCLUDING THE SAME

TECHNICAL FIELD

The present invention relates to a nonaqueous electrolytic solution and an electrical storage device that includes the nonaqueous electrolytic solution.

BACKGROUND ART

With a rapid advance of mobile electronic devices, such as cellular mobile phones and notebook-sized personal computers, there has been an increasing demand for an increase in the capacities of the batteries used as a main power source or a backup power source for the mobile electronic devices. Thus, particular attention is given to electrical storage devices such as lithium-ion secondary batteries, which have higher energy densities than nickel-cadmium batteries or nickel-hydrogen batteries.

Typical examples of the electrolytic solution included in lithium-ion secondary batteries include a nonaqueous electrolytic solution produced by dissolving an electrolyte, such as $LiPF_6$, $LiBF_4$, $LiN(CF_3SO_2)_2$, or $LiCF_3(CF_2)_3SO_3$, in a mixed solvent of a solvent having a high dielectric constant, such as ethylene carbonate or propylene carbonate, and a solvent having a low viscosity, such as dimethyl carbonate, diethyl carbonate, or ethyl methyl carbonate. Carbonaceous materials capable of occluding and releasing lithium ions are commonly used as a negative electrode active material for lithium-ion secondary batteries. Typical examples of the carbonaceous materials include natural graphite, artificial graphite, and amorphous carbon. Metal and alloy negative electrodes that include silicon, tin, and the like in order to increase capacity are also known. Transition metal composite oxides capable of occluding and releasing lithium ions are commonly used as a positive electrode active material. Typical examples of the transition metals include cobalt, nickel, manganese, and iron.

It is known that, since a lithium-ion secondary battery includes positive and negative electrodes having a high reactivity, the side reactions between the electrodes and the electrolytic solution may reduce the charging-discharging capacity of the battery. Accordingly, there have been a variety of studies of nonaqueous organic solvents and electrolytes in order to improve the battery characteristics.

Against the backdrop of global issues, such as environment and energy, there have also been great expectations for the application of secondary batteries and, in particular, lithium secondary batteries to large power sources, such as on-vehicle power sources and stationary power sources. Since these batteries are intended to be used commonly in outdoor environments, they are required to work over a wide temperature range. In addition, with a significant increase in the application of lithium secondary batteries to large power sources, such as on-vehicle power sources, a further increase in output and durability performance with which the batteries can retain the capacity at a higher level than the secondary batteries known in the related art have been anticipated.

One of the approaches to further improve the characteristics of lithium secondary batteries is to add an appropriate compound to the electrolytic solution. For example, it has been known for a long time that a phosphorus-containing compound and, in particular, a compound having a P=O structure improve the battery characteristics.

PTLs 1 to 3 propose the techniques for providing a nonaqueous electrolytic solution battery that does not generate a large amount of gas, has a high capacity, and is excellent in terms of storage characteristics and cycle characteristics by using a compound having an alkyloxycarbonyl skeleton. There have also been studies of techniques in which a salt such as a monolithium salt of a phosphorus-containing compound having a P=O structure is added to the electrolytic solution. PTL 4 proposes a technique in which a phosphate ester salt is added to the electrolytic solution in order to limit the degradation of charge-discharge characteristics and an increase in internal resistance even after the battery has been exposed in a high-temperature environment. PTL 5 proposes a technique in which an electrolytic solution including one or more lithium phosphates that have a specific polar group directly bonded to the phosphorus atom is used to enhance, in particular, low-temperature discharge characteristics subsequent to storage at high temperatures.

PTL 1: International Publication No. 2008-123038
PTL 2: International Publication No. 2015/016186
PTL 3: International Publication No. 2015/016187
PTL 4: Japanese Unexamined Patent Application Publication No. 2015-167129
PTL 5: Japanese Patent No. 5704277

In PTL 1, the evaluation of cycle characteristics was made, but any results that show a reduction in internal resistance, which is an important factor directly or indirectly responsible for an increase in output, are not described. PTLs 2 and 3 also do not describe any results that show a reduction in internal resistance, which is an important factor directly or indirectly responsible for an increase in output.

In PTL 4, a cycle evaluation was made using a three-electrode cell including a counter electrode made of a metal foil. Therefore, the loss due to the side reactions that occur during charging was canceled by the metal ions supplied from the counter electrode metal foil. This made it impossible to evaluate the true cycle characteristics. In addition, the evaluations studied specifically in Examples were made only for 5 cycles. Furthermore, although the resistances of the electrodes were compared and evaluated on the basis of the alternating current impedance measured subsequent to holding at 60° C., the amount of time during which holding was performed at 60° C. is not clear. It is not clear which part of the measurement results was used for comparison and how the comparison was made. Moreover, for example, the impacts of the metal foil used as a counter electrode were not separated. Thus, the evaluation results are not complete.

In PTL 5, the low-temperature discharge capacity retention factor subsequent to the exposure at high temperatures was reportedly high. However, any of the absolute capacities used as a reference and capacities relative to Comparative examples is not described and it is not shown whether a high capacity was maintained in reality. Furthermore, no method for determining internal resistance is described. In addition, cycle characteristics in which cycles of charging and discharging are repeated were not conducted.

In particular, as described in the comparison between Examples and Comparative examples described below, the results of the re-evaluations made by the inventor of the present invention revealed that the above technologies do not have sufficient characteristics.

SUMMARY OF INVENTION

The present invention was made in order to address the above issues. An object of the present invention is to provide a nonaqueous electrolytic solution capable of markedly limiting the initial resistance of an electrical storage device that includes the nonaqueous electrolytic solution and enhancing the fundamental characteristics of the electrical storage device, that is, capacity retention factors subsequent to the endurance tests that are a static test, such as a high-temperature storage test, and a dynamic test, such as a high-temperature cycle test, while maintaining the effect to limit resistance, and an electrical storage device that includes the nonaqueous electrolytic solution.

Solution to Problem

The inventors of the present invention conducted various studies in order to achieve the object and, as a result, found that the issues may be addressed by adding a phosphorus-containing compound having a specific structure to the electrolytic solution. Thus, the present invention was made. The summary of the present invention is as follows.

[1] A nonaqueous electrolytic solution comprising a nonaqueous solvent and a compound represented by Formula (1) below.

[Chem. 1]

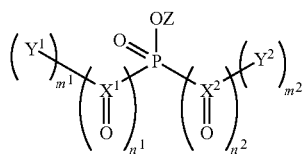
(1)

(wherein, in Formula (1), P and O are not abbreviations but symbols of element;

$X^1$ and $X^2$ each independently represent C, S, or P; $n^1$ and $n^2$ each independently represent 1 when $X^1$ and $X^2$ represent C or P and 2 when $X^1$ and $X^2$ represent S;

$n^1$ represents 1 when $X^1$ represents C or P and 2 when $X^1$ represents S;

$n^2$ represents 1 when $X^2$ represents C or P and 2 when $X^2$ represents S;

$Y^1$ and $Y^2$ each independently represent a hydrocarbon group that may have a substituent or an —OW group (where W represents a hydrocarbon group that may have a substituent);

$m^1$ represents 1 when $X^1$ represents C or S and 2 when $X^1$ represents P, and $m^2$ represents 1 when $X^2$ represents C or S and 2 when $X^2$ represents P; and Z represents a hydrocarbon group that may have a substituent, an —SiV$_3$ group (where V represents a hydrocarbon group that may have a substituent), an organic onium, or a metal)

[2] The nonaqueous electrolytic solution according [1], wherein, in Formula (1), $X^1$ and $X^2$ represent C, $n^1$ and $n^2$ represent 1, and $m^1$ and $m^2$ represent 1.

[3] The nonaqueous electrolytic solution according [1] or [2], wherein, in Formula (1), $Y^1$ and $Y^2$ each independently represent a group selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms, or an —OW group where W is selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms.

[4] The nonaqueous electrolytic solution according to any one of [1] to [3], wherein, in Formula (1), Z represents a group selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms, an —SiV$_3$ group where V is selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms, hydrogen, or an alkali metal.

[5] The nonaqueous electrolytic solution according to any one of [1] to [4], wherein the content of the compound represented by Formula (1) is 0.001% by mass or more and 10% by mass or less.

[6] The nonaqueous electrolytic solution according to any one of [1] to [5], the nonaqueous electrolytic solution comprising an electrolyte.

[7] The nonaqueous electrolytic solution according to any one of [1] to [6], the nonaqueous electrolytic solution further comprising at least one compound selected from the group consisting of a fluorine-containing cyclic carbonate, a sulfur-containing organic compound, a phosphorus-containing organic compound, an organic compound having a cyano group, an organic compound having an isocyanate group, a silicon-containing compound, an aromatic compound, a cyclic carbonate having an unsaturated carbon-carbon bond, a fluorine-free carboxylate ester, a cyclic compound having plural ether linkages, a compound having an isocyanuric acid skeleton, a monofluorophosphate salt, a difluorophosphate salt, a borate salt, an oxalate salt, and a fluorosulfonate salt.

[8] The nonaqueous electrolytic solution according to [7], wherein the total content of the at least one compound selected from the group consisting of a fluorine-containing cyclic carbonate, a sulfur-containing organic compound, a phosphorus-containing organic compound, an organic compound having a cyano group, an organic compound having an isocyanate group, a silicon-containing compound, an aromatic compound, a cyclic carbonate having an unsaturated carbon-carbon bond, a fluorine-free carboxylate ester, a cyclic compound having plural ether linkages, a compound having an isocyanuric acid skeleton, a monofluorophosphate salt, a difluorophosphate salt, a borate salt, an oxalate salt, and a fluorosulfonate salt is 0.001% by mass or more and 50% by mass or less of the total amount of the nonaqueous electrolytic solution.

[9] The nonaqueous electrolytic solution according to any one of [1] to [8], the nonaqueous electrolytic solution being used for producing a nonaqueous electrolytic solution secondary battery.

[10] An electrical storage device comprising negative and positive electrodes capable of occluding and releasing a lithium ion, and a nonaqueous electrolytic solution including an electrolyte and a nonaqueous solvent, wherein the nonaqueous electrolytic solution is the nonaqueous electrolytic solution according to any one of [1] to [9].

[11] The electrical storage device according to [10], the electrical storage device being a nonaqueous electrolytic solution secondary battery.

Advantageous Effects of Invention

According to the present invention, a nonaqueous electrolytic solution that enables the production of an electrical storage device having excellent battery characteristics, the nonaqueous electrolytic solution being capable of markedly limiting the initial resistance of the electrical storage device and enhancing the fundamental characteristics of the electrical storage device, that is, capacity retention factors subsequent to the endurance tests, such as a high-temperature storage test and a high-temperature cycle test, while maintaining the effect to reduce resistance, may be provided. This enables a reduction in the size of the electrical storage device and the improvement of performance of the electrical storage device.

The actions and mechanisms by which the initial resistance of an electrical storage device prepared using the nonaqueous electrolytic solution according to the present invention is limited and the capacity retention factors of the electrical storage device which are measured subsequent to the endurance tests, such as a high-temperature storage test and a high-temperature cycle test, are enhanced while the effect to reduce resistance is maintained are not clear and are considered as follows. Note that the present invention is not limited to the actions and mechanisms described below.

Normally, compounds that do not have many ionic or polar functional groups, such as the compounds described in PTLs 1 to 3, have a low adsorption capacity to the transition metal included in the positive electrode when they are in an unreacted state before charging or at the early stage of charging and produce the effects only when the reaction occurs. Therefore, these compounds do not produce the effect to protect the surface at the earliest stage. It is considered that the compounds do not limit an increase in resistance for the above reasons. In contrast, since the compounds described in PTLs 4 and 5 and the compound according to the present invention are compounds having plural ionic or polar functional groups, they are capable of consistently adsorbing to the transition metal included in the positive electrode when they are in an unreacted state before charging or at the early stage of charging and have a potential to produce the effect to protect the surface at the earliest stage.

In the storage test in which the battery is subjected to a high-temperature environment while being charged, whether or not the substance adsorbed on the surface of the charged positive electrode can prevent the positive electrode from coming into contact with the constituents of the electrolytic solution is the most important characteristic. Unlike a cycle test in which the cycle of charging and discharging is continuously repeated, the degradation behavior in which the surface-adsorbed substance is reacted or detached in the dynamic environment of the intercalation and deintercalation of lithium is not observed.

It is difficult to determine whether "SEI" that suppresses the reduction reaction that occurs upon the intercalation of lithium into the negative electrode remains present consistently in the process of the intercalation and deintercalation of lithium, in the high-temperature storage test.

The compound represented by Formula (1) included in the nonaqueous electrolytic solution according to the present invention has two X=O bonds (where X is C, P, or S) that are polar groups different from an alkyl group or an alkoxyl group, the X=O bonds being directly bonded to the phosphorus element. It is considered that the skeleton of the compound and the P=O skeleton enable the compound to be more readily coordinated to the metal included in the positive electrode.

Since the compound represented by Formula (1) originally has Li$^+$ or a structure can be readily converted into a salt that includes Li$^+$ as cationic species, it is considered that the compound represented by Formula (1) which is adsorbed upon the intercalation and deintercalation of lithium onto the surface of the positive electrode enables the migration of the Li and does not block the intercalation-deintercalation reaction.

Accordingly, it is considered that an increase in resistance may be limited from an early stage because the compound represented by Formula (1) adsorbed in the early stage limits the degradation of the positive electrode, which begins when the surface of the positive electrode is charged for the first time, and does not block the intercalation-deintercalation reaction of Li. Furthermore, since the compound represented by Formula (1) has P—X (where X is C, P, or S) bonds that cannot be broken easily, the likelihood of the structure of the compound becoming fragmented by the reaction, becoming desorbed from the surface, and consequently degrading the characteristics is low. Thus, it is considered that the advantageous effects are not impaired even after a long-term dynamic test, such as a cycle test.

Furthermore, the firm structure of the compound limits the degradation that occurs on the surface of the negative electrode while it does not block the intercalation and deintercalation of Li. This may limit a reduction in efficiency which is caused presumably by the decomposition of the constituents of the electrolytic solution over the cycles and enhance cycle characteristics compared with the case where no additive is used or the other additives described as examples are used.

DESCRIPTION OF EMBODIMENTS

The present invention is described below. The present invention is not limited to the following embodiments. The present invention may be implemented with various modifications within the summary and scope of the present invention.

1. Nonaqueous Electrolytic Solution

A nonaqueous electrolytic solution according to the present invention includes an electrolyte, a nonaqueous solvent, and the compound represented by Formula (1) below.

1-1. Compound Represented by Formula (1)

The nonaqueous electrolytic solution according to the present invention includes the compound represented by Formula (1). Note that no distinction is made among optical isomers of the compound represented by Formula (1). The isomers may be used alone or in a mixture of two or more in the present invention.

[Chem. 2]

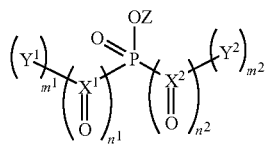

(1)

In Formula (1), P and O are not abbreviations but symbols of element.

In Formula (1), $X^1$ and $X^2$ each independently represent C, S, or P. $X^1$ and $X^2$ preferably represent C from the viewpoint of ease of production.

In Formula (1), $n^1$ represents 1 when $X^1$ represents C or P and 2 when $X^1$ represents S. In Formula (1), $n^2$ represents 1 when $X^2$ represents C or P and 2 when $X^2$ represents S.

In Formula (1), $Y^1$ and $Y^2$ each independently represent a hydrocarbon group that may have a substituent or an —OW group (where W represents a hydrocarbon group that may have a substituent).

The hydrocarbon group that may have a substituent which is represented by $Y^1$, $Y^2$, and W is preferably an alkyl group that has 1 to 6 carbon atoms and may have a substituent and is more preferably an alkyl group that has 1 to 4 carbon atoms and may have a substituent;

is preferably an alkenyl group that has 2 to 6 carbon atoms and may have a substituent and is more preferably an alkenyl group that has 2 to 4 carbon atoms and may have a substituent;

is preferably an alkynyl group that has 2 to 6 carbon atoms and may have a substituent and is more preferably an alkynyl group that has 2 to 4 carbon atoms and may have a substituent;

is preferably an aryl group that has 6 to 12 carbon atoms and may have a substituent and is more preferably an aryl group that has 6 to 10 carbon atoms and may have a substituent; and is preferably an arylalkyl group that has 7 to 13 carbon atoms and may have a substituent and is more preferably an arylalkyl group that has 7 to 11 carbon atoms and may have a substituent.

Among the above groups, an alkyl group that has 1 to 6 carbon atoms and may have a substituent is preferable, and an alkyl group that has 1 to 4 carbon atoms and may have a substituent is particularly preferable as $Y^1$, $Y^2$, and W.

If the molecular weight or the size of the molecule is excessively large relative to the chemical structure that contributes to the advantageous effects, the advantageous effects may fail to be produced to a sufficient degree.

The substituent that may be included in the hydrocarbon group represented by $Y^1$ and $Y^2$ and the substituent that may be included in W of the —OW group are preferably halogen atoms and are particularly preferably fluorine atoms. It is considered that substituting the above groups with halogen atoms and, particularly, with fluorine atoms results in low unwanted reactivity and enables the characteristics comparable to those produced when substitution is not done to be produced.

For the above reasons and from the viewpoint of industrial availability, the following hydrocarbon groups are preferable.

As an alkyl group, a methyl group, an ethyl group, an n-propyl group, an i-propyl group, an n-butyl group, an i-butyl group, an s-butyl group, a t-butyl group, a 2-fluoroethyl group, and a 2,2,2-trifluoroethyl group are preferable; and a methyl group, an ethyl group, and a 2,2,2-trifluoroethyl group are more preferable.

As an alkenyl group, an ethenyl group, a 1-propenyl group, a 2-propenyl group, a 1-methylethenyl group, a 1-butenyl group, a 2-butenyl group, a 3-butenyl group, a 1-methyl-1-propenyl group, a 2-methyl-1-propenyl group, a 1-methyl-2-propenyl group, a 2-methyl-2-propenyl group, and a trifluoroethenyl group are preferable; and an ethenyl group, a 1-propenyl group, a 2-propenyl group, and a 1-methylethenyl group are more preferable.

As an alkynyl group, an ethynyl group, a 1-propynyl group, a 2-propynyl group, a 1-butynyl group, a 2-butynyl group, and a 3-butynyl group are preferable; and ethynyl and 2-propynyl are more preferable.

As an aryl group, a phenyl group, a 2-methylphenyl group, a 3-methylphenyl group, a 4-methylphenyl group, a 2-ethylphenyl group, a 3-ethylphenyl group, a 4-ethylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 1-naphthalenyl group, a 2-naphthalenyl group, 1-fluorophenyl group, a 2-fluorophenyl group, a 3-fluorophenyl group, and a pentafluorophenyl group are preferable; and a phenyl group, a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 1-naphthalenyl group, a 2-naphthalenyl group, a 1-fluorophenyl group, a 2-fluorophenyl group, and a 3-fluorophenyl group are more preferable.

As an alkylaryl group, a phenylmethyl group, a diphenylmethyl group, a 1-phenylethyl group, a 2-phenylethyl group, a 1-phenylpropyl group, a (1-phenyl-1-methyl)ethyl group, a (2-methylphenyl)methyl group, a (3-methylphenyl)methyl group, a (4-methylphenyl)methyl group, a (2,5-dimethylphenyl)methyl group, a (2,4,6-trimethylphenyl)methyl group, a (1-fluorophenyl)methyl group, a (2-fluorophenyl)methyl group, a (3-fluorophenyl)methyl group, a (2,4-difluorophenyl)methyl group, a (3,4-difluorophenyl)methyl group, a (3-(trifluoromethyl)phenyl)methyl group, a (4-(trifluoromethyl)phenyl)methyl group, a (3,5-bis(trifluoromethyl)phenyl)methyl group, a (1-naphthyl)methyl group, a (2-naphthyl)methyl group, and a (pentafluorophenyl)methyl group are preferable; and a phenylmethyl group and a (pentafluorophenyl)methyl group are more preferable.

In Formula (1), $m^1$ represents 1 when $X^1$ represents C or S and 2 when $X^1$ represents P, and $m^2$ represents 1 when $X^2$ represents C or S and 2 when $X^2$ represents P.

Z represents a hydrocarbon group that may have a substituent, an —SiV$_3$ group (where V represents a hydrocarbon group that may have a substituent), an organic onium, or a metal.

Preferable examples of the group represented by Z when Z represents a hydrocarbon group that may have a substituent and preferable examples of the group represented by V when Z represents a —SiV$_3$ group are the same as those of $Y^1$, $Y^2$, and W. The reasons for which those groups are preferable are also the same as described above. Among those, a methyl group, an ethyl group, an i-propyl group, an n-butyl group, a t-butylvinyl group, an ethynyl group, a 2-propynyl group, a phenyl group, and a pentafluorophenyl group are desirable.

Examples of the —SiV$_3$ group include a trimethylsilyl group, an ethyldimethylsilyl group, a dimethyl-n-propylsilyl group, a dimethyl-1-propylsilyl group, a dimethyl-n-butylsilyl group, a dimethyl-t-butylsilyl group, a diethyl-i-propylsilyl group, a triethylsilyl group, a tri-i-propylsilyl group, a tri-n-butylsilyl group, an ethynyldimethylsilyl group, a dimethyl-2-propynylsilyl group, a dimethylphenylsilyl group, a methyldiphenylsilyl group, a dimethyl(phenylmethyl)silyl group, a t-butyldiphenylsilyl group, a triphenylsilyl group, a dimethyl(pentafluorophenyl)silyl group, and a dimethyl(2,2,2-trifluoroethyl)silyl group. Among these, for example, a trimethylsilyl group, a dimethyl-t-butylsilyl group, a tri-i-propylsilyl group, an ethynyldimethylsilyl group, a dimethylphenylsilyl group, and a triphenylsilyl group are preferable.

When Z is an organic onium, the type of the organic onium is not limited. From the viewpoints of redox resistance, solubility, and ease of industrial availability, the structures that have been used in the production of electrolytic solutions for various organic devices are preferable; an onium having a quaternary ammonium structure and an onium having a quaternary phosphonium structure are preferable; and tetraalkylammonium, tetraalkylphosphonium, and 1,3-dialkyl imidazolium are particularly preferable.

When Z is a metal, the type of the metal is not limited but is preferably a monovalent metal having a high solubility. In addition, it is preferable that the metal is not a "transition metal, which can be oxidized or reduced". Specifically, an alkali metal is preferable. In the case where the compound is added to a battery that includes lithium, such as a lithium ion battery, lithium is preferable. In the case where the compound is added to a battery that includes sodium, such as a sodium ion battery, sodium is preferable. In the case where the compound is added to a battery that includes potassium, such as a potassium ion battery, potassium is preferable. It is preferable to select the above alkali metals because they are the same as the types of ions included in the systems.

Among the above-described groups, the alkyl group, the —SiV$_3$ group, and the metal are preferably used as Z. The —SiV$_3$ group and the metal are particularly preferably used as Z. Preferable examples of these groups are as described above.

Thus, preferable examples of the compound represented by Formula (1) include the following compounds.

[Chem. 3]

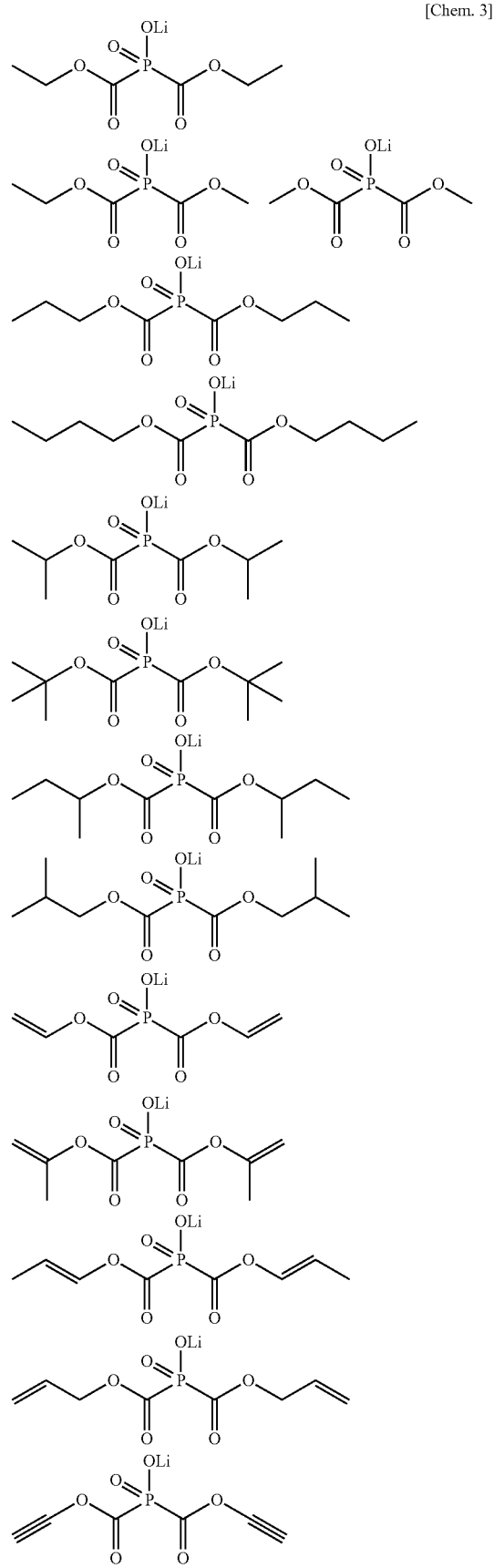

-continued
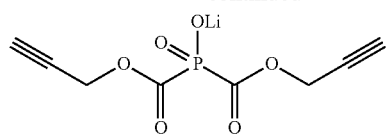
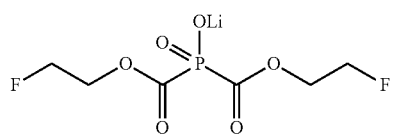
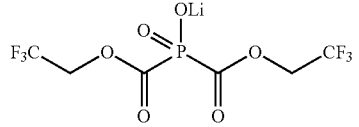
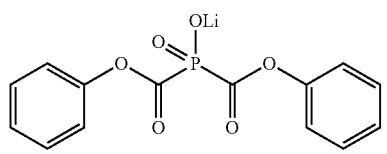
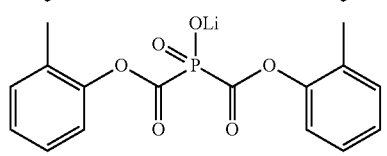
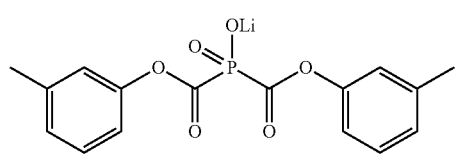
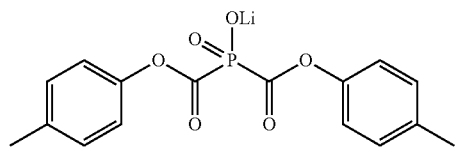
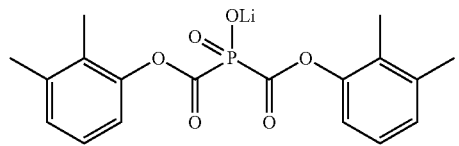
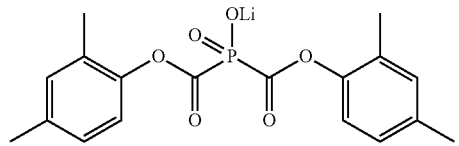
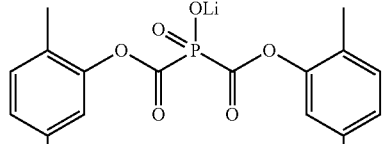
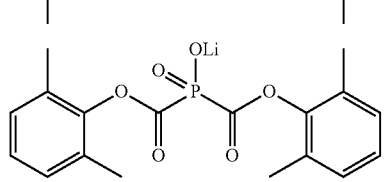
-continued
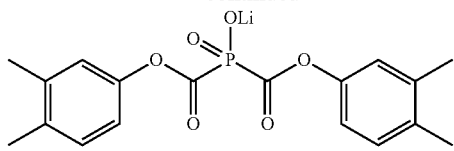
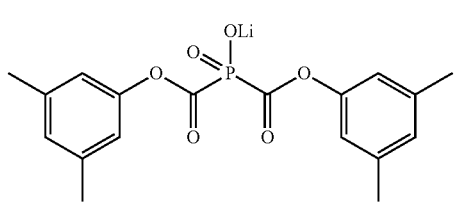
[Chem. 4]
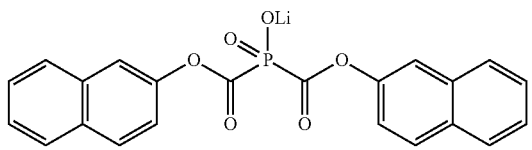
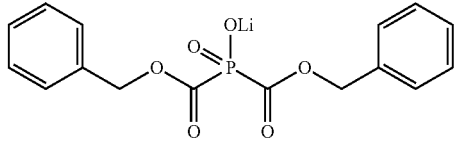
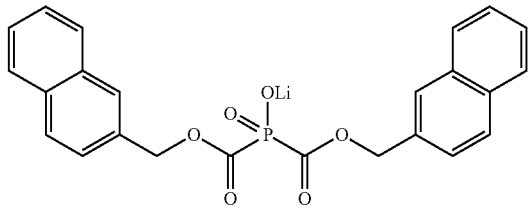
[Chem. 5]
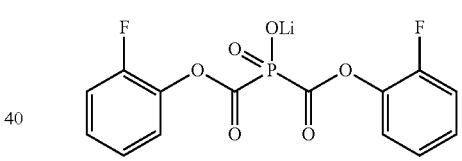
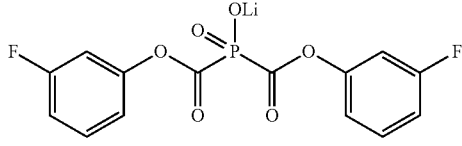
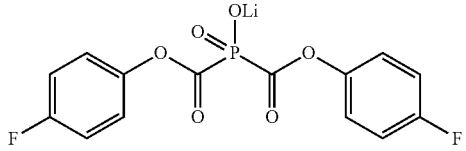
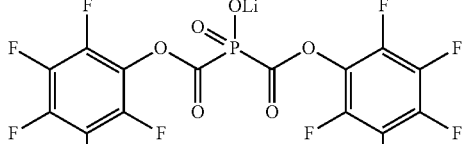
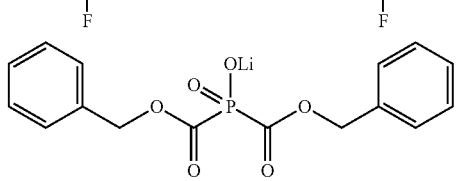

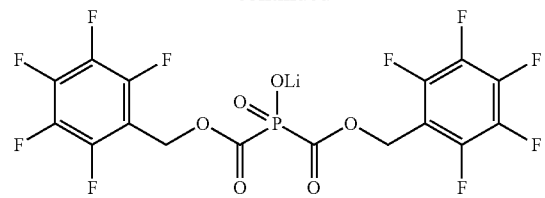
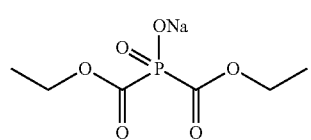
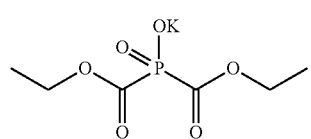
[Chem. 6]
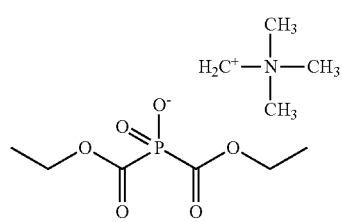
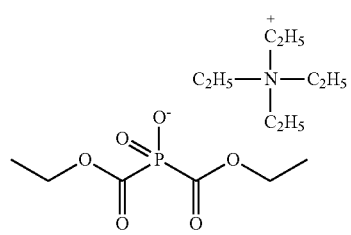
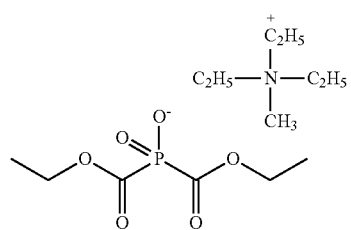
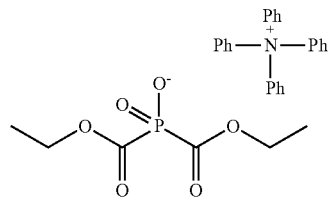
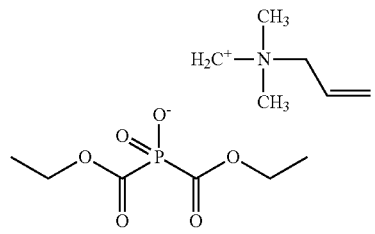
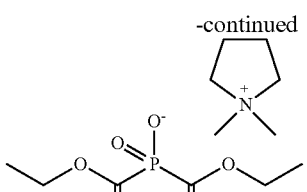
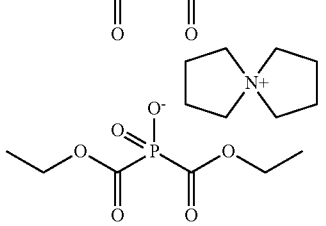
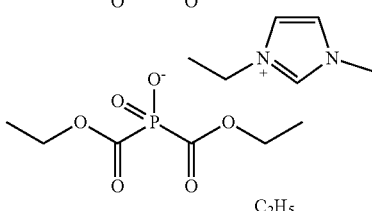
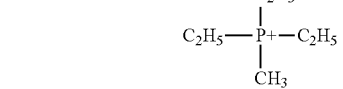
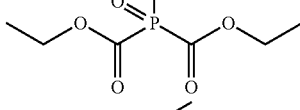
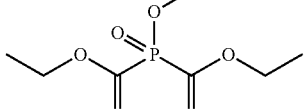
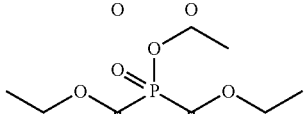
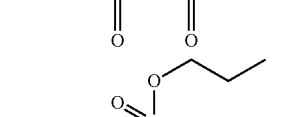
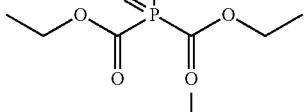
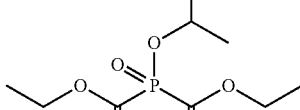
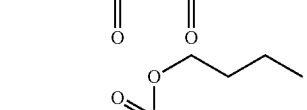
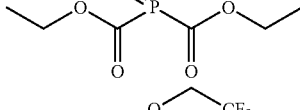
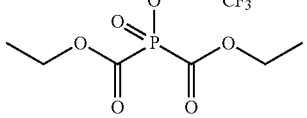

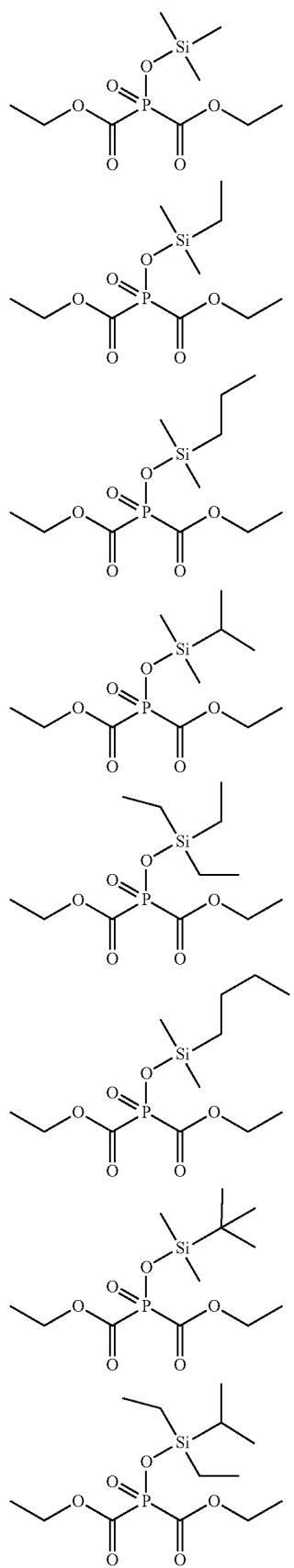
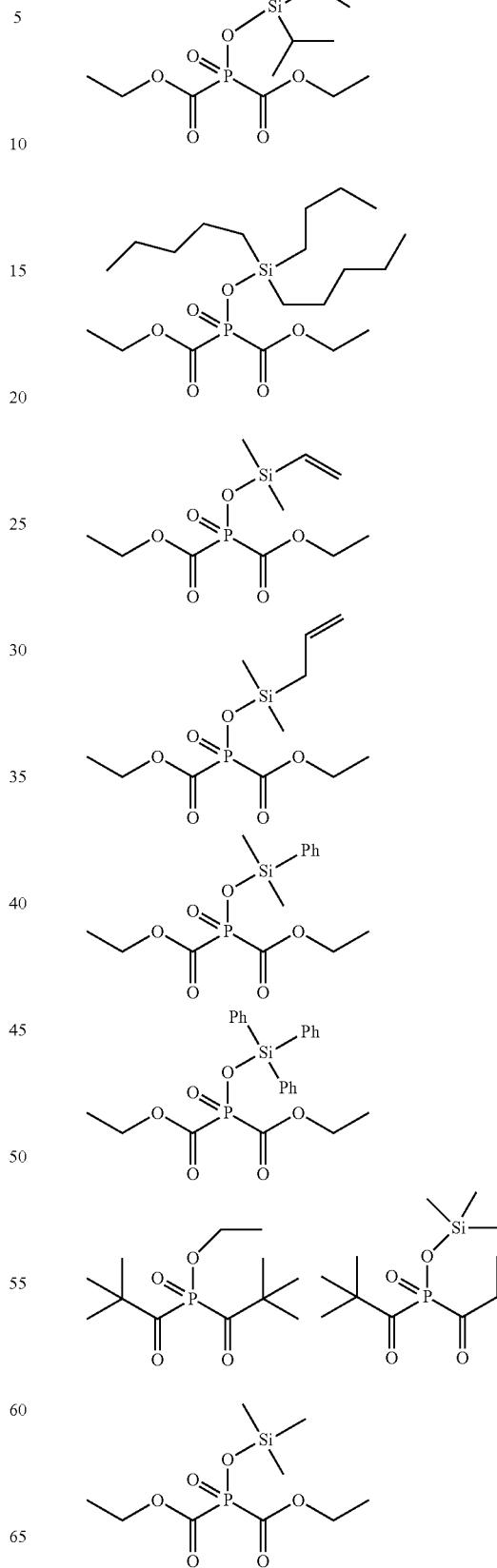

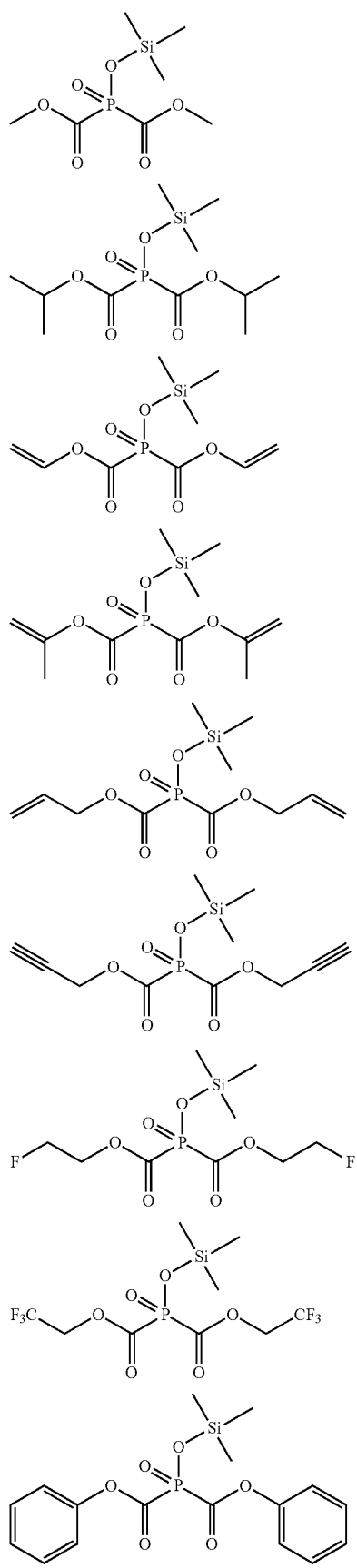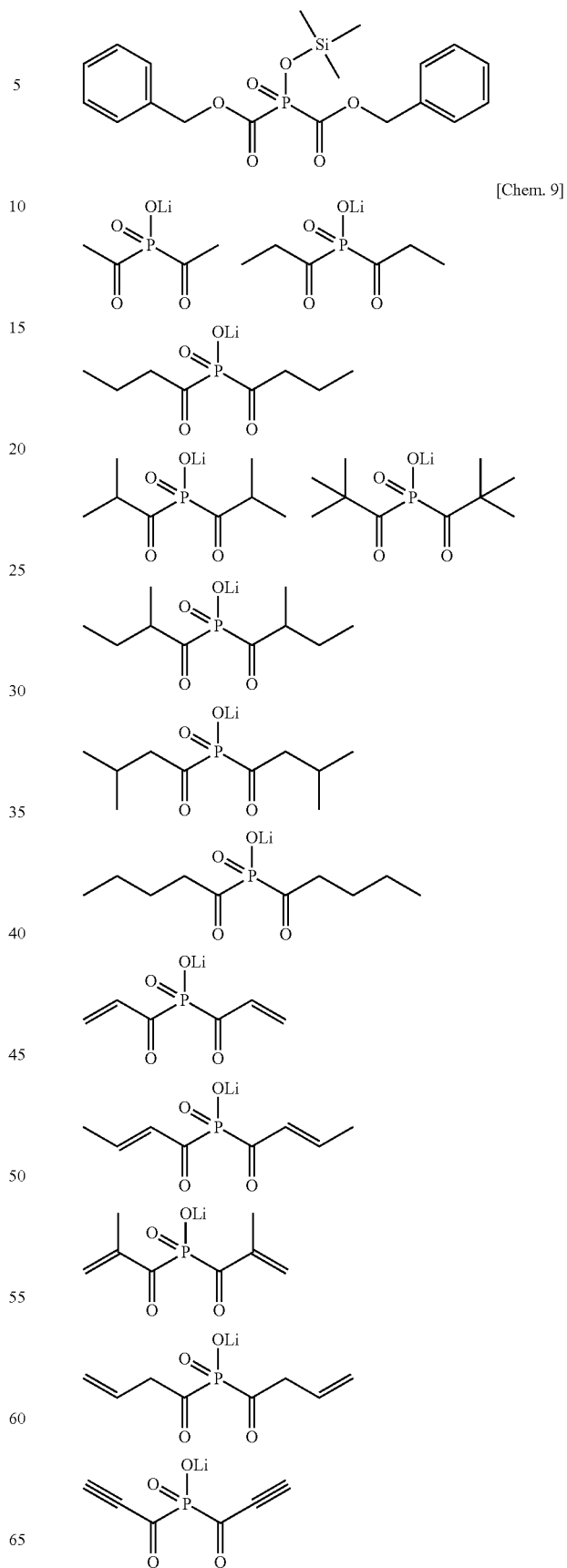

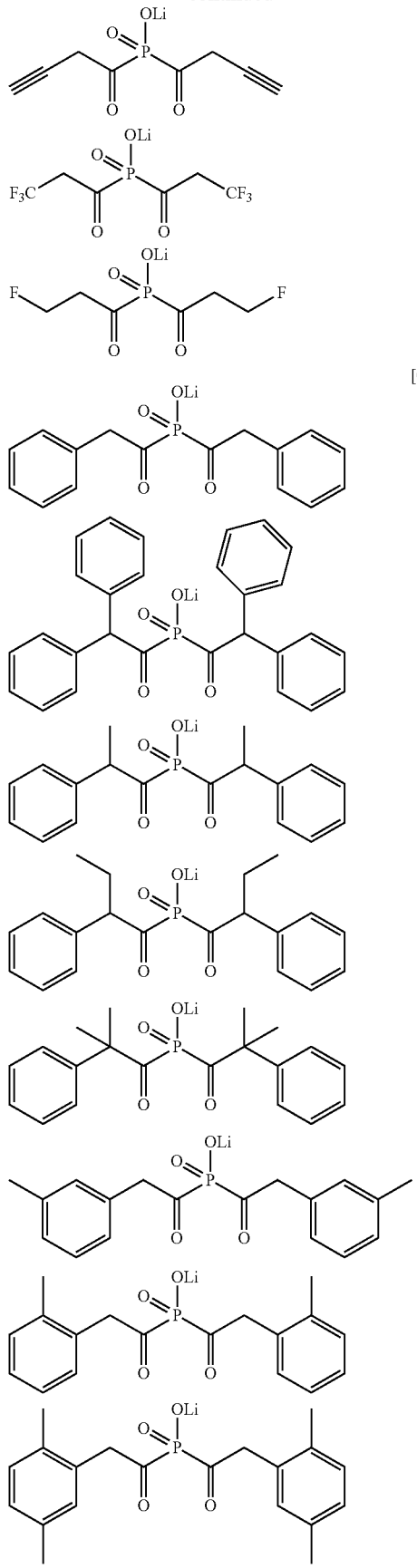
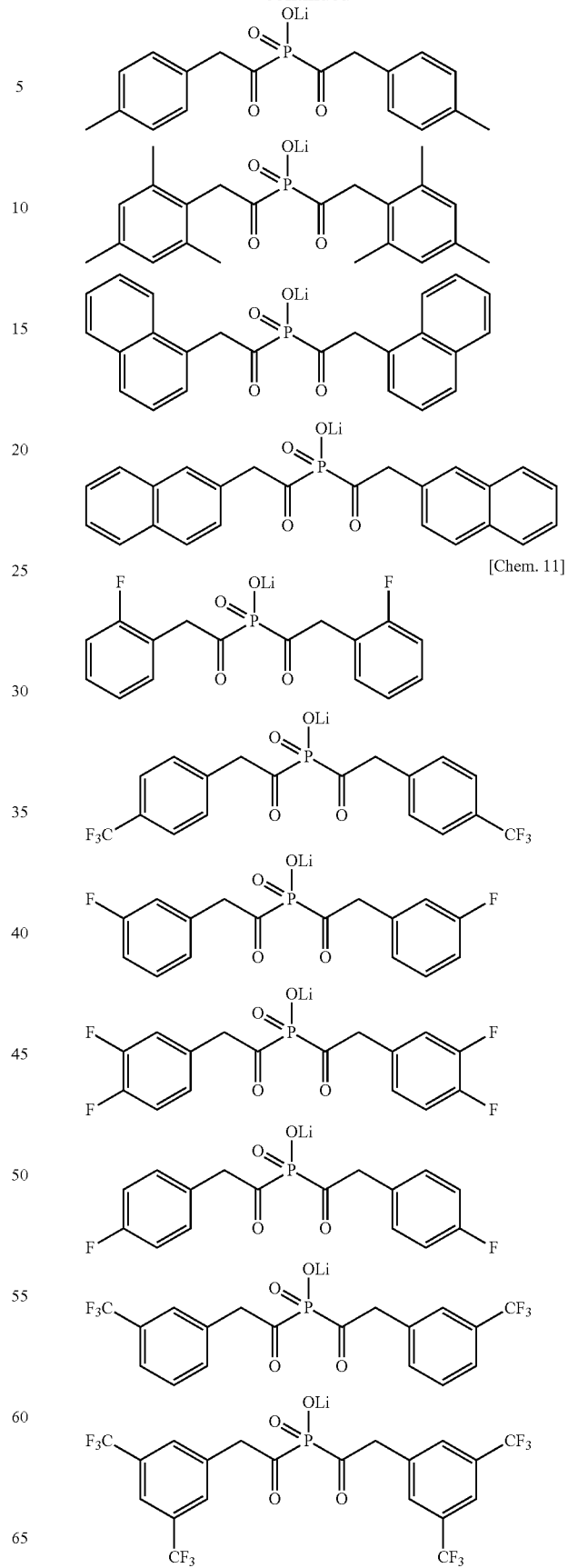

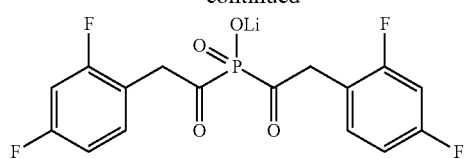
Among these, for example, the following compounds are preferable.
[Chem. 12]
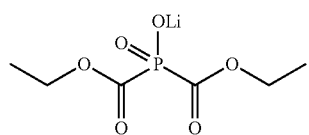
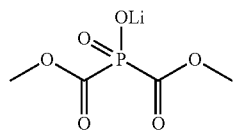
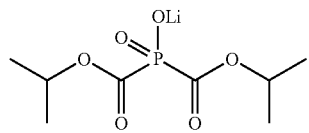
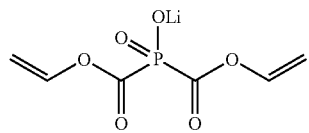
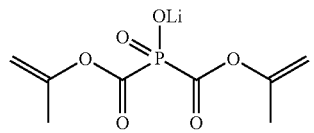
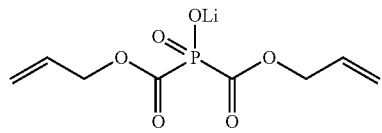
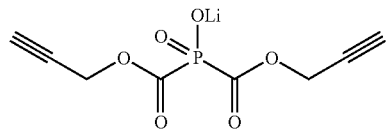
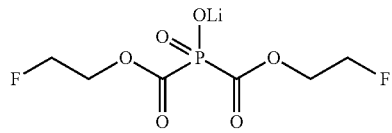
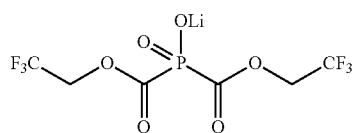
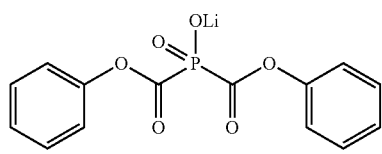
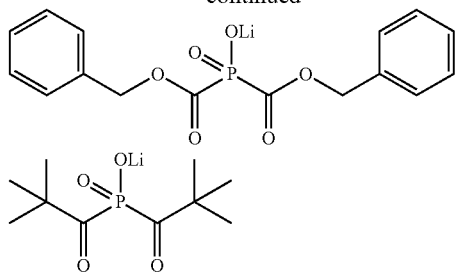
[Chem. 13]
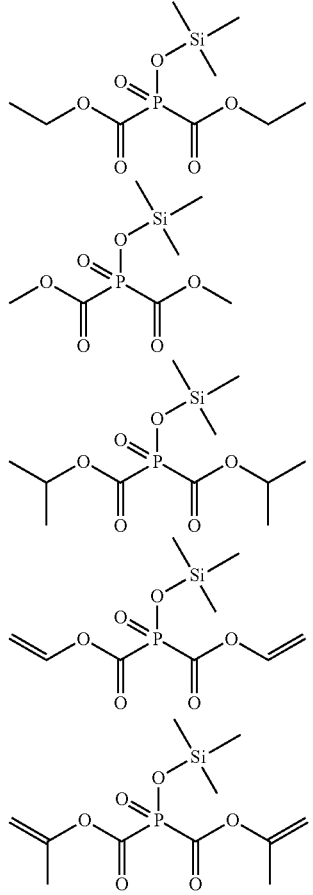
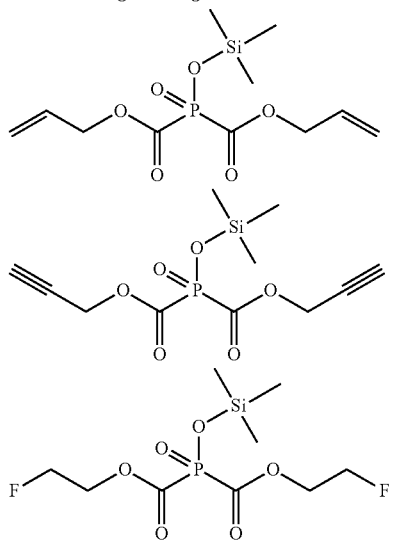

-continued

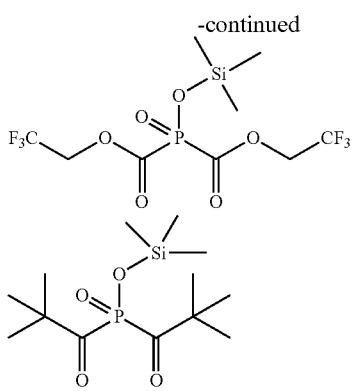

The above compounds may be synthesized by, for example, the methods described in Non Patent Literatures 1 and 2.

Non Patent Literature 1: Zeitschrift fuer Anorganische and Allgemeine Chemie (1985), 530, 16
(sodium included in the compound described in Non Patent Literature 1 may be replaced with another alkali metal)

Non Patent Literature 2: Heteroatom Chemistry (2012), 23, (4), 352

The compounds represented by Formula (1) may be used alone or in combination of two or more. The proportion of the amount of the compound represented by Formula (1) (when two or more compounds are used, the total amount thereof) to the total amount (100 mass %) of the nonaqueous electrolytic solution which is required for achieving the advantageous effects of the present invention is not limited. The above proportion is normally 0.001% by mass or more, is preferably 0.01% by mass or more, is more preferably 0.1% by mass or more, is further preferably 0.23% by mass or more, and is particularly preferably 0.5% by mass or more.

When the above proportion falls within the above range, it may become easy to control, for example, the reduction in initial resistance and the maintenance of the capacity retention factor and a reduction in resistance which are determined subsequent to the endurance tests, such as the high-temperature storage test and the high-temperature cycle test.

The above proportion is normally 10% by mass or less, is preferably 5% by mass or less, is more preferably 3% by mass or less, and is further preferably 2% by mass or less. When the above proportion falls within the above range, it becomes possible to efficiently achieve, for example, the reduction in initial resistance and the maintenance of the capacity retention factor and a reduction in resistance which are determined subsequent to the endurance tests, such as the high-temperature storage test and the high-temperature cycle test.

The method for adding the above compound to the electrolytic solution according to the present invention is not limited. Examples of the method include a method in which the compound is added directly to the electrolytic solution and a method in which the compound is generated inside the battery or in the electrolytic solution. Examples of the method in which the above compound is generated include a method in which a compound other than the above compound is added and the oxidation, hydrolysis, etc. of a component of the battery, such as the electrolytic solution, is performed to generate the compound and a method in which the compound is generated by preparing a battery and applying an electrical load, such as charging or discharging, to the battery.

When the above compound is added to a nonaqueous electrolytic solution to prepare an electrical storage device and the electrical storage device is then disintegrated to obtain the nonaqueous electrolytic solution, the content of the compound in the nonaqueous electrolytic solution is significantly reduced in many cases. Therefore, when the compound is detected in a nonaqueous electrolytic solution drawn from the electrical storage device even in a trace amount, it is considered that the nonaqueous electrolytic solution is included in the scope of the present invention. When the compound is used as a nonaqueous electrolytic solution for preparing an electrical storage device and the battery is then disintegrated to obtain the nonaqueous electrolytic solution, although the nonaqueous electrolytic solution includes a trace amount of the compound, the compound may be detected on the other components of the electrical storage device (e.g., the positive electrode, the negative electrode, and the separator) in many cases. Therefore, in the case where the compound is detected on the above components, it is considered that the total amount thereof be included in the nonaqueous electrolytic solution. It is preferable that, with the above assumption, the specific compounds described in 1-2. below be included in the nonaqueous electrolytic solution. The content of the specific compounds is not limited. The total content of the specific compounds is normally 0.001% by mass or more and 50% by mass or less of the total amount of the nonaqueous electrolytic solution.

1-2. Fluorine-Containing Cyclic Carbonate, Sulfur-Containing Organic Compound, Phosphorus-Containing Organic Compound, Organic Compound Having Cyano Group, Organic Compound Having Isocyanate Group, Silicon-Containing Compound, Aromatic Compound, Cyclic Carbonate Having Unsaturated Carbon-Carbon Bond, Fluorine-Free Carboxylate Ester, Cyclic Compound Having Plural Ether Linkages, Compound Having Isocyanuric Acid Skeleton, Monofluorophosphate Salt, Difluorophosphate Salt, Borate Salt, Oxalate Salt, and Fluorosulfonate Salt The nonaqueous electrolytic solution according to an aspect of the present invention may include, in addition to the compound represented by Formula (1), at least one compound (Group (II) compounds) selected from the group consisting of a fluorine-containing cyclic carbonate, a sulfur-containing organic compound, a phosphorus-containing organic compound, an organic compound having a cyano group, an organic compound having an isocyanate group, a silicon-containing compound, an aromatic compound, a cyclic carbonate having an unsaturated carbon-carbon bond, a fluorine-free carboxylate ester, a cyclic compound having plural ether linkages, a compound having an isocyanuric acid skeleton, a monofluorophosphate salt, a difluorophosphate salt, a borate salt, an oxalate salt, and a fluorosulfonate salt. This is because, when the nonaqueous electrolytic solution includes the above compounds in combination, the side reactions that may be caused by the compound represented by Formula (1) on the positive and negative electrodes can be suppressed with efficiency.

Among the above components, at least one compound selected from the group consisting of the fluorine-containing cyclic carbonate, the sulfur-containing organic compound, the phosphorus-containing organic compound, the organic compound having a cyano group, the aromatic compound, the cyclic carbonate having an unsaturated carbon-carbon bond, the fluorine-free carboxylate ester, and the cyclic compound having plural ether linkages is preferably used in order to form a quality composite coating film on the negative electrode and thereby enhance the initial battery characteristics and the characteristics of the battery that has been subjected to the endurance test in a balanced manner. At least one compound selected from the group consisting of the fluorine-containing cyclic carbonate, the organic compound having a cyano group, the aromatic compound, the cyclic carbonate having an unsaturated carbon-carbon bond, and the fluorine-free carboxylate ester is more preferably used. At least one compound selected from the group consisting of the fluorine-containing cyclic carbonate, the cyclic carbonate having an unsaturated carbon-carbon bond, and the fluorine-free carboxylate ester is further preferably used. At least one compound selected from the fluorine-containing cyclic carbonate and the cyclic carbonate having an unsaturated carbon-carbon bond is particularly preferably used. This is because, for example, the above compounds, which are capable of forming a coating film having a relatively low molecular weight on the negative electrode, forms a dense coating film on the negative electrode and thereby efficiently limits the degradation of the compound represented by Formula (1) by the side reaction. As described above, the above compounds reduce the occurrence of the side reaction with effect and limit an increase in resistance. Limiting the side reaction that occurs at an early stage and during the high-temperature endurance results in a reduction in a change in volume and the maintenance of safety subsequent to the high-temperature endurance. Furthermore, the rate characteristics may be enhanced.

The method for adding the above compounds to the electrolytic solution according to the present invention is not limited. Examples of the method include a method in which the compounds are added directly to the electrolytic solution and a method in which the compounds are generated inside the battery or in the electrolytic solution. Examples of the method in which the above compounds are generated include a method in which a compound other than the above compounds is added and the oxidation, hydrolysis, etc. of a component of the battery such as the electrolytic solution, is performed to generate the compounds and a method in which the compounds are generated by preparing a battery and applying an electrical load, such as charging or discharging, to the battery.

When the compounds are added to the nonaqueous electrolytic solution and used to prepare an electrical storage device and the electrical storage device is then disintegrated to obtain the nonaqueous electrolytic solution, the content of the compounds in the nonaqueous electrolytic solution is significantly reduced in many cases. Therefore, when the compounds are detected in the nonaqueous electrolytic solution drawn from the electrical storage device even in a trace amount, it is considered that the nonaqueous electrolytic solution is included in the scope of the present invention. When the compounds are used as a nonaqueous electrolytic solution for preparing an electrical storage device and the electrical storage device is then disintegrated to obtain the nonaqueous electrolytic solution, although the amount of the compounds included in the nonaqueous electrolytic solution is trace, the compounds may be detected on the other components of the electrical storage device, such as the positive electrode, the negative electrode, and the separator, in many cases. Therefore, in the case where the compounds are detected on the above components, it is considered that the total amount thereof be included in the nonaqueous electrolytic solution. With the above assumption, the specific compounds are preferably included such that the content thereof falls within the range described below.

The Group (II) compounds are described below. Note that the description of a monofluorophosphate salt, a difluorophosphate salt, a borate salt, an oxalate salt, and a fluorosulfonate salt in 1-4. Electrolyte apply to the monofluorophosphate salt, the difluorophosphate salt, the borate salt, the oxalate salt, and the fluorosulfonate salt of Group (II). The foregoing descriptions of the compound represented by Formula (1) and examples and preferable examples of the compound apply also to the compound represented by Formula (1) used in combination with the above compounds. When the nonaqueous electrolytic solution includes one of the above compounds, another one of the compounds may be included in the nonaqueous electrolytic solution.

1-2-1. Fluorine-Containing Cyclic Carbonate

Examples of the fluorine-containing cyclic carbonate include a compound produced by fluorination of a cyclic carbonate having an alkylene group having 2 to 6 carbon atoms and derivatives thereof, such as a compound produced by fluorination of ethylene carbonate (hereinafter, such a compound may be referred to as "fluorinated ethylene carbonate") and derivatives thereof. Examples of the derivatives of a compound produced by fluorination of ethylene carbonate include a compound produced by fluorination of ethylene carbonate which is substituted with an alkyl group (e.g., an alkyl group having 1 to 4 carbon atoms). Among the above compounds, a fluorinated ethylene carbonate having 1 to 8 fluorine atoms and derivatives thereof are preferable.

When the electrolytic solution according to the present invention includes the fluorine-containing cyclic carbonate in combination with the compound represented by Formula (1), the endurance characteristics of a battery that includes the electrolytic solution may be improved.

Examples of the fluorinated ethylene carbonate having 1 to 8 fluorine atoms and derivatives thereof include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4-(trifluoromethyl)-ethylene carbonate, and 4,5-difluoro-4,5-dimethylethylene carbonate.

Among these, monofluoroethylene carbonate, 4,4-difluoroethylene carbonate, and 4,5-difluoroethylene carbonate are preferable because they increase the ionic conductivity of the electrolytic solution and ease of formation of a stable interface protective coating film.

Only one type of fluorinated cyclic carbonate may be used alone. Two or more types of fluorinated cyclic carbonates may be used in any combination and ratio. The amount of the fluorinated cyclic carbonate (when two or more types of fluorinated cyclic carbonates are used, the total amount thereof) is preferably 0.001% by mass or more, is more preferably 0.01% by mass or more, is further preferably 0.1% by mass or more, is further more preferably 0.5% by mass or more, is particularly preferably 1% by mass or more, and is most preferably 1.2% by mass or more, relative to 100% by mass of the electrolytic solution. The amount of the fluorinated cyclic carbonate is preferably 10% by mass or less, is more preferably 7% by mass or less, is further preferably 5% by mass or less, is particularly preferably 3% by mass or less, and is most preferably 2% by mass or less, relative to 100% by mass of the electrolytic solution. In the case where the fluorinated cyclic carbonate is used as a nonaqueous solvent, the amount of the fluorinated cyclic carbonate is preferably 1% by volume or more, is more preferably 5% by volume or more, and is further preferably 10% by volume or more; and is preferably 50% by volume or less, is more preferably 35% by volume or less, and is further preferably 25% by volume or less, relative to 100% by volume of the nonaqueous solvent.

Only one type of fluorinated unsaturated cyclic carbonate may be used alone. Two or more types of fluorinated unsaturated cyclic carbonates may be used in any combination and ratio.

The mass ratio between the compound represented by Formula (1) and the fluorine-containing cyclic carbonate, that is, Compound represented by Formula (1):Fluorine-containing cyclic carbonate, may be 1:100 or more, is preferably 10:100 or more, is more preferably 20:100 or more, and is further preferably 25:100 or more; and may be 10000:100 or less, is preferably 500:100 or less, is more preferably 300:100 or less, is further preferably 100:100 or less, is particularly preferably 75:100 or less, and is most preferably 50:100 or less. When the mass ratio falls within the above range, the battery characteristics and, in particular, endurance characteristics may be markedly improved. The mechanisms are not clear; it is considered that mixing the compound represented by Formula (1) with the fluorine-containing cyclic carbonate at the above mass ratio may minimize the side reaction of the additive which occurs on the electrode.

1-2-2. Sulfur-Containing Organic Compound

The electrolytic solution according to the present invention may further include a sulfur-containing organic compound. The sulfur-containing organic compound may be any organic compound that has at least one sulfur atom in the molecule and is preferably an organic compound that has an S=O group in the molecule, such as a chain sulfonate ester, a cyclic sulfonate ester, a chain sulfate ester, a cyclic sulfate ester, a chain sulfite ester, or a cyclic sulfite ester. Note that a sulfur-containing organic compound that can be classified as a fluorosulfonate salt is not classified as 1-2-2. Sulfur-Containing Organic Compound but as a fluorosulfonate salt, which is the electrolyte described below. When the electrolytic solution according to the present invention includes the sulfur-containing organic compound in combination with the compound represented by Formula (1), the endurance characteristics of a battery that includes the electrolytic solution may be improved.

Among these, a chain sulfonate ester, a cyclic sulfonate ester, a chain sulfate ester, a cyclic sulfate ester, a chain sulfite ester, and a cyclic sulfite ester are preferable. A compound having an $S(=O)_2$ group is more preferable. A chain sulfonate ester and a cyclic sulfonate ester are further preferable. A cyclic sulfonate ester is particularly preferable.

Examples of the sulfur-containing organic compound include the following compounds.

<<Chain Sulfonate Ester>>

Examples of the chain sulfonate ester include fluorosulfonate esters, such as methyl fluorosulfonate and ethyl fluorosulfonate; methanesulfonate esters, such as methyl methanesulfonate, ethyl methanesulfonate, 2-propynyl methanesulfonate, 3-butynyl methanesulfonate, methyl 2-(methanesulfonyloxy) propionate, ethyl 2-(methanesulfonyloxy)propionate, and 2-propynyl 2-(methanesulfonyloxy) propionate; alkenyl sulfonate esters, such as methyl vinylsulfonate, ethyl vinylsulfonate, allyl vinylsulfonate, propargyl vinylsulfonate, methyl allylsulfonate, ethyl allylsulfonate, allyl allylsulfonate, and propargyl allylsulfonate; and alkyl disulfonate esters, such as 1-methoxycarbonylethyl methanedisulfonate, 1-ethoxycarbonylethyl methanedisulfonate, 1-methoxycarbonylethyl 1,2-ethanedisulfonate, 1-ethoxycarbonylethyl 1,2-ethanedisulfonate, 1-methoxycarbonylethyl 1,3-propanedisulfonate, 1-ethoxycarbonylethyl 1,3-propanedisulfonate, 1-methoxycarbonylethyl 1,4-butanedisulfonate, and 1-ethoxycarbonylethyl 1,4-butanedisulfonate.

<<Cyclic Sulfonate Ester>>

Examples of the cyclic sulfonate ester include sultone compounds, such as 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1-methyl-1-propene-1,3-sultone, 2-methyl-1-propene-1,3-sultone, 3-methyl-1-propene-1,3-sultone, 1,4-butanesultone, and 1,5-pentanesultone; and disulfonate compounds, such as methylene methanedisulfonate and ethylene methanedisulfonate.

<<Chain Sulfate Ester>>

Examples of the chain sulfate ester include dialkyl sulfate compounds, such as dimethyl sulfate, ethylmethyl sulfate, and diethyl sulfate.

<<Cyclic Sulfate Ester>>

Examples of the cyclic sulfate ester include alkylene sulfate compounds, such as 1,2-ethylene sulfate, 1,2-propylene sulfate, and 1,3-propylene sulfate.

<<Chain Sulfite Ester>>

Examples of the chain sulfite ester include dialkyl sulfite compounds, such as dimethyl sulfite, ethylmethyl sulfite, and diethyl sulfite.

<<Cyclic Sulfite Ester>>

Examples of the cyclic sulfite ester include alkylene sulfite compounds, such as 1,2-ethylene sulfite, 1,2-propylene sulfite, and 1,3-propylene sulfite.

Among these, methyl 2-(methanesulfonyloxy)propionate, ethyl 2-(methanesulfonyloxy)propionate, 2-propynyl 2-(methanesulfonyloxy)propionate, 1-methoxycarbonylethyl 1,3-propanedisulfonate, 1-ethoxycarbonylethyl 1,3-propanedisulfonate, 1-methoxycarbonylethyl 1,4-butanedisulfonate, 1-ethoxycarbonylethyl 1,4-butanedisulfonate, 1,3-propanesultone, 1-propene-1,3-sultone, 1,4-butanesultone, 1,2-ethylene sulfate, 1,2-ethylene sulfite, methyl methanesulfonate, and ethyl methanesulfonate are preferable in order to enhance initial efficiency; 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propanesultone, 1-propene-1,3-sultone, 1,2-ethylene sulfate, and 1,2-ethylene sulfite are more preferable; and 1,3-propanesultone and 1-propene-1,3-sultone are further preferable.

Only one type of the sulfur-containing organic compound may be used alone. Two or more types of the sulfur-containing organic compounds may be used in any combination and ratio.

1-2-3. Phosphorus-Containing Organic Compound

The electrolytic solution according to the present invention may further include a phosphorus-containing organic compound (note that the term "phosphorus-containing organic compound" is used herein with the understanding that the compound represented by Formula (1) is not classified as a phosphorus-containing organic compound). The phosphorus-containing organic compound may be any organic compound that has at least one phosphorus atom in the molecule. A battery that includes the electrolytic solution according to the present invention which includes the phosphorus-containing organic compound may have improved endurance characteristics.

The phosphorus-containing organic compound is preferably a phosphate ester, a phosphonate ester, a phosphinate ester, or a phosphite ester, is more preferably a phosphate ester or a phosphonate ester, and is further preferably a phosphonate ester.

When the electrolytic solution according to the present invention includes the phosphorus-containing organic compound in combination with the compound represented by Formula (1), the endurance characteristics of a battery that includes the electrolytic solution may be improved.

Examples of the phosphorus-containing organic compound include the following compounds.

<<Phosphate Ester>>

Examples of the phosphate ester include compounds having a vinyl group, such as dimethyl vinyl phosphate, diethyl vinyl phosphate, methyl divinyl phosphate, ethyl divinyl phosphate, and trivinyl phosphate; compounds having an allyl group, such as allyl dimethyl phosphate, allyl diethyl phosphate, diallyl methyl phosphate, diallyl ethyl phosphate, and triallyl phosphate; compounds having a propargyl group, such as propargyl dimethyl phosphate, propargyl diethyl phosphate, dipropargyl methyl phosphate, dipropargyl ethyl phosphate, and tripropargyl phosphate; compounds having a 2-acryloyloxymethyl group, such as 2-acryloyloxymethyl dimethyl phosphate, 2-acryloyloxymethyl diethyl phosphate, bis(2-acryloyloxymethyl)methyl phosphate, bis(2-acryloyloxymethyl)ethyl phosphate, and tris(2-acryloyloxymethyl) phosphate; and compounds having a 2-acryloyloxyethyl group, such as 2-acryloyloxyethyl dimethyl phosphate, 2-acryloyloxyethyl diethyl phosphate, bis(2-acryloyloxyethyl)methyl phosphate, bis(2-acryloyloxyethyl)ethyl phosphate, and tris(2-acryloyloxyethyl) phosphate.

<<Phosphonate Ester>>

Examples of the phosphonate ester include trimethyl phosphonoformate, methyl diethylphosphonoformate, triethyl phosphonoformate, ethyl dimethylphosphonoformate, methyl bis(2,2,2-trifluoroethyl) phosphonoformate, ethyl bis(2,2,2-trifluoroethyl) phosphonoformate, trimethyl phosphonoacetate, methyl diethylphosphonoacetate, triethyl phosphonoacetate, ethyl dimethylphosphonoacetate, methyl bis(2,2,2-trifluoroethyl) phosphonoacetate, ethyl bis(2,2,2-trifluoroethyl) phosphonoacetate, allyl dimethylphosphonoacetate, allyl diethylphosphonoacetate, 2-propynyl dimethylphosphonoacetate, 2-propynyl diethylphosphonoacetate, trimethyl 3-phosphonopropionate, and methyl 3-(diethylphosphono) propionate.

Among these, triallyl phosphate, tris(2-acryloyloxyethyl) phosphate, trimethyl phosphonoacetate, triethyl phosphonoacetate, 2-propynyl dimethylphosphonoacetate, and 2-propynyl diethylphosphonoacetate are preferable in order to enhance battery characteristics.

Only one type of the phosphorus-containing organic compound may be used alone. Two or more types of the phosphorus-containing organic compounds may be used in any combination and ratio.

1-2-4. Organic Compound Having Cyano Group

The electrolytic solution according to the present invention may include an organic compound having a cyano group. The organic compound having a cyano group may be any organic compound that has at least one cyano group in the molecule, is preferably the compound represented by Formula (2-4-1) or (2-4-2), and is more preferably the compound represented by Formula (2-4-2). Note that, in the case where the organic compound having a cyano group is also a cyclic compound having plural ether linkages, the organic compound having a cyano group may be classified as a cyclic compound having plural ether linkages.

1-2-4-1. Compound Represented by Formula (2-4-1)

$$A^1\text{-CN} \tag{2-4-1}$$

(where $A^1$ represents a hydrocarbon group having 2 to 20 carbon atoms)

The molecular weight of the compound represented by Formula (2-4-1) is not limited. The molecular weight of the compound represented by Formula (2-4-1) is preferably 55 or more, is more preferably 65 or more, and is further preferably 80 or more; and is preferably 310 or less, is more preferably 185 or less, and is further preferably 155 or less. When the above molecular weight falls within the above range, the solubility of the compound represented by Formula (2-4-1) in the nonaqueous electrolytic solution may be readily maintained and the advantageous effects of the present invention may be readily produced. The method for producing the compound represented by Formula (2-4-1) is not limited. The compound represented by Formula (2-4-1) may be produced using an appropriate method selected from known methods.

Examples of the hydrocarbon group having 2 to 20 carbon atoms in Formula (2-4-1) include an alkyl group, an alkenyl group, an alkynyl group, and an aryl group. Preferable examples thereof include alkyl groups, such as an ethyl group, an n-propyl group, an iso-propyl group, an n-butyl group, a sec-butyl group, an iso-butyl group, a tert-butyl group, an n-pentyl group, a tert-amyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group; alkenyl groups, such as a vinyl group, a 1-propenyl group, an isopropenyl group, a 1-butenyl group, and a 1-pentenyl group; alkynyl groups, such as an ethynyl group, a 1-propynyl group, a 1-butynyl group, and a 1-pentynyl group; and aryl groups, such as a phenyl group, a tolyl group, an ethylphenyl group, an n-propylphenyl group, an i-propylphenyl group, an n-butylphenyl group, a sec-butylphenyl group, an i-butylphenyl group, a tert-butylphenyl group, a trifluoromethylphenyl group, a xylyl group, a benzyl group, a phenethyl group, a methoxyphenyl group, an ethoxyphenyl group, and a trifluoromethoxyphenyl group.

Among these, a linear or branched alkyl group having 2 to 15 carbon atoms and an alkenyl group having 2 to 4 carbon atoms are more preferable, a linear or branched alkyl group having 2 to 12 carbon atoms is further preferable, and a linear or branched alkyl group having 4 to 11 carbon atoms is particularly preferable in order to increase the proportion of cyano groups in the entire molecule and markedly enhance the battery characteristics.

Examples of the compound represented by Formula (2-4-1) include propionitrile, butyronitrile, pentanenitrile, hexanenitrile, heptanenitriles, octanenitrile, pelargononitrile, decanenitrile, undecanenitrile, dodecanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, and 2-hexenenitrile.

Among these, from the viewpoints of the stability of the compound, the battery characteristics, and productivity, pentanenitrile, octanenitrile, decanenitrile, dodecanenitrile, and crotononitrile are preferable; pentanenitrile, decanenitrile, dodecanenitrile, and crotononitrile are more preferable; and pentanenitrile, decanenitrile, and crotononitrile are preferable.

1-2-4-2. Compound Represented by Formula (2-4-2)

$$NC-A^2-CN \quad (2-4-2)$$

(where $A^2$ is an organic group that has 1 to 10 carbon atoms and is constituted by one or more atoms selected from the group consisting of a hydrogen atom, a carbon atom, a nitrogen atom, an oxygen atom, a sulfur atom, a phosphorus atom, and a halogen atom)

Examples of the organic group that has 1 to 10 carbon atoms and is constituted by one or more atoms selected from the group consisting of a hydrogen atom, a carbon atom, a nitrogen atom, an oxygen atom, a sulfur atom, a phosphorus atom, and a halogen atom include an organic group constituted by carbon atoms and hydrogen atoms and an organic group that may include a nitrogen atom, an oxygen atom, a sulfur atom, a phosphorus atom, or a halogen atom. Examples of the organic group that may include a nitrogen atom, an oxygen atom, a sulfur atom, a phosphorus atom, or a halogen atom include an organic group formed by replacing a part of the carbon atoms included in the skeleton of a group consisting of carbon atoms and hydrogen atoms with any of the above atoms and an organic group that has a substituent consisting of any of the above atoms.

The molecular weight of the compound represented by Formula (2-4-2) is not limited. The molecular weight of the compound represented by Formula (2-4-2) is preferably 65 or more, is more preferably 80 or more, and is further preferably 90 or more; and is preferably 270 or less, is more preferably 160 or less, and is further preferably 135 or less. When the above molecular weight falls within the above range, the solubility of the compound represented by Formula (2-4-2) in the nonaqueous electrolytic solution may be readily maintained and the advantageous effects of the present invention may be readily produced. The method for producing the compound represented by Formula (2-4-2) is not limited. The compound represented by Formula (2-4-2) may be produced using an appropriate method selected from known methods.

Examples of $A^2$ included in the compound represented by Formula (2-4-2) include an alkylene group and derivatives thereof, an alkenylene group and derivatives thereof, a cycloalkylene group and derivatives thereof, an alkynylene group and derivatives thereof, a cycloalkenylene group and derivatives thereof, an arylene group and derivatives thereof, a carbonyl group and derivatives thereof, a sulfonyl group and derivatives thereof, a sulfinyl group and derivatives thereof, a phosphonyl group and derivatives thereof, a phosphinyl group and derivatives thereof, an amide group and derivatives thereof, an imide group and derivatives thereof, an ether group and derivatives thereof, a thioether group and derivatives thereof, a borinic acid group and derivatives thereof, and a borane group and derivatives thereof.

Among these, an alkylene group and derivatives thereof, an alkenylene group and derivatives thereof, a cycloalkylene group and derivatives thereof, an alkynylene group and derivatives thereof, and an arylene group and derivatives thereof are preferable in order to enhance the battery characteristics. It is more preferable that $A^2$ be an alkylene group that has 2 to 5 carbon atoms and may have a substituent.

Examples of the compound represented by Formula (2-4-2) include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy) dipropionitrile, 3,3'-(ethylenedithio)dipropionitrile, and 3,9-bis(2-cyanoethyl)-2,4,8,10-tetraoxaspiro[5,5]undecane.

Among these, malononitrile, succinonitrile, glutaronitrile, adiponitrile, pimelonitrile, suberonitrile, azelanitrile, sebaconitrile, undecanedinitrile, dodecanedinitrile, and 3,9-bis(2-cyanoethyl)-2,4,8,10-tetraoxaspiro[5,5]undecane, and fumaronitrile are preferable in order to enhance high-temperature storage endurance characteristics. Succinonitrile, glutaronitrile, adiponitrile, pimelonitrile, suberonitrile, glutaronitrile, and 3,9-bis(2-cyanoethyl)-2,4,8,10-tetraoxaspiro[5,5]undecane are more preferable because they markedly enhance the high-temperature storage endurance characteristics and reduce the degradation caused by the side reactions that occur on the electrodes. Normally, the lower the molecular weight of a dinitrile compound, the higher the proportion of a cyano group in the molecule and the higher the viscosity of the molecule. On the other hand, the higher the molecular weight of a dinitrile compound, the higher the boiling point of the compound. Therefore, in order to enhance the work efficiency, succinonitrile, glutaronitrile, adiponitrile, and pimelonitrile are further preferable.

Only one type of the organic compound having a cyano group may be used alone. Two or more types of the organic compounds having a cyano group may be used in any combination and ratio.

1-2-5. Organic Compound Having Isocyanate Group

The electrolytic solution according to the present invention may include an organic compound having an isocyanate group. The organic compound having an isocyanate group may be any organic compound having at least one isocyanate group in the molecule. The number of the isocyanate groups per molecule is preferably 1 or more and 4 or less, is more preferably 2 or more and 3 or less, and is further preferably 2.

When the electrolytic solution according to the present invention includes the compound having an isocyanate group in combination with the compound represented by Formula (1), the endurance characteristics of a battery that includes the electrolytic solution may be improved.

Examples of the organic compound having an isocyanate group include the following compounds:

organic compounds having one isocyanate group, such as methyl isocyanate, ethyl isocyanate, propyl isocyanate, isopropyl isocyanate, and butyl isocyanate; and organic compounds having two isocyanate groups, such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,2-bis(isocyanatomethyl)cyclohexane, 1,3-bis(isocyanatomethyl)cyclohexane, 1,4-bis(isocyanatomethyl)cyclohexane, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate, and 2,4,4-trimethylhexamethylene diisocyanate.

Among these, organic compounds having two isocyanate groups, such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, 2,2,4-trimethylhexamethylene diisocyanate, and 2,4,4-trimethylhexamethylene diisocyanate, are preferable in order to enhance storage characteristics. Hexamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, 2,2,4-trimethylhexamethylene diisocyanate, and 2,4,4-trimethylhexamethylene diisocyanate are more preferable. 1,3-Bis(isocyanatomethyl)cyclohexane, dicyclohexylmethane-4,4'-diisocyanate, bicyclo[2.2.1]heptane-2,5-diylbis(methylisocyanate), and bicyclo[2.2.1]heptane-2,6-diylbis(methylisocyanate) are further preferable.

Only one type of the organic compound having an isocyanate group may be used alone. Two or more types of the organic compounds having an isocyanate group may be used in any combination and ratio.

1-2-6. Silicon-Containing Compound

The electrolytic solution according to the present invention may include a silicon-containing compound. The silicon-containing compound may be any compound having at least one silicon atom in the molecule. When the electrolytic solution according to the present invention includes the silicon-containing compound in combination with the compound represented by Formula (1), endurance characteristics may be improved.

Examples of the silicon-containing compound include the following compounds:

boric acid compounds, such as tris(trimethylsilyl) borate, tris(trimethoxysilyl) borate, tris(triethylsilyl) borate, tris(triethoxysilyl) borate, tris(dimethylvinylsilyl) borate, and tris(diethylvinylsilyl) borate; phosphoric acid compounds, such as tris(trimethylsilyl) phosphate, tris(triethylsilyl) phosphate, tris(tripropylsilyl) phosphate, tris(triphenylsilyl) phosphate, tris(trimethoxysilyl) phosphate, tris(triethoxysilyl) phosphate, tris(triphenoxysilyl) phosphate, tris(dimethylvinylsilyl) phosphate, and tris(diethylvinylsilyl) phosphate; phosphorous acid compounds, such as tris(trimethylsilyl) phosphite, tris(triethylsilyl) phosphite, tris(tripropylsilyl) phosphite, tris(triphenylsilyl) phosphite, tris(trimethoxysilyl) phosphite, tris(triethoxysilyl) phosphite, tris(triphenoxysilyl) phosphite, tris(dimethylvinylsilyl) phosphite, and tris(diethylvinylsilyl) phosphite; sulfonic acid compounds, such as trimethylsilyl methanesulfonate and trimethylsilyl tetrafluoromethanesulfonate; and disilane compounds, such as hexamethyldisilane, hexaethyldisilane, 1,1,2,2-tetramethyldisilane, 1,1,2,2-tetraethyldisilane, 1,2-diphenyltetramethyldisilane, and 1,1,2,2-tetraphenyldisilane.

Among these, tris(trimethylsilyl) borate, tris(trimethylsilyl) phosphate, tris(trimethylsilyl) phosphite, trimethylsilyl methanesulfonate, trimethylsilyl tetrafluoromethanesulfonate, hexamethyldisilane, hexaethyldisilane, 1,2-diphenyltetramethyldisilane, and 1,1,2,2-tetraphenyldisilane are preferable. Tris(trimethylsilyl) borate, tris(trimethylsilyl) phosphate, tris(trimethylsilyl) phosphite, and hexamethyldisilane are more preferable.

Only one type of the silicon-containing compound may be used alone. Two or more types of the silicon-containing compounds may be used in any combination and ratio.

1-2-7. Aromatic Compound

The electrolytic solution according to the present invention may include an aromatic compound. The aromatic compound may be any organic compound that has at least one aromatic ring in the molecule and is preferably the aromatic compound represented by Formula (2-7-1) or (2-7-2).

1-2-7-1. Aromatic Compound Represented by Formula (2-7-1)

[Chem. 14]

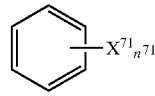

(2-7-1)

(where the substituent $X^{71}$ represents a halogen atom or an organic group that may have a halogen atom or a hetero atom. Examples of the organic group having a hetero atom include a linear, branched, or cyclic saturated hydrocarbon group having 1 to 12 carbon atoms, a group having a carboxylate ester structure, and a group having a carbonate structure. The number $n^{71}$ of the substituents $X^{71}$ is 1 to 6. When the aromatic compound has plurality substituents, the substituents may be identical to or different from one another and may form a ring)

Among these, a linear, branched, or cyclic saturated hydrocarbon group having 3 to 12 carbon atoms and a group having a carboxylate ester structure are preferable from the viewpoint of the battery characteristics.

The number $n^{71}$ of the substituents $X^{71}$ is preferably 1 to 5, is more preferably 1 to 3, is further preferably 1 or 2, and is particularly preferably 1.

$X^{71}$ represents a halogen atom or an organic group that may include a halogen atom or a hetero atom.

Examples of the halogen atom include chlorine and fluorine. The halogen atom is preferably fluorine.

Examples of the organic group that does not have a hetero atom include linear, branched, and cyclic saturated hydrocarbon groups having 3 to 12 carbon atoms. The linear or branched saturated hydrocarbon group may have a ring structure. Specific examples of the linear, branched, and cyclic saturated hydrocarbon groups having 1 to 12 carbon atoms include a methyl group, an ethyl group, a propyl group, an isopropyl group, a cyclopentyl group, and a cyclohexyl group. The number of carbon atoms is preferably 3 to 12, is more preferably 3 to 10, is further preferably 3 to 8, is further more preferably 3 to 6, and is most preferably 3 to 5.

Examples of the hetero atom constituting the organic group having a hetero atom include an oxygen atom, a sulfur atom, a phosphorus atom, and a silicon atom. Examples of an organic group having an oxygen atom include a group having a carboxylate ester structure and a group having a carbonate structure. Examples of an organic group having a sulfur atom include a group having a sulfonate ester structure. Examples of an organic group having a phosphorus atom include a group having a phosphate ester structure and a group having a phosphonate ester structure. Examples of an organic group having a silicon atom include a group having a silicon-carbon structure.

Examples of the aromatic compound represented by Formula (2-7-1) include the following compounds:

Examples of the aromatic compound represented by Formula (2-7-1) in which $X^{71}$ is a halogen atom or an organic group that may have a halogen atom include chlorobenzene, fluorobenzene, difluorobenzene, trifluorobenzene, tetrafluorobenzene, pentafluorobenzene, hexafluorobenzene, and benzotrifluoride. Fluorobenzene and hexafluorobenzene are preferable. For example, fluorobenzene is more preferable.

Examples of the aromatic compound represented by Formula (2-7-1) in which $X^{71}$ is a hydrocarbon group having 1 to 12 carbon atoms include 2,2-diphenylpropane, cyclopentylbenzene, cyclohexylbenzene, 1,1-diphenylcyclohexane, tert-butylbenzene, and tert-amylbenzene. Cyclohexylbenzene, tert-butylbenzene, and tert-amylbenzene are preferable.

Examples of the aromatic compound represented by Formula (2-7-1) in which $X^{71}$ is a group having a carboxylate ester structure include phenyl acetate, benzyl acetate, 2-phenylethyl acetate, methyl phenylacetate, ethyl phenylacetate, methyl 2,2-dimethyl-phenylacetate, and ethyl 2,2-dimethyl-phenylacetate. For example, methyl 2,2-dimethyl-phenylacetate and ethyl 2,2-dimethyl-phenylacetate are preferable.

Examples of the aromatic compound represented by Formula (2-7-1) in which $X^{71}$ is a group having a carbonate structure include diphenyl carbonate and methyl phenyl carbonate. For example, methyl phenyl carbonate is preferable.

1-2-7-2. Aromatic Compound Represented by Formula (2-7-2)

[Chem. 15]

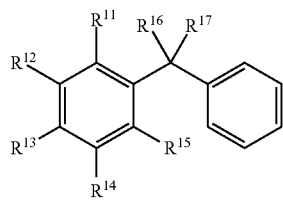

(2-7-2)

(where $R^{11}$ to $R^{15}$ each independently represent hydrogen, a halogen, or an unsubstituted or halogen-substituted hydrocarbon group having 1 to 20 carbon atoms; $R^{16}$ and $R^{17}$ each independently represent a hydrocarbon group having 1 to 12 carbon atoms; and at least two of $R^{11}$ to $R^{17}$ may be bonded to one another to form a ring. Formula (2-7-2) satisfies at least one of the following conditions (A) and (B):

(A) at least one of $R^{11}$ to $R^{15}$ is a halogen or an unsubstituted or halogen-substituted hydrocarbon group having 1 to 20 carbon atoms (B) the total number of carbon atoms included in $R^{11}$ to $R^{17}$ is 3 to 20)

In the case where at least two of $R^{11}$ to $R^{17}$ are bonded to one another to form a ring, it is preferable that two of $R^{11}$ to $R^{17}$ be bonded to each other to form a ring.

$R^{16}$ and $R^{17}$ each independently represent a hydrocarbon group having 1 to 12 carbon atoms (e.g., an alkyl group or an aryl group). $R^{16}$ and $R^{17}$ may be bonded to each other to form a ring (e.g., a cyclic group that is a hydrocarbon group). In order to enhance initial efficiency, solubility, and storage characteristics, it is preferable that $R^{16}$ and $R^{17}$ represent a hydrocarbon group having 1 to 12 carbon atoms or $R^{16}$ and $R^{17}$ be bonded to each other to form a cyclic group that is a hydrocarbon group. It is more preferable that $R^{16}$ and $R^{17}$ represent a methyl group or an ethyl group or $R^{16}$ and $R^{17}$ be bonded to each other to form a cyclohexyl group or a cyclopentyl group. It is further preferable that $R^{16}$ and $R^{17}$ represent a methyl group or an ethyl group or $R^{16}$ and $R^{17}$ be bonded to each other to form a cyclohexyl group.

$R^{11}$ to $R^{15}$ each independently represent hydrogen, a halogen, or an unsubstituted or halogen-substituted hydrocarbon group having 1 to 20 carbon atoms (e.g., an alkyl group, an aryl group, or an aralkyl group). Any two of $R^{11}$ to $R^{15}$ may be bonded to each other to form a ring (e.g., a cyclic group that is a hydrocarbon group). In order to enhance initial efficiency, solubility, and storage characteristics, it is preferable that $R^{11}$ to $R^{15}$ represent hydrogen, fluorine, or an unsubstituted or halogen-substituted hydrocarbon group having 1 to 12 carbon atom. It is more preferable that $R^{11}$ to $R^{15}$ represent hydrogen, fluorine, a tert-butyl group, or a 1-methyl-1-phenyl-ethyl group. It is further preferable that $R^{11}$ to $R^{15}$ represent hydrogen, a tert-butyl group, or a 1-methyl-1-phenyl-ethyl group.

One of $R^{11}$ to $R^{15}$ may be bonded to $R^{16}$ to form a ring (e.g., a cyclic group that is a hydrocarbon group). It is preferable that $R^{11}$ be bonded to $R^{16}$ to form a ring (e.g., a cyclic group that is a hydrocarbon group). In such a case, $R^{17}$ is preferably an alkyl group. Examples of the compound represented by (2-7-2) in which $R^{17}$ is a methyl group and $R^{11}$ is bonded to $R^{16}$ to form a ring include 1-phenyl-1,3,3-trimethylindan and 2,3-dihydro 1,3-dimethyl-1-(2-methyl-2-phenylpropyl)-3-phenyl-1H-indan.

Formula (2-7-2) satisfies at least one of the conditions (A) and (B):

(A) at least one of $R^{11}$ to $R^{15}$ is a halogen or an unsubstituted or halogen-substituted hydrocarbon group having 1 to 20 carbon atoms.

(B) the total number of carbon atoms included in $R^{11}$ to $R^{17}$ is 3 to 20.

Formula (2-7-2) preferably satisfies the condition (A) in order to limit the oxidation of the positive electrode which may occur within the range of normal battery operation voltage. Formula (2-7-2) preferably satisfies the condition (B) from the viewpoint of solubility in the electrolytic solution. Formula (2-7-2) may satisfy both conditions (A) and (B).

In regard to the condition (A), as long as at least one of $R^{11}$ to $R^{15}$ is a halogen or an unsubstituted or halogen-substituted hydrocarbon group having 1 to 20 carbon atoms, the others may be hydrogen atoms or may form a ring. From the viewpoint of solubility in the electrolytic solution, the number of carbon atoms included in the unsubstituted or halogen-substituted hydrocarbon group is preferably 1 to 10, is more preferably 1 to 5, is further preferably 1 to 3, is further more preferably 1 or 2, and is most preferably 1.

In regard to the condition (B), as long as the total number of carbon atoms included in $R^{11}$ to $R^{17}$ is 3 to 20, at least two of $R^{11}$ to $R^{17}$ may be bonded to one another to form a ring. In the case where at least two of $R^{11}$ to $R^{17}$ are bonded to one another to form a ring, a part of the carbon atoms constituting the ring which do not correspond to $R^{11}$ to $R^{17}$ (as for $R^{11}$ to $R^{15}$, the carbon atoms constituting the benzene ring to which $R^{11}$ to $R^{15}$ are bonded and, as for $R^{16}$ and $R^{17}$, the carbon atoms at the benzylic position) are not taken into account in the calculation of the total number of carbon atoms. The total number of the carbon atoms is preferably 3 to 14 and is more preferably 3 to 10 from the viewpoint of solubility in the electrolytic solution. For example, examples of the compound represented by (2-7-2) in which $R^{17}$ is a methyl group and $R^{11}$ is bonded to $R^{16}$ to form a ring include 1-phenyl-1,3,3-trimethylindan and 2,3-dihydro 1,3-dimethyl-1-(2-methyl-2-phenylpropyl)-3-phenyl-1H-indan. These compounds satisfy the condition (B).

Examples of the aromatic compound represented by Formula (2-7-2) include the following compounds:

compounds represented by (2-7-2) in which $R^{16}$ and $R^{17}$ each independently represent a hydrocarbon group having 1 to 20 carbon atoms (note that the total number of carbon atoms included in $R^{16}$ and $R^{17}$ is 3 to 20) and $R^{11}$ to $R^{15}$ are hydrogen atoms (these compounds satisfy the condition (B));

[Chem. 16]

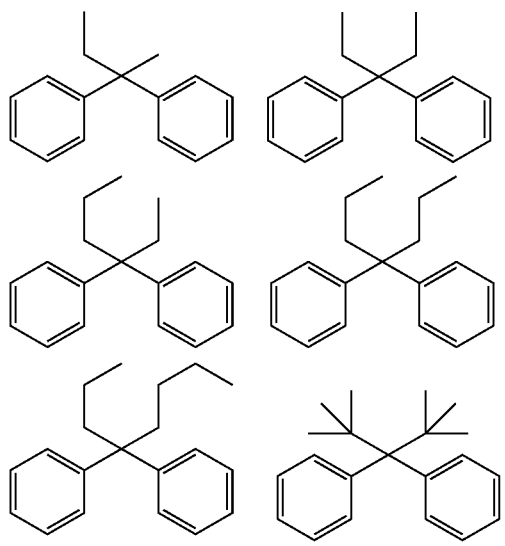

compounds represented by (2-7-2) in which $R^{16}$ and $R^{17}$ are bonded to each other to form a ring and $R^{11}$ to $R^{15}$ are hydrogen atoms (these compounds satisfy the condition (B));

[Chem. 17]

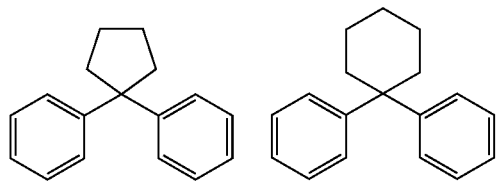

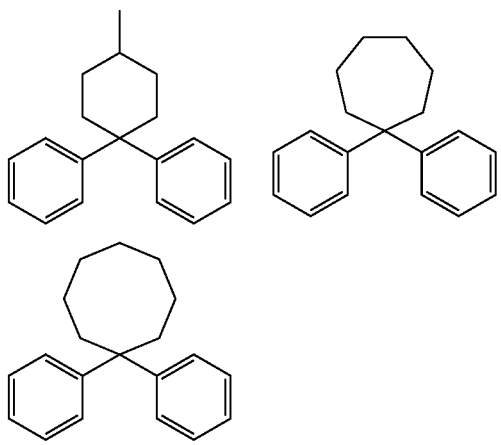

compounds represented by (2-7-2) in which at least one of $R^{11}$ to $R^{15}$ is a halogen or an unsubstituted or halogen-substituted hydrocarbon group having 1 to 20 carbon atoms (these compounds satisfy the condition (A)); and

[Chem. 18]

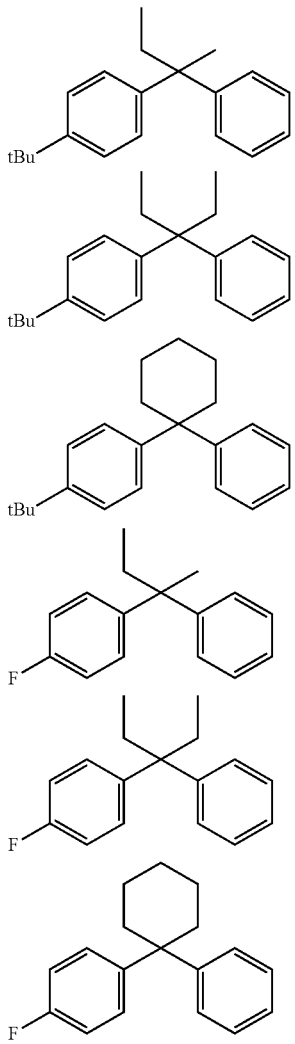

-continued
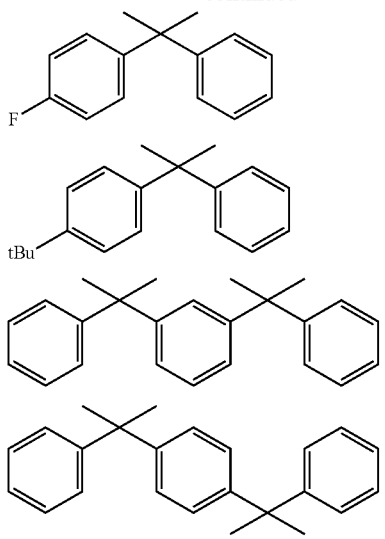
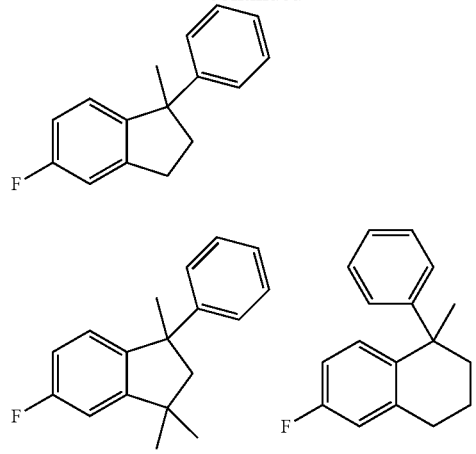
compounds represented by (2-7-2) in which $R^{17}$ is a hydrocarbon group having 1 to 20 carbon atoms (e.g., an alkyl group having 1 to 20 carbon atoms; preferably a methyl group) and $R^{11}$ and $R^{16}$ are bonded to each other to form a ring (these compounds satisfy the condition (B)).
[Chem. 19]
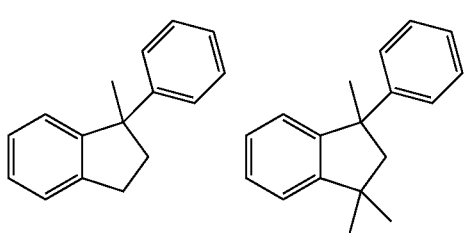
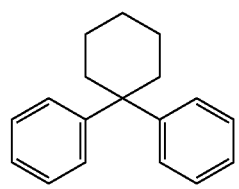
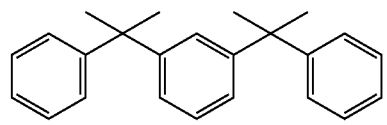
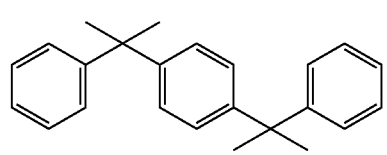
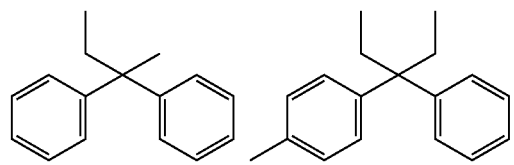
[Chem. 20]
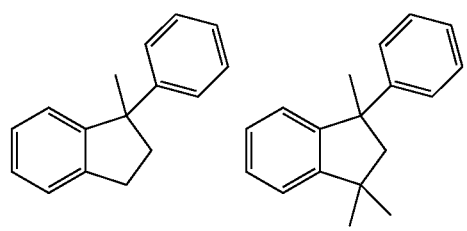
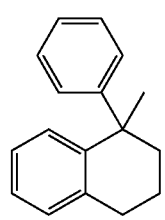

The following compounds are particularly preferable.

[Chem. 21]

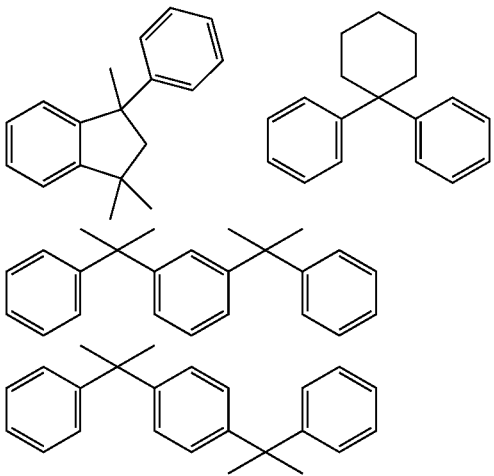

The following compound is most preferable.

[Chem. 22]

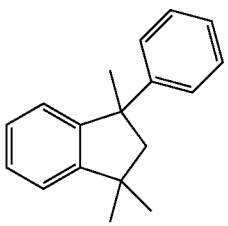

The above aromatic compounds may be used alone or in combination of two or more.

1-2-8. Cyclic Carbonate Having Unsaturated Carbon-Carbon Bond

The cyclic carbonate having an unsaturated carbon-carbon bond (hereinafter, may be referred to as "unsaturated cyclic carbonate") may be any unsaturated carbonate that is a cyclic carbonate having a carbon-carbon double bond or a carbon-carbon triple bond and is preferably a cyclic carbonate having a carbon-carbon double bond. Note that a cyclic carbonate having an aromatic ring is classified as an unsaturated cyclic carbonate.

Examples of the unsaturated cyclic carbonate include vinylene carbonates; ethylene carbonates including a substituent having an aromatic ring, a carbon-carbon double bond, or a carbon-carbon triple bond; phenyl carbonates; vinyl carbonates; allyl carbonates; and catechol carbonates.

Examples of the vinylene carbonates include vinylene carbonate, methyl vinylene carbonate, 4,5-dimethyl vinylene carbonate, phenyl vinylene carbonate, 4,5-diphenyl vinylene carbonate, vinyl vinylene carbonate, 4,5-divinyl vinylene carbonate, allyl vinylene carbonate, 4,5-diallyl vinylene carbonate, 4-fluorovinylene carbonate, 4-fluoro-5-methyl vinylene carbonate, 4-fluoro-5-phenyl vinylene carbonate, 4-fluoro-5-vinyl vinylene carbonate, and 4-allyl-5-fluorovinylene carbonate.

Specific examples of the ethylene carbonates including a substituent having an aromatic ring, a carbon-carbon double bond, or a carbon-carbon triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, and 4-methyl-5-allylethylene carbonate.

Among these, examples of unsaturated cyclic carbonates that are particularly preferably used in combination include vinylene carbonate, methyl vinylene carbonate, 4,5-dimethyl vinylene carbonate, vinyl vinylene carbonate, 4,5-vinyl vinylene carbonate, allyl vinylene carbonate, 4,5-diallyl vinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate. Vinylene carbonate, vinylethylene carbonate, and ethynylethylene carbonate are preferable because they are capable of forming a further stable interface protective coating film. Vinylene carbonate and vinylethylene carbonate are more preferable. Vinylene carbonate is further preferable.

The method for producing the unsaturated cyclic carbonate is not limited. The unsaturated cyclic carbonate may be produced using an appropriate method selected from known methods.

Only one type of the unsaturated cyclic carbonate may be used alone. Two or more types of the unsaturated cyclic carbonates may be used in any combination and ratio. The amount of the unsaturated cyclic carbonate used is not limited and may be set such that the advantageous effects of the present invention are impaired significantly. The amount of the unsaturated cyclic carbonate used may be 0.001% by mass or more, is preferably 0.01% by mass or more, is more preferably 0.1% by mass or more, and is further preferably 0.5% by mass or more; and may be 10% by mass or less, is preferably 5% by mass or less, is more preferably 4% by mass or less, is further preferably 3% by mass or less, and is particularly preferably 2% by mass or less relative to 100% by mass of the nonaqueous electrolytic solution. When the content of the unsaturated cyclic carbonate falls within the above range, the cycle characteristics of the nonaqueous electrolytic solution secondary battery may be readily enhanced to a sufficient degree. Furthermore, the degradation of high-temperature storage characteristics, an increase in the amount of the gas generated, and a reduction in discharge capacity retention factor may be readily prevented.

The mass ratio between the compound represented by Formula (1) and the cyclic carbonate having an unsaturated carbon-carbon bond (when two or more types of the cyclic carbonates are used, the total amount thereof), that is, Compound represented by Formula (1):Cyclic carbonate having unsaturated carbon-carbon bond, may be 1:100 or more, is preferably 10:100 or more, is more preferably 20:100 or more, and is further preferably 25:100 or more; and may be 10000:100 or less, is preferably 500:100 or less, is more preferably 300:100 or less, is further preferably 100:100 or less, is particularly preferably 75:100 or less, and is most preferably 50:100 or less. When the above mass ratio falls within the above range, the battery characteristics and, in particular, endurance characteristics may be markedly enhanced. The mechanisms are not clear; it is considered that mixing the compound represented by Formula (1) with the above cyclic carbonate at the above mass ratio minimizes the side reactions of the additives which occur on the electrodes.

1-2-9. Fluorine-Free Carboxylate Ester

The electrolytic solution according to the present invention may include a fluorine-free carboxylate ester. When the electrolytic solution according to the present invention includes the fluorine-free carboxylate ester in combination with the compound represented by Formula (1), endurance characteristics may be improved. The fluorine-free carboxylate ester may be any carboxylate ester that does not have any fluorine atom in the molecule, is preferably a fluorine-free chain carboxylate ester, and is more preferably a fluorine-free saturated chain carboxylate ester. The total number of carbon atoms included in the fluorine-free chain carboxylate ester is preferably 3 or more, is more preferably 4 or more, and is further preferably 5 or more; and is preferably 7 or less, is more preferably 6 or less, and is further preferably 5 or less.

Examples of the fluorine-free chain carboxylate ester include saturated chain carboxylate esters, such as methyl acetate, ethyl acetate, n-propyl acetate, methyl propionate, ethyl propionate, n-propyl propionate, methyl isobutyrate, ethyl isobutyrate, n-propyl isobutyrate, methyl pivalate, ethyl pivalate, and n-propyl pivalate; and unsaturated chain carboxylate esters, such as methyl acrylate, ethyl acrylate, n-propyl acrylate, methyl methacrylate, ethyl methacrylate, and n-propyl methacrylate.

Among these, methyl acetate, ethyl acetate, n-propyl acetate, methyl propionate, ethyl propionate, n-propyl propionate, methyl pivalate, ethyl pivalate, and n-propyl pivalate are preferable in order to reduce the side reaction that occurs on the negative electrode. Methyl acetate, ethyl acetate, n-propyl acetate, methyl propionate, ethyl propionate, and n-propyl propionate are more preferable in order to reduce the viscosity of the electrolytic solution and thereby increase ionic conductivity. Methyl acetate, methyl propionate, ethyl propionate, and n-propyl propionate are further preferable. Methyl acetate, ethyl propionate, and n-propyl propionate are particularly preferable.

Only one type of the fluorine-free carboxylate ester may be used alone. Two or more types of the fluorine-free carboxylate esters may be used in any combination and ratio.

The amount of the fluorine-free carboxylate ester (when two or more types of the fluorine-free carboxylate esters are used, the total amount thereof) used may be 0.001% by mass or more, is preferably 0.01% by mass or more, is more preferably 0.1% by mass or more, is further preferably 0.3% by mass or more, and is particularly preferably 0.6% by mass or more; and may be 10% by mass or less, is preferably 5% by mass or less, is more preferably 3% by mass or less, is further preferably 2% by mass or less, and is particularly preferably 1% by mass or less relative to 100% by mass of the electrolytic solution. In the case where the fluorine-free carboxylate ester is used as a nonaqueous solvent, the amount of the fluorine-free carboxylate ester used is preferably 1% by volume or more, is more preferably 5% by volume or more, is further preferably 10% by volume or more, and is further more preferably 20% by volume or more; and may be 50% by volume or less, is more preferably 45% by volume or less, and is further preferably 40% by volume or less relative to 100% by mass of the nonaqueous solvent. When the content of the fluorine-free carboxylate ester falls within the above range, an increase in the resistance of the negative electrode may be limited and output characteristics, rate characteristics, low-temperature characteristics, cycle characteristics, and high-temperature storage characteristics may be readily controlled.

The mass ratio between the compound represented by Formula (1) and the fluorine-free carboxylate ester, that is, Compound represented by Formula (1):Fluorine-free carboxylate ester, may be 1:100 or more, is preferably 10:100 or more, is more preferably 20:100 or more, and is further preferably 25:100 or more; and may be 10000:100 or less, is preferably 500:100 or less, is more preferably 300:100 or less, is further preferably 100:100 or less, is particularly preferably 75:100 or less, and is most preferably 50:100 or less. When the above mass ratio falls within the above range, the battery characteristics and, in particular, endurance characteristics may be markedly enhanced. The mechanisms are not clear; it is considered that mixing the compound represented by Formula (1) with the above fluorine-free carboxylate ester at the above mass ratio minimizes the side reactions of the additives which occur on the electrodes.

1-2-10. Cyclic Compound Having Plural Ether Linkages

The cyclic compound having plural ether linkages may be any cyclic compound having plural ether linkages in the molecule and is preferably the compound represented by Formula (2-10). The cyclic compound having plural ether linkages may enhance the high-temperature storage characteristics of the battery. When the electrolytic solution according to the present invention includes the cyclic compound having plural ether linkages in combination with the compound represented by Formula (1), the endurance characteristics of a battery that includes the electrolytic solution may be improved.

[Chem. 23]

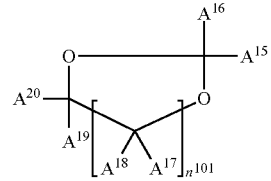

(2-10)

(where $A^{15}$ to $A^{20}$ each independently represent a hydrogen atom, a fluorine atom, or a hydrocarbon group that has 1 to 5 carbon atoms and may have a substituent; $n^{101}$ is an integer of 1 to 4; and when $n^{101}$ is an integer of 2 or more, the plural $A^{17}$ or $A^{18}$ groups may be identical to or different from one another)

Any two of $A^{15}$ to $A^{20}$ may be bonded to each other to form a ring. In such a case, it is preferable that $A^{17}$ and $A^{18}$ form a ring structure. The total number of carbon atoms included in $A^{15}$ to $A^{20}$ is preferably 0 to 8, is more preferably 0 to 4, is further preferably 0 to 2, and is particularly preferably 0 or 1.

Examples of the substituent include a halogen atom; an alkyl group, an alkenyl group, an alkynyl group, an aryl group, and an alkoxy group that may be substituted with a fluorine atom; and a cyano group, an isocyanato group, an ether group, a carbonate group, a carbonyl group, a carboxyl group, an alkoxycarbonyl group, an acyloxy group, a sulfonyl group, a phosphanetriyl group, and a phosphoryl group. Among these, a halogen atom and an alkoxy group; an alkyl group, an alkenyl group, and an alkynyl group that may be substituted with a fluorine atom; and an isocyanato group, a cyano group, an ether group, a carbonyl group, an alkoxycarbonyl group, and an acyloxy group are preferable. An alkyl group that is not substituted with a fluorine atom, a cyano group, and an ether group are more preferable.

In Formula (2-10), $n^{101}$ is preferably an integer of 1 to 3 and is more preferably an integer of 1 or 2. $n^{101}$ is further preferably 2.

Examples of the hydrocarbon group having 1 to 5 carbon atoms represented by $A^{15}$ to $A^{20}$ include monovalent hydrocarbon groups, such as an alkyl group, an alkenyl group, an alkynyl group, and an aryl group; and divalent hydrocarbon groups, such as an alkylene group, an alkenylene group, an alkynylene group, and an arylene group. Among these, an alkyl group and an alkylene group are preferable, and an alkyl group is more preferable. Specific examples thereof include alkyl groups having 1 to 5 carbon atoms, such as a methyl group, an ethyl group, an n-propyl group, an i-propyl group, an n-butyl group, a sec-butyl group, an i-butyl group, a tert-butyl group, an n-pentyl group, an isopentyl group, a sec-pentyl group, an neopentyl group, a 1-methylbutyl group, a 2-methylbutyl group, a 1,1-dimethylpropyl group, and a 1,2-dimethylpropyl group; alkenyl groups having 2 to 5 carbon atoms, such as a vinyl group, a 1-propenyl group, a 2-propenyl group, an isopropenyl group, a 1-butenyl group, a 2-butenyl group, a 3-butenyl group, a 1-pentenyl group, a 2-pentenyl group, a 3-pentenyl group, and a 4-pentenyl group; alkynyl groups having 2 to 5 carbon atoms, such as an ethynyl group, a 1-propynyl group, a 2-propynyl group, a 1-butynyl group, a 2-butynyl group, a 3-butynyl group, a 1-pentynyl group, a 2-pentynyl group, a 3-pentynyl group, and a 4-pentynyl group; alkylene groups having 1 to 5 carbon atoms, such as a methylene group, an ethylene group, a trimethylene group, a tetramethylene group, and a pentamethylene group; alkenylene groups having 2 to 5 carbon atoms, such as a vinylene group, a 1-propenylene group, a 2-propenylene group, a 1-butenylene group, a 2-butenylene group, a 1-pentenylene group, and a 2-pentenylene group; and alkynylene groups having 2 to 5 carbon atoms, such as an ethynylene group, a propynylene group, a 1-butynylene group, a 2-butynylene group, a 1-pentynylene group, and a 2-pentynylene group. Among these, alkylene groups having 1 to 5 carbon atoms, such as a methylene group, an ethylene group, a trimethylene group, a tetramethylene group, and a pentamethylene group, are preferable. Alkylene groups having 2 to 5 carbon atoms, such as an ethylene group, a trimethylene group, a tetramethylene group, and a pentamethylene group, are more preferable. For example, alkylene groups having 3 to 5 carbon atoms, such as a trimethylene group, a tetramethylene group, and a pentamethylene group, are further preferable.

The hydrogen atom, the fluorine atom, and the hydrocarbon group having 1 to 5 carbon atoms represented by $A^{15}$ to $A^{20}$ are a hydrogen atom, a fluorine atom, and a group consisting of the above-described substituent and the above-described hydrocarbon group having 1 to 5 carbon atoms. $A^{15}$ to $A^{20}$ preferably represent a hydrogen atom, a hydrocarbon group that has 1 to 5 carbon atoms and no substituent, or an alkylene group having an ether structure formed by replacing a part of the carbon chain of an alkylene group with an ether group and more preferably represent a hydrogen atom.

Examples of the cyclic compound having plural ether linkages include the following compounds.

[Chem. 24]

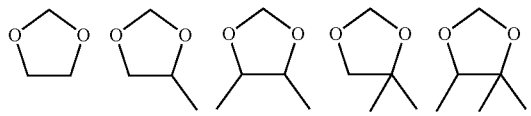

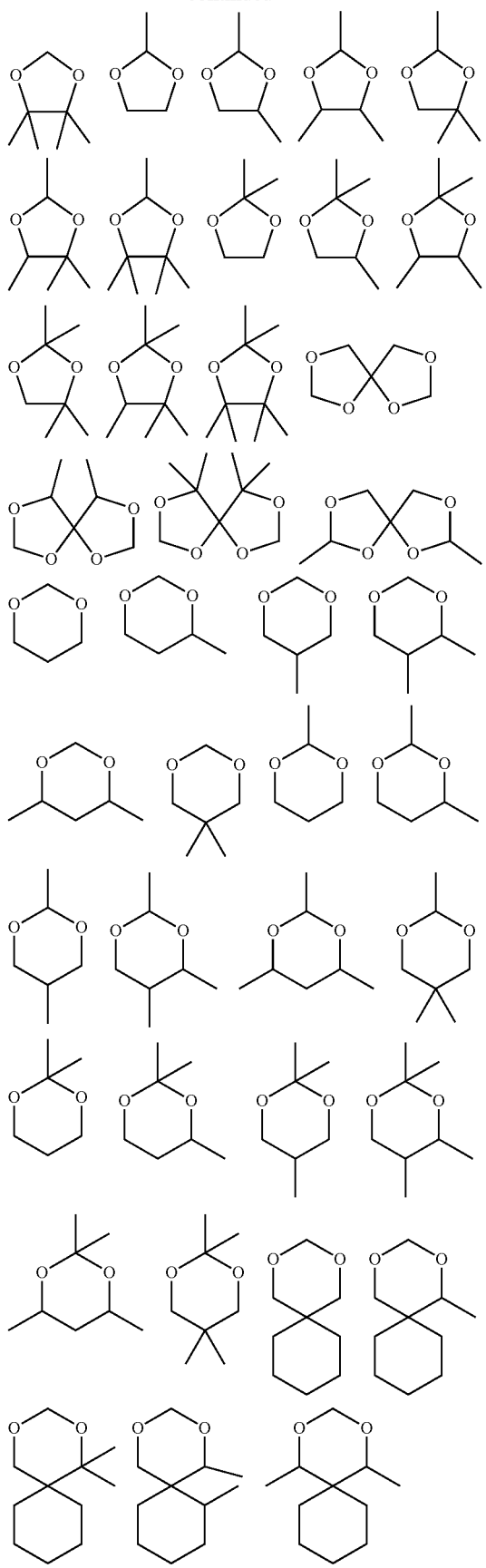

-continued

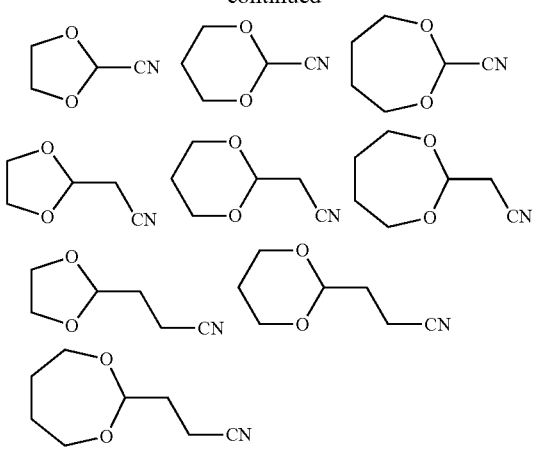

Among these, for example, the following compounds are preferable.

[Chem. 25]

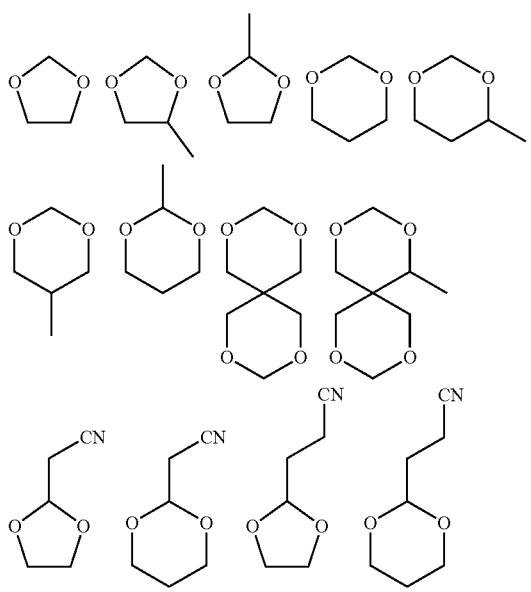

The following compounds are more preferable.

[Chem. 26]

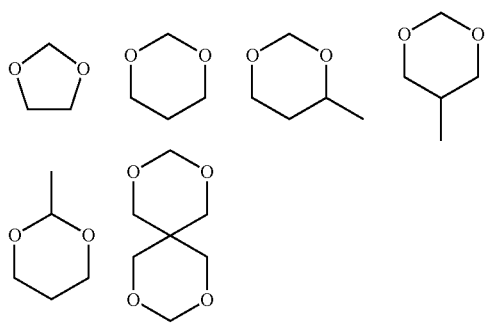

Only one type of the cyclic compound having plural ether linkages may be used alone. Two or more types of the cyclic compounds having plural ether linkages may be used in any combination and ratio.

1-2-11. Compound Having Isocyanuric Acid Skeleton

The electrolytic solution according to the present invention may further include a compound having an isocyanuric acid skeleton. The compound having an isocyanuric acid skeleton may be any organic compound that has at least one isocyanuric acid skeleton in the molecule. A battery that includes the electrolytic solution according to the present invention which includes the compound having an isocyanuric acid skeleton may have improved endurance characteristics.

Examples of the compound having an isocyanuric acid skeleton include compounds having the following structures.

[Chem. 27]

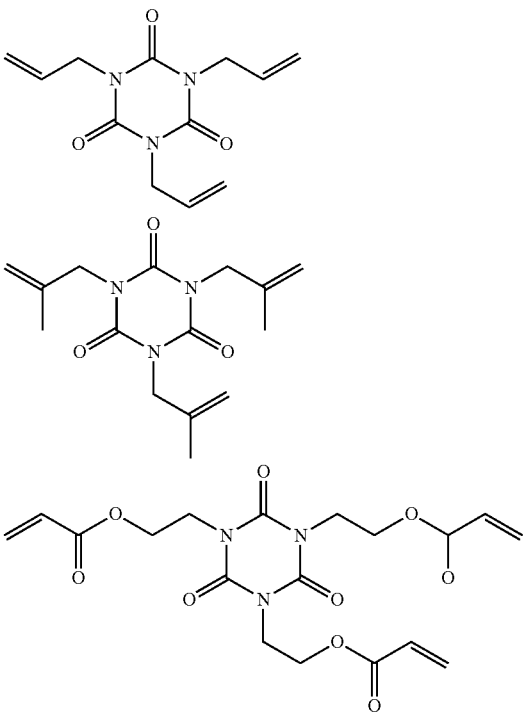

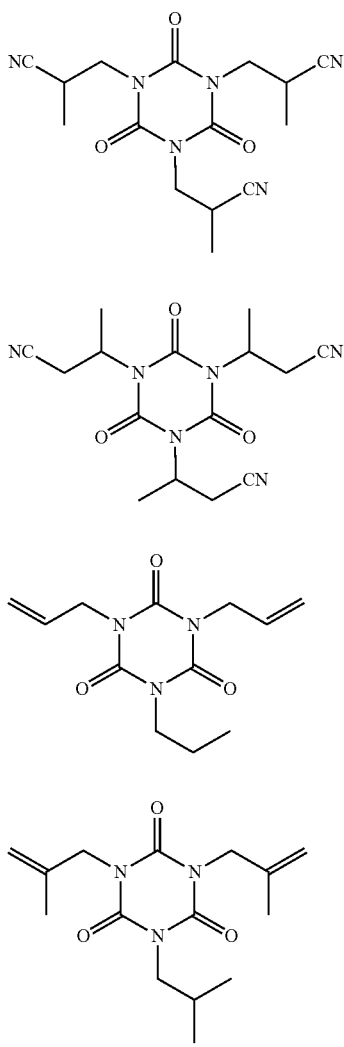

Compounds having the following structures are preferable.

[Chem. 28]

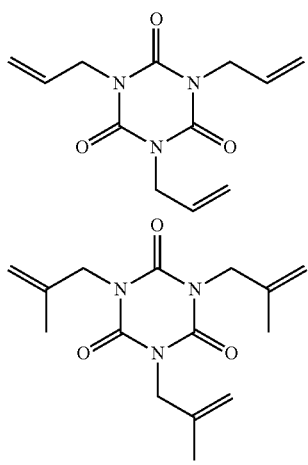

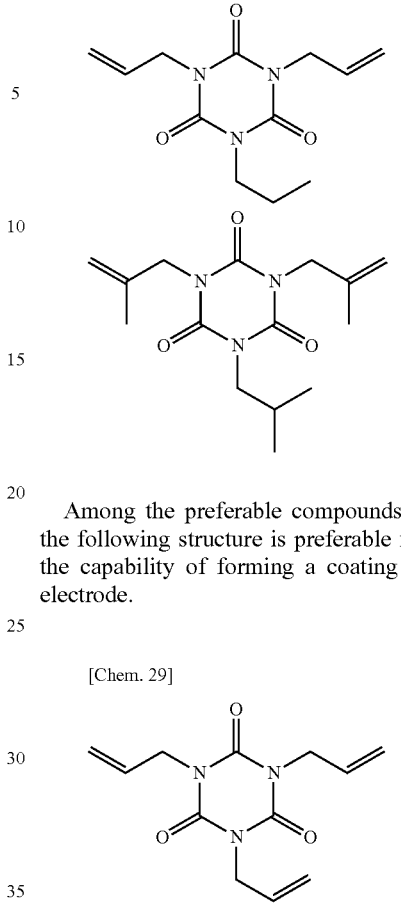

Among the preferable compounds, a compound having the following structure is preferable from the viewpoint of the capability of forming a coating film on the negative electrode.

[Chem. 29]

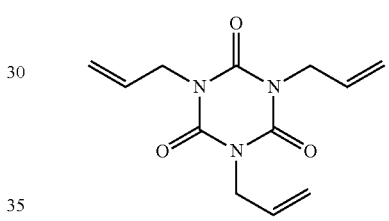

Only one type of the compound having an isocyanuric acid skeleton may be used alone. Two or more types of the compounds having an isocyanuric acid skeleton may be used in any combination and ratio.

1-2-12. Monofluorophosphate Salt and Difluorophosphate Salt

The electrolytic solution according to the present invention may further include a monofluorophosphate salt and a difluorophosphate salt. The monofluorophosphate salt may be any salt having at least one monofluorophosphoric acid structure in the molecule. The difluorophosphate salt may be any salt having at least one difluorophosphoric acid structure in the molecule. When the electrolytic solution according to the present invention includes one or more salts selected from the monofluorophosphate salt and the difluorophosphate salt in combination with the compound represented by Formula (1), the endurance characteristics of a battery that includes the electrolytic solution may be improved.

The countercation for the monofluorophosphate salt and the difluorophosphate salt is not limited. Examples of the countercation include lithium, sodium, potassium, magnesium, calcium, and ammonium represented by $NR^{121}R^{122}R^{123}R^{124}$ (where $R^{121}$ to $R^{124}$ each independently represent a hydrogen atom or an organic group having 1 to 12 carbon atoms). The organic group included in the ammonium which has 1 to 12 carbon atoms and is represented by $R^{121}$ to $R^{124}$ is not limited. Examples of the organic group include an alkyl group that may be substituted with a fluorine atom, a cycloalkyl group that may be substituted with a halogen atom or an alkyl group, an aryl group that may be substituted with a halogen atom or an alkyl group, and a nitrogen atom-containing heterocyclic group that may have a substituent. Among these, $R^{121}$ to $R^{124}$ preferably each independently represent a hydrogen atom, an alkyl group, a cycloalkyl group, or a nitrogen atom-containing heterocyclic group. The countercation is preferably lithium, sodium, or potassium. Among these, lithium is preferable.

Examples of the monofluorophosphate salt and the difluorophosphate salt include lithium monofluorophosphate, sodium monofluorophosphate, potassium monofluorophosphate, lithium difluorophosphate, sodium difluorophosphate, and potassium difluorophosphate. Lithium monofluorophosphate and lithium difluorophosphate are preferable. Lithium difluorophosphate is more preferable.

Only one type of the monofluorophosphate salt or the difluorophosphate salt may be used alone. Two or more types of the monofluorophosphate salts and the difluorophosphate salts may be used in any combination and ratio.

The amount of one or more salts selected from the monofluorophosphate salt and the difluorophosphate salt used (when two or more types of the monofluorophosphate salts and the difluorophosphate salts are used, the total amount thereof) may be 0.001% by mass or more, is preferably 0.01% by mass or more, is more preferably 0.1% by mass or more, is further preferably 0.2% by mass or more, and is particularly preferably 0.3% by mass or more; and may be 5% by mass or less, is preferably 3% by mass or less, is more preferably 2% by mass or less, is further preferably 1.5% by mass or less, and is particularly preferably 1% by mass or less. When the above content falls within the above range, initial irreversible capacity may be markedly increased.

The mass ratio between the compound represented by Formula (1) and one or more salts selected from the monofluorophosphate salt and the difluorophosphate salt (when two or more types of the monofluorophosphate salts and the difluorophosphate salts are used, the total amount thereof), that is, Compound represented by Formula (1):Monofluorophosphate salt and Difluorophosphate salt, is preferably 1:99 to 99:1, is more preferably 10:90 to 90:10, and is particularly preferably 20:80 to 80:20. When the above mass ratio falls within the above range, the intended characteristics of the battery may be enhanced without degrading the other battery characteristics.

1-2-13. Borate Salt

The electrolytic solution according to the present invention may further include a borate salt. The borate salt may be any salt that has at least one boron atom in the molecule. Note that a borate salt that can be classified as an oxalate salt is classified not as "1-2-13. Borate Salt" but as "1-2-14. Oxalate Salt" below. When the electrolytic solution according to the present invention includes the borate salt in combination with the compound represented by Formula (1), the endurance characteristics of a battery that includes the electrolytic solution may be improved.

Examples of the countercation for the borate salt include lithium, sodium, potassium, magnesium, calcium, rubidium, cesium, and barium. Among these, lithium is preferable.

As a borate salt, a lithium salt is preferably used and a lithium salt containing boric acid may also be suitably used. Examples thereof include $LiBF_4$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$. Among these, $LiBF_4$ is more preferable because it may enhance initial charge-discharge efficiency, high-temperature cycle characteristics, etc.

Only one type of the borate salt may be used alone. Two or more types of the borate salts may be used in any combination and ratio.

The content of the borate salt used (when two or more types of the borate salts are used, the total content thereof) may be 0.05% by mass or more, is preferably 0.1% by mass or more, is more preferably 0.2% by mass or more, is further preferably 0.3% by mass or more, and is particularly preferably 0.4% by mass or more; and may be 10.0% by mass or less, is preferably 5.0% by mass or less, is more preferably 3.0% by mass or less, is further preferably 2.0% by mass or less, and is particularly preferably 1.0% by mass or less. When the content of the borate salt used falls within the above range, the occurrence of the side reaction on the negative electrode of the battery may be reduced and an increase in resistance may be limited.

The mass ratio between the compound represented by Formula (1) and the borate salt, that is, Compound represented by Formula (1) (when two or more types of the compounds are used, the total amount thereof):Borate salt, is preferably 1:99 to 99:1, is more preferably 10:90 to 90:10, and is particularly preferably 20:80 to 80:20. When the above mass ratio falls within the above range, the occurrence of the side reactions on the positive and negative electrodes of the battery may be reduced and an increase in resistance may be limited.

In the case where the borate salt and $LiPF_6$ are used as electrolytes, the ratio of the molar content of the borate salt in the nonaqueous electrolytic solution to the molar content of $LiPF_6$ in the nonaqueous electrolytic solution is preferably 0.001 or more and 12 or less, is more preferably 0.01 to 1.1, is further preferably 0.01 to 1.0, and is more preferably 0.01 to 0.7. When the above ratio falls within the above range, the occurrence of the side reactions on the positive and negative electrodes of the battery may be reduced and the charge-discharge efficiency of the battery may be increased.

1-2-14. Oxalate Salt

The electrolytic solution according to the present invention may further include an oxalate salt. The oxalate salt may be any compound having at least one oxalic acid structure in the molecule. When the electrolytic solution according to the present invention includes the oxalate salt in combination with the compound represented by Formula (1), the endurance characteristics of a battery that includes the electrolytic solution may be improved.

The oxalate salt is preferably the metal salt represented by Formula (2-14-1). This salt is a salt that includes an oxalato complex as an anion.

[Chem. 30]

$$M^1{}_a[M^2(C_2O_4)_bR_c{}^{91}]_d \qquad (2\text{-}14\text{-}1)$$

(where $M^1$ is an element selected from the group consisting of Groups 1 and 2 of the Periodic Table and aluminum (Al); $M^2$ is an element selected from the group consisting of transition metals and Groups 13, 14, and 15 of the Periodic Table; $R^{91}$ is a group selected from the group consisting of a halogen, an alkyl group having 1 to 11 carbon atoms, and a halogen-substituted alkyl group having 1 to 11 carbon atoms; a and b are positive integers; c is 0 or a positive integer; and d is an integer of 1 to 3)

$M^1$ is preferably lithium, sodium, potassium, magnesium, or calcium and is particularly preferably lithium from the viewpoint of the characteristics of the lithium secondary battery that includes the electrolytic solution according to the present invention.

$M^2$ is particularly preferably boron or phosphorus from the viewpoint of the electrochemical stability produced when added to a lithium secondary battery.

Examples of $R^{91}$ include fluorine, chlorine, a methyl group, a trifluoromethyl group, an ethyl group, a pentafluoroethyl group, a propyl group, an isopropyl group, a butyl group, a sec-butyl group, and a tert-butyl group. Fluorine and a trifluoromethyl group are preferable.

Examples of the metal salt represented by Formula (2-14-1) include lithium oxalatoborate salts, such as lithium difluorooxalatoborate and lithium bis(oxalato)borate; and lithium oxalatophosphate salts, such as lithium tetrafluorooxalatophosphate, lithium difluorobis(oxalato)phosphate, and lithium tris(oxalato)phosphate. Among these, lithium bis(oxalato)borate and lithium difluorobis(oxalato)phosphate are preferable, and lithium bis(oxalato)borate is more preferable.

Only one type of the oxalate salt may be used alone. Two or more types of the oxalate salts may be used in any combination and ratio.

1-2-15. Sulfuric Acid Derivative Salt

The electrolytic solution according to the present invention may further include a sulfuric acid derivative salt.

The sulfuric acid derivative salt may be any salt that has at least one sulfuric acid derivative salt structure in the molecule. It is preferable that the sulfuric acid derivative salt have adequate degrees of stability and solubility in the electrolytic solution.

Examples of the common structure of the sulfuric acid derivative salt include a halosulfonate salt (halosulfate salt) having a monohalide structure of sulfuric acid; a sulfuric acid monoester salt having a hydrocarbon group that may have a substituent; and a sulfamate salt (amide sulfate) having a hydrocarbon group that may have a substituent. The halogen included in the halosulfonate salt is not limited; is preferably a chlorosulfonate salt or a fluorosulfonate salt; and is most preferably a fluorosulfonate salt. The hydrocarbon group that may have a substituent, which is included in the sulfuric acid monoester salt having a hydrocarbon group that may have a substituent and the sulfamate salt having a hydrocarbon group that may have a substituent, is not limited. An alkyl group that has 1 to 6 carbon atoms and may have a substituent is preferable, and an alkyl group that has 1 to 4 carbon atoms and may have a substituent is further preferable. An alkenyl group that has 2 to 6 carbon atoms and may have a substituent is preferable, and an alkenyl group that has 2 to 4 carbon atoms and may have a substituent is further preferable. An alkynyl group that has 2 to 6 carbon atoms and may have a substituent is preferable, and an alkynyl group that has 2 to 4 carbon atoms and may have a substituent is further preferable. An aryl group that has 6 to 12 carbon atoms and may have a substituent is preferable, and an aryl group that has 6 to 10 carbon atoms and may have a substituent is further preferable. An arylalkyl group that has 7 to 13 carbon atoms and may have a substituent is preferable, and an arylalkyl group that has 7 to 11 carbon atoms and may have a substituent is further preferable.

If the molecular weight or the size of the molecule is excessively large relative to the structure that produces the advantageous effects, the advantageous effects may fail to be produced to a sufficient degree.

The substituent is preferably a halogen atom and is more preferably a fluorine atom. It is considered that substituting the above groups with halogen atoms and, particularly, with fluorine atoms results in low unwanted reactivity and enables the characteristics comparable to those produced when substitution is not done to be produced.

For the above reasons and from the viewpoint of industrial availability, the following hydrocarbon groups are preferable. As an alkyl group, a methyl group, an ethyl group, an n-propyl group, an i-propyl group, an n-butyl group, an i-butyl group, an s-butyl group, a t-butyl group, a 2-fluoroethyl group, and a 2,2,2-trifluoroethyl group are preferable; and a methyl group, an ethyl group, and a 2,2,2-trifluoroethyl group are further preferable. As an alkenyl group, an ethenyl group, a 1-propenyl group, a 2-propenyl group, a 1-methylethenyl group, a 1-butenyl group, a 2-butenyl group, a 3-butenyl group, and a trifluoroethynyl group are preferable; and an ethenyl group, a 1-propenyl group, a 2-propenyl group, and a 1-methylethenyl group are further preferable. As an alkynyl group, an ethynyl group, a 1-propynyl group, a 2-propynyl group, a 1-butynyl group, a 2-butynyl group, and a 3-butynyl group are preferable; and an ethynyl group and a 2-propynyl group are further preferable.

As an aryl group, a phenyl group, a 2-methylphenyl group, a 3-methylphenyl group, a 4-methylphenyl group, a 2-ethylphenyl group, a 3-ethylphenyl group, a 4-ethylphenyl group, a 1-fluorophenyl group, a 2-fluorophenyl group, a 3-fluorophenyl group, and a pentafluorophenyl group are preferable; and a phenyl group, a 2-methylphenyl group, a 3-methylphenyl group, a 4-methylphenyl group, a 1-fluorophenyl group, a 2-fluorophenyl group, and a 3-fluorophenyl group are further preferable.

As an alkylaryl group, phenylmethyl, diphenylmethyl, 1-phenylethyl, 2-phenylethyl, (1-fluorophenyl)methyl, (2-fluorophenyl)methyl, (3-fluorophenyl)methyl, (2,4-difluorophenyl)methyl, (3,4-difluorophenyl)methyl, (3-(trifluoromethyl)phenyl)methyl, (4-(trifluoromethyl)phenyl)methyl, (3,5-bis(trifluoromethyl)phenyl)methyl, (1-naphthyl)methyl, (2-naphthyl)methyl, and (pentafluorophenyl)methyl are preferable; and phenylmethyl and (pentafluorophenyl)methyl are further preferable.

Specific examples of the sulfuric acid monoester salt which are preferable include methyl sulfate salt, ethyl sulfate salt, n-propyl sulfate salt, 2-propenyl sulfate salt, phenyl sulfate salt, (4-methyl)phenyl sulfate salt, and 2,2,2-trifluoroethyl sulfate salt. Specific examples of the sulfuric acid monoester salt which are further preferable include methyl sulfate salt, ethyl sulfate salt, 2-propenyl sulfate salt, and 2,2,2-trifluoroethyl sulfate salt.

Specific examples of the sulfamate salt include N,N-dimethyl sulfamate salt, N,N-diethyl sulfamate salt, and N,N-phenyl sulfamate salt.

When the electrolytic solution according to the present invention includes the sulfuric acid derivative salt in combination with the compound represented by Formula (1), the endurance characteristics of a battery that includes the electrolytic solution may be improved.

The countercation for the sulfuric acid derivative salt is not limited. Examples of the countercation include lithium, sodium, potassium, rubidium, cesium, magnesium, calcium, barium, and ammonium represented by $NR^{121}R^{122}R^{123}R^{124}$ (where $R^{121}$ to $R^{124}$ each independently represent a hydrogen atom or an organic group having 1 to 12 carbon atoms). Examples and preferable examples of $R^{121}$ to $R^{124}$ are the same as those described in Section 1-2-12 above. The countercation is preferably lithium, sodium, or potassium. Among these, lithium is preferable.

Examples of the fluorosulfonate salt include lithium fluorosulfonate, sodium fluorosulfonate, potassium fluorosulfonate, rubidium fluorosulfonate, and cesium fluorosulfonate. Lithium fluorosulfonate is preferable.

The sulfuric acid monoester salt is preferably lithium methyl sulfate, lithium ethyl sulfate, lithium 2-propenyl sulfate, or lithium 2,2,2-trifluoroethyl sulfate. The sulfamate salt is preferably lithium N,N-dimethyl sulfamate.

Imide salts having a fluorosulfonic acid structure, such as lithium bis(fluorosulfonyl)imide, lithium bis(N,N-dimethylaminosulfonyl) imide, lithium bis(N,N-dimethylaminosulfonyl)imide, lithium bis(methoxysulfonyl)imide, lithium bis(ethoxysulfonyl)imide, and lithium bis(2,2,2-trifluoroethoxysulfonyl)imide, may also be used as a fluorosulfonate salt.

Only one type of the sulfuric acid derivative salt may be used alone. Two or more types of the sulfuric acid derivative salts may be used in any combination and ratio.

The content of the sulfuric acid derivative salt (when two or more sulfuric acid derivative salts are used, the total content thereof) may be 0.05% by mass or more, is preferably 0.1% by mass or more, is more preferably 0.2% by mass or more, is further preferably 0.3% by mass or more, and is particularly preferably 0.4% by mass or more; and may be 10% by mass or less, is preferably 8% by mass or less, is more preferably 5% by mass or less, is further preferably 2% by mass or less, and is particularly preferably 1% by mass or less. When the content of the sulfuric acid derivative salt used falls within the above range, the occurrence of the side reactions in the battery may be reduced and an increase in resistance may be limited.

The mass ratio between the compound represented by Formula (1) and the sulfuric acid derivative salt, that is, Compound represented by Formula (1):Sulfuric acid derivative salt, is preferably 1:99 to 99:1, is more preferably 10:90 to 90:10, and is particularly preferably 20:80 to 80:20. When the above mass ratio falls within the above range, the occurrence of the side reactions in the battery may be reduced in an appropriate manner and the degradation of high-temperature endurance characteristics may be limited.

1-3. Electrolyte

The electrolyte is not limited; known electrolytes may be used.

The salts described in "1-2-12. Monofluorophosphate Salt and Difluorophosphate Salt", "1-2-13. Borate Salt", "1-2-14. Oxalate Salt", and "1-2-15. Fluorosulfonate Salt" may also be used as an electrolyte.

A lithium salt is commonly used in lithium secondary batteries. Specific examples thereof include inorganic lithium salts, such as $LiPF_6$, $LiBF_4$, $LiClO_4$, $LiAlF_4$, $LiSbF_6$, $LiTaF_6$, and $LiWF_7$; lithium tungstates, such as $LiWOF_5$; carboxylic acid lithium salts, such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; sulfonic acid lithium salts, such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$; lithium imide salts, such as $LiN(FCO)_2$, $LiN(FCO)(FSO_2)$, $LiN(FSO_2)_2$, $LiN(FSO_2)(CF_3SO_2)(CF_3SO_2)_2$, $LiN(C_2F_5SO_2)_2$, lithium cyclic 1,2-perfluoroethanedisulfonyl imide, lithium cyclic 1,3-perfluoropropanedisulfonyl imide, and $LiN(CF_3SO_2)(C_4F_9SO_2)$; lithium methide salts, such as $LiC(FSO_2)_3$, $LiC(CF_3SO_2)_3$, and $LiC(C_2F_5SO_2)_3$; lithium (malonato)borate salts, such as lithium bis(malonato)borate and lithium difluoro(malonato)borate; lithium (malonato)phosphate salts, such as lithium tris(malonato)phosphate, lithium difluorobis(malonato)phosphate, and lithium tetrafluoro(malonato)phosphate; other fluorine-containing organic lithium salts, such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$; lithium oxalatoborate salts, such as lithium difluorooxalatoborate and lithium bis(oxalato)borate; and lithium oxalatophosphate salts, such as lithium tetrafluorooxalatophosphate, lithium difluorobis(oxalato)phosphate, and lithium tris(oxalato)phosphate.

Among these, for example, $LiPF_6$, $LiBF_4$, $LiSbF_6$, $LiTaF_6$, $FSO_3Li$, lithium monofluorophosphate, lithium difluorophosphate, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonyl imide, lithium cyclic 1,3-perfluoropropanedisulfonyl imide, $LiC(FSO_2)_3$, $LiC(CF_3SO_2)$ $LiC(C_2F_5SO_2)_3$, $LiBF_3CF_3$, $LiBF_3C_2F_5$, $LiPF_3(CF_3)_3$, $LiPF_3(C_2F_5)_3$, lithium difluorooxalatoborate, lithium bis(oxalato)borate, and lithium difluorobis(oxalato)phosphate are preferable because they enhance output characteristics, high-rate charge-discharge characteristics, high-temperature storage characteristics, cycle characteristics, etc. $LiPF_6$, $FSO_3Li$, $LiN(FSO_2)_2$, $LiN(CF_3SO_2)_2$, lithium difluorooxalatoborate, lithium bis(oxalato)borate, and lithium difluorobis(oxalato)phosphate are more preferable. $LiPF_6$, $LiBF_4$, $FSO_3Li$, $LiN(FSO_2)_2$, and lithium bis(oxalato)borate are further preferable because they enhance output characteristics, high-rate charge-discharge characteristics, high-temperature storage characteristics, cycle characteristics, etc. to a further degree. $LiPF_6$ is most preferable from the viewpoint of the redox stability of the electrolyte. In particular, $LiPF_6$ decomposes in the system to produce a Lewis acid $PF_5$, which degrades the stability of the electrolytic solution, the physical properties of the electrolytic solution, and the battery characteristics. Using $LiPF_6$ in combination with the compound represented by Formula (1) enables the excellent characteristics as an electrolyte to be produced while the adverse effects due to the Lewis acid are suppressed.

The ratio of the molar content of the compound represented by Formula (1) in the nonaqueous electrolytic solution to the molar content of the electrolyte in the nonaqueous electrolytic solution which is required for achieving the advantageous effects of the present invention is not limited. The above ratio is normally 0.043 or more, is preferably 0.050 or more, is more preferably 0.075 or more, is further preferably 0.080 or more, and is particularly preferably 0.100 or more; and is normally 0.935 or less, is preferably 0.850 or less, is more preferably 0.760 or less, is further preferably 0.300 or less, and is particularly preferably 0.200 or less. When the above ratio falls within the above range, the battery characteristics and, in particular, continuous charge endurance characteristics may be markedly enhanced. The mechanisms is not clear; it is considered that mixing the compound represented by Formula (1) with the electrolyte enables the compound represented by Formula (1) to readily combine with the product of decomposition of the electrolyte to form a complex with efficiency. The ratio of the molar content of the compound represented by Formula (1) to the molar content of the electrolyte is the quotient of the molar content of the compound represented by Formula (1) divided by the molar content of the electrolyte and is a measure of the number of molecules of the compound represented by Formula (1) per molecule of the electrolyte.

The concentration of the above electrolyte in the nonaqueous electrolytic solution is not limited and may be set such that the advantageous effects of the present invention are not impaired. In order to adjust the electric conductivity of the electrolytic solution to fall within a suitable range and maintain suitable battery performance, the total molar concentration of lithium in the nonaqueous electrolytic solution is preferably 0.25 mol/L or more, is more preferably 0.5 mol/L or more, and is further preferably 1.1 mol/L or more; and is preferably 3.0 mol/L or less, is more preferably 2.5 mol/L or less, and is further preferably 2.0 mol/L or less. When the concentration of the electrolyte falls within the above range, the amount of lithium, which are charged particles, is not excessively reduced, the viscosity of the electrolytic solution may be adjusted to fall within an adequate range, and consequently, a suitable electric conductivity may be readily maintained.

In the case where two or more electrolytes are used in combination, it is preferable that at least one of the electrolytes be a salt selected from the group consisting of a monofluorophosphate salt, a difluorophosphate salt, a borate salt, an oxalate salt, and a fluorosulfonate salt. It is more preferable that at least one of the electrolytes be a salt selected from the group consisting of a monofluorophosphate salt, a difluorophosphate salt, an oxalate salt, and a fluorosulfonate salt. Among these, a lithium salt is preferable. The content of the salt selected from the group consisting of a monofluorophosphate salt, a difluorophosphate salt, a borate salt, an oxalate salt, and a fluorosulfonate salt may be 0.01% by mass or more and is preferably 0.1% by mass or more; and may be 20% by mass or less and is preferably 10% by mass or less.

The electrolytes preferably include one or more salts selected from the group consisting of a monofluorophosphate salt, a difluorophosphate salt, a borate salt, an oxalate salt, and a fluorosulfonate salt and one or more salts other than the above salts. Examples of the other salts include the above-described examples of a lithium salt. In particular, $LiPF_6$, $LiBF_4$, $LiN(FSO_2)_2$, $LiN(FSO_2)(CF_3SO_2)$ $LiN(CF_3SO_2)_2$, $LiN(C_2F_5SO_2)_2$, lithium cyclic 1,2-perfluoroethanedisulfonyl imide, lithium cyclic 1,3-perfluoropropanedisulfonyl imide, $LiC(FSO_2)_3$, $LiC(CF_3SO_2)$ $LiC(C_2F_5SO_2)_3$, $LiBF_3CF_3$, $LiBF_3C_2F_5$, $LiPF_3$ $(CF_3)_3$, and $LiPF_3$ $(C_2F_5)_3$ are preferable. $LiPF_6$ is further preferable. The content of the other salts may be 0.01% by mass or more and is preferably 0.1% by mass or more; and may be 20% by mass or less, is preferably 15% by mass or less, and is more preferably 10% by mass or less in order to maintain the balance between the electric conductivity and viscosity of the electrolytic solution at an adequate level.

The fluorosulfonate salt may be any salt having at least one fluorosulfonic acid structure in the molecule. When the electrolytic solution according to the present invention includes the fluorosulfonate salt in combination with the compound represented by Formula (1), the endurance characteristics of a battery that includes the electrolytic solution may be improved.

The countercation for the fluorosulfonate salt is not limited. Examples of the countercation include lithium, sodium, potassium, rubidium, cesium, magnesium, calcium, barium, and ammonium represented by $NR^{131}R^{132}R^{133}R^{134}$ (where $R^{131}$ to $R^{134}$ each independently represent a hydrogen atom or an organic group having 1 to 12 carbon atoms). Examples and preferable examples of $R^{131}$ to $R^{134}$ are the same as those described in Section 1-2-2 above. The countercation is preferably lithium, sodium, or potassium. Among these, lithium is preferable.

Examples of the fluorosulfonate salt include lithium fluorosulfonate, sodium fluorosulfonate, potassium fluorosulfonate, rubidium fluorosulfonate, and cesium fluorosulfonate. Lithium fluorosulfonate is preferable. Imide salts having a fluorosulfonic acid structure, such as lithium bis(fluorosulfonyl)imide, may also be used as a fluorosulfonate salt. Only one type of the fluorosulfonate salt may be used alone. Two or more types of the fluorosulfonate salts may be used in any combination and ratio.

The content of the fluorosulfonate salt (when two or more fluorosulfonate salts are used, the total content thereof) may be 0.05% by mass or more, is preferably 0.1% by mass or more, is more preferably 0.2% by mass or more, is further preferably 0.3% by mass or more, and is particularly preferably 0.4% by mass or more; and may be 10% by mass or less, is preferably 8% by mass or less, is more preferably 5% by mass or less, is further preferably 2% by mass or less, and is particularly preferably 1% by mass or less. When the content of the fluorosulfonate salt used falls within the above range, the occurrence of the side reactions in the battery may be reduced and an increase in resistance may be limited.

The mass ratio between the compound represented by Formula (1) and the fluorosulfonate salt, that is, Compound represented by Formula (1):Fluorosulfonate salt, is preferably 1:99 to 99:1, is more preferably 10:90 to 90:10, and is particularly preferably 20:80 to 80:20. When the above mass ratio falls within the above range, the occurrence of the side reactions in the battery may be reduced in an appropriate manner and the degradation of high-temperature endurance characteristics may be limited.

1-4. Nonaqueous Solvent

The nonaqueous solvent according to the present invention is not limited; known organic solvents may be used as a nonaqueous solvent. Specific examples of the nonaqueous solvent include a cyclic carbonate that does not have any fluorine atom, a chain carbonate, a cyclic carboxylate ester, the chain carboxylate ester described above in "1-2-9. Fluorine-Free Carboxylate Ester", an ether compound, and a sulfone compound.

Hereinafter, the volume of the nonaqueous solvent is a volume measured at 25° C. As for a nonaqueous solvent that is solid at 25° C., such as ethylene carbonate, a volume measured at the melting point is used as the volume of the nonaqueous solvent.

1-4-1. Cyclic Carbonate that does not have Fluorine Atom

Examples of the cyclic carbonate that does not have any fluorine atom include a cyclic carbonate having an alkylene group having 2 to 4 carbon atoms.

Specific examples of the cyclic carbonate that does not have any fluorine atom and has an alkylene group having 2 to 4 carbon atoms include ethylene carbonate, propylene carbonate, and butylene carbonate. Among these, ethylene carbonate and propylene carbonate are particularly preferable in order to increase the degree of dissociation of lithium ions and thereby enhance the battery characteristics.

Only one type of the cyclic carbonate that does not have any fluorine atom may be used alone. Two or more types of the cyclic carbonates that do not have any fluorine atom may be used in any combination and ratio.

The amount of the cyclic carbonate that does not have any fluorine atom is not limited and may be set such that the advantageous effects of the present invention are not impaired significantly. In the case where only one type of the cyclic carbonate that does not have any fluorine atom is used alone, the amount of the cyclic carbonate that does not have any fluorine atom is 5% by volume or more and is more preferably 10% by volume or more relative to 100% by volume of the nonaqueous solvent. When the content of the cyclic carbonate that does not have any fluorine atom falls within the above range, a reduction in the electric conductivity of the nonaqueous electrolytic solution, which may be caused due to a reduction in the dielectric constant of the nonaqueous electrolytic solution, may be prevented and consequently, the large-current discharge characteristics of the nonaqueous electrolytic solution secondary battery, the stability toward the negative electrode, and cycle characteristics may be readily adjusted to fall within adequate ranges. The content of the cyclic carbonate that does not have any fluorine atom is 95% by volume or less, is more preferably 90% by volume or less, and is further preferably 85% by volume or less. When the content of the cyclic carbonate that does not have any fluorine atom falls within the above range, the viscosity of the nonaqueous electrolytic solution falls within an adequate range, a reduction in ionic conductivity may be limited, and the rate characteristics of the nonaqueous electrolytic solution secondary battery may be readily adjusted to fall within a suitable range.

1-4-2. Chain Carbonate

The chain carbonate is preferably a chain carbonate having 3 to 7 carbon atoms and is more preferably a dialkyl carbonate having 3 to 7 carbon atoms.

Examples of the chain carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, tert-butyl methyl carbonate, ethyl-n-propyl carbonate, n-butyl ethyl carbonate, isobutyl ethyl carbonate, and tert-butyl ethyl carbonate. Among these, dimethyl carbonate, diethyl carbonate, di-n-propyl carbonate, diisopropyl carbonate, n-propyl isopropyl carbonate, ethyl methyl carbonate, and methyl-n-propyl carbonate are preferable. Dimethyl carbonate, diethyl carbonate, and ethyl methyl carbonate are particularly preferable.

Chain carbonates having a fluorine atom (hereinafter, may be referred to as "fluorinated chain carbonate") may also be suitably used.

The number of fluorine atoms included in the fluorinated chain carbonate is 1 or more and is not limited. The number of the fluorine atoms is commonly 6 or less and is preferably 4 or less. In the case where the fluorinated chain carbonate has plural fluorine atoms, the fluorine atoms may be bonded to the same carbon atom or may be bonded to different carbon atoms.

Examples of the fluorinated chain carbonate include fluorinated dimethyl carbonate and derivatives thereof, fluorinated ethyl methyl carbonate and derivatives thereof, and fluorinated diethyl carbonate and derivatives thereof.

Examples of the fluorinated dimethyl carbonate and derivatives thereof include fluoromethyl methyl carbonate, difluoromethyl methyl carbonate, trifluoromethyl methyl carbonate, bis(fluoromethyl) carbonate, bis(difluoro)methyl carbonate, and bis(trifluoromethyl) carbonate.

Examples of the fluorinated ethyl methyl carbonate and derivatives thereof include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate and derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, and bis(2,2,2-trifluoroethyl) carbonate.

Only one type of the chain carbonate may be used alone. Two or more types of the chain carbonates may be used in any combination and ratio. The amount of the chain carbonate used is preferably 5% by volume or more, is more preferably 10% by volume or more, and is further preferably 15% by volume or more relative to 100% by volume of the nonaqueous solvent. When the lower limit is set to the content of the chain carbonate as described above, the viscosity of the nonaqueous electrolytic solution is adjusted to fall within an adequate range, a reduction in ionic conductivity may be limited, and the large-current discharge characteristics of the nonaqueous electrolytic solution secondary battery may be readily adjusted to fall within a suitable range. The amount of the chain carbonate used is preferably 90% by volume or less and is more preferably 85% by volume or less relative to 100% by volume of the nonaqueous solvent. When the upper limit is set as described above, a reduction in the electric conductivity of the nonaqueous electrolytic solution, which may be caused due to a reduction in the dielectric constant of the nonaqueous electrolytic solution, may be prevented and consequently, the large-current discharge characteristics of the nonaqueous electrolytic solution secondary battery may be readily adjusted to fall within a suitable range.

1-4-3. Cyclic Carboxylate Ester

The cyclic carboxylate ester is preferably a cyclic carboxylate ester having 3 to 12 carbon atoms. Specific examples of the cyclic carboxylate ester include gamma-butyrolactone, gamma-valerolactone, gamma-caprolactone, and epsilon-caprolactone. Among these, gamma-butyrolactone is particularly preferable in order to increase the degree of dissociation of lithium ions and thereby enhance the battery characteristics.

Only one type of the cyclic carboxylate ester may be used alone. Two or more types of the cyclic carboxylate esters may be used in any combination and ratio.

1-4-4. Ether Compound

The ether compound is preferably a chain ether having 3 to 10 carbon atoms or a cyclic ether having 3 to 6 carbon atoms. A part of the hydrogen atoms included in the chain ether or cyclic ether may be replaced with fluorine atoms.

Examples of the chain ether having 3 to 10 carbon atoms include diethyl ether, di(2,2,2-trifluoroethyl) ether, ethyl (2,2,2-trifluoroethyl) ether, ethyl (1,1,2,2-tetrafluoroethyl) ether, ethyl-n-propyl ether, di-n-propyl ether, dimethoxymethane, ethoxymethoxymethane, methoxy(2-fluoroethoxy)methane, methoxy(2,2,2-trifluoroethoxy)methane, methoxy(1,1,2,2-tetrafluoroethoxy)methane, diethoxymethane, dimethoxyethane, methoxyethoxyethane, diethoxyethane, ethylene glycol di-n-propyl ether, ethylene glycol di-n-butyl ether, and diethylene glycol dimethyl ether.

Examples of the cyclic ether having 3 to 6 carbon atoms include tetrahydrofuran, 2-methyltetrahydrofuran, 3-methyltetrahydrofuran, and 1,4-dioxane; and compounds produced by fluorinating the above compounds.

Among these, dimethoxymethane, diethoxymethane, ethoxymethoxymethane, ethylene glycol di-n-propyl ether, ethylene glycol di-n-butyl ether, and diethylene glycol dimethyl ether are preferable because they have a high capability of solvating lithium ions and enhance ion dissociating power. Dimethoxymethane, diethoxymethane, and ethoxymethoxymethane are particularly preferable because they have a low viscosity and increase ionic conductivity.

Only one type of the ether compound may be used alone. Two or more types of the ether compounds may be used in any combination and ratio.

1-4-5. Sulfone Compound

The sulfone compound is preferably a cyclic sulfone having 3 to 6 carbon atoms or a chain sulfone having 2 to 6 carbon atoms. The number of sulfonyl groups per molecule is preferably 1 or 2.

Examples of the cyclic sulfone having 3 to 6 carbon atoms include monosulfone compounds, such as trimethylene sulfones, tetramethylene sulfones, and hexamethylene sulfones; and disulfone compounds, such as trimethylene disulfones, tetramethylene disulfones, and hexamethylene disulfones.

Among these, from the viewpoint of dielectric constant and viscosity, tetramethylene sulfones, tetramethylene disulfones, hexamethylene sulfones, and hexamethylene disulfones are more preferable. Tetramethylene sulfones (sulfolanes) are particularly preferable.

The sulfolanes are preferably sulfolane and/or sulfolane derivatives (hereinafter, sulfolane may be referred to as "sulfolanes"). The sulfolane derivatives are preferably compounds produced by replacing one or more hydrogen atoms bonded to the carbon atoms constituting the sulfolane ring with fluorine atoms or alkyl groups.

Among these, 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-di fluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, and 5-fluoro-3-(trifluoromethyl)sulfolane are preferable because they have a high ionic conductivity and may enhance input-output characteristics.

Examples of the chain sulfone having 2 to 6 carbon atoms include dimethyl sulfone, ethyl methyl sulfone, diethyl sulfone, n-propyl methyl sulfone, isopropyl methyl sulfone, n-butyl methyl sulfone, tert-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone, trifluoroethyl-tert-butyl sulfone, trifluoromethyl-n-butyl sulfone, and trifluoromethyl-tert-butyl sulfone. The above chain sulfones are preferable because they have a high ionic conductivity and may enhance input-output characteristics.

Only one type of the sulfone compound may be used alone. Two or more types of the sulfone compounds may be used in any combination and ratio.

1-4-6. Composition of Nonaqueous Solvent

As a nonaqueous solvent according to the present invention, only one type of the above-described examples of the nonaqueous solvent may be used alone. Two or more types of the examples of the nonaqueous solvent may be used in any combination and ratio.

One of the preferable combinations of the nonaqueous solvents is a combination consisting primarily of the cyclic carbonate that does not have any fluorine atom and the chain carbonate. In particular, the total proportion of the cyclic carbonate that does not have any fluorine atom and the chain carbonate in the nonaqueous solvent is preferably 70% by volume or more, is more preferably 80% by volume or more, and is further preferably 90% by volume or more. Furthermore, the ratio of the amount of the cyclic carbonate that does not have any fluorine atom to the total amount of the cyclic carbonate and the chain carbonate is preferably 5% by volume or more, is more preferably 10% by volume or more, and is further preferably 15% by volume or more; and is preferably 50% by volume or less, is more preferably 35% by volume or less, is further preferably 30% by volume or less, and is particularly preferably 25% by volume or less.

When the nonaqueous solvents are used in the above combination, the balance between the cycle characteristics of a battery prepared using the nonaqueous solvents and the high-temperature storage characteristics (in particular, the capacity that remains subsequent to storage at high temperatures and high-rate discharge capacity) of the battery may be improved.

Preferable examples of the combination of the cyclic carbonate that does not have any fluorine atom and the chain carbonate include ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate.

Among the above combinations of the cyclic carbonate that does not have any fluorine atom and the chain carbonate, combinations in which the chain carbonate is an asymmetric chain alkyl carbonate are further preferable. Combinations that include ethylene carbonate, a symmetric chain carbonate, and an asymmetric chain carbonate, such as a combination of ethylene carbonate, dimethyl carbonate, and an ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate, are particularly preferable because they improve the balance between cycle characteristics and large-current discharge characteristics. Among these, combinations in which the asymmetric chain carbonate is ethyl methyl carbonate are preferable. The number of the carbon atoms included in the alkyl group constituting the chain carbonate is preferably 1 or 2.

In the case where dimethyl carbonate is added to the nonaqueous solvent, the proportion of dimethyl carbonate in the entire nonaqueous solvent is preferably 10% by volume or more, is more preferably 20% by volume or more, is further preferably 25% by volume or more, and is particularly preferably 30% by volume or more; and is preferably 90% by volume or less, is more preferably 80% by volume or less, is further preferably 75% by volume or less, and is particularly preferably 70% by volume or less. In such a case, the rate characteristics of the battery may be enhanced.

Among these, it is preferable that the nonaqueous solvent include dimethyl carbonate and ethyl methyl carbonate such that the content of the dimethyl carbonate is higher than that of the ethyl methyl carbonate because, in such a case, the characteristics of the battery subsequent to storage at high temperatures may be enhanced while the electric conductivity of the electrolytic solution is maintained.

The volume ratio of dimethyl carbonate to ethyl methyl carbonate in the entire nonaqueous solvent (Dimethyl carbonate/Ethyl methyl carbonate) is preferably 1.1 or more, is more preferably 1.5 or more, and is further preferably 2.5 or more in order to increase the electric conductivity of the electrolytic solution and enhance the characteristics of the battery after storage. The above volume ratio (Dimethyl carbonate/Ethyl methyl carbonate) is preferably 40 or less, is more preferably 20 or less, is further preferably 10 or less, and is particularly preferably 8 or less in order to enhance battery characteristics at low temperatures.

Another solvent, such as a cyclic carboxylate ester, a chain carboxylate ester, a cyclic ether, a chain ether, a sulfur-containing organic solvent, phosphorus-containing organic solvent, or an aromatic fluorine-containing solvent, may be added to the combination consisting primarily of the cyclic carbonate that does not have any fluorine atom and the chain carbonate.

The above-described nonaqueous electrolytic solution is used for producing an electrical storage device that includes positive and negative electrodes capable of occluding and releasing metal ions. Details of the electrical storage device are described below. The nonaqueous electrolytic solution may be particularly suitably used for producing nonaqueous electrolytic solution secondary batteries.

<2. Electrical Storage Device Including Nonaqueous Electrolytic Solution>

An electrical storage device produced using the nonaqueous electrolytic solution according to the present invention includes negative and positive electrodes capable of occluding and releasing lithium ions and a nonaqueous electrolytic solution that includes an electrolyte and a nonaqueous solvent. The nonaqueous electrolytic solution includes the compound represented by Formula (1) described above in addition to the electrolyte and the nonaqueous solvent.

The electrical storage device that includes the nonaqueous electrolytic solution according to the present invention is preferably a nonaqueous electrolytic solution secondary battery, a lithium battery, a polyvalent cation battery, a metal/air secondary battery, a secondary battery that includes a s-block metal which is other than the above batteries, a lithium-ion capacitor, or an electric double-layer capacitor, is more preferably a lithium battery or a lithium ion capacitor, and is further preferably a nonaqueous electrolytic solution secondary battery or a lithium battery. It is also preferable that the nonaqueous electrolytic solution included in the above electrical storage devices be apparently solidified with a high-molecular compound, a filler, or the like, that is, be "gel electrolyte". The lithium salt according to the present invention may also be used as electrolyte salt of the solid electrolyte.

<2-1. Lithium Battery>

A lithium battery produced using the nonaqueous electrolytic solution according to the present invention includes a positive electrode including a current collector and a positive electrode active material layer disposed on the current collector; a negative electrode including a current collector and a negative electrode active material layer disposed on the current collector, the negative electrode being capable of occluding and releasing ions; and the nonaqueous electrolytic solution according to the present invention. Note that the term "lithium battery" used herein refers collectively to a lithium primary battery and a lithium secondary battery.

<2-1-1. Battery Structure>

The structure of the lithium battery according to the present invention is the same as the structures of the lithium batteries known in the related art, except the nonaqueous electrolytic solution according to the present invention. The lithium battery commonly has a structure in which the positive and negative electrodes are stacked on top of each other with a porous membrane (separator) interposed therebetween, the porous membrane being impregnated with the nonaqueous electrolytic solution according to the present invention, and the above components are housed in a casing (package). Thus, the shape of the lithium battery according to the present invention is not limited and may be cylindrical, rectangular, laminated film-shaped, coin-shaped, large-sized, or the like.

2-1-2. Nonaqueous Electrolytic Solution

The above-described nonaqueous electrolytic solution according to the present invention is used as a nonaqueous electrolytic solution. A nonaqueous electrolytic solution other than the nonaqueous electrolytic solution according to the present invention may be used in combination with the nonaqueous electrolytic solution according to the present invention such that a deviation from the scope of the present invention is not made.

2-1-3. Negative Electrode

The negative electrode includes a current collector and a negative electrode active material layer disposed on the current collector. The negative electrode active material layer includes a negative electrode active material. The negative electrode active material is described below.

The negative electrode active material included in a lithium primary battery is not limited and may be any negative electrode active material capable of electrochemically releasing lithium ions. Specific examples of such a negative electrode active material include metal lithium.

The negative electrode active material included in a lithium secondary battery is not limited and may be any negative electrode active material capable of electrochemically occluding and releasing metal ions (e.g., lithium ions). Specific examples of such a negative electrode active material include a carbonaceous material, an alloy material, and a lithium-containing metal composite oxide material. The above materials may be used alone or in any combination of two or more.

<Negative Electrode Active Material>

Examples of the negative electrode active material include a carbonaceous material, an alloy material, and a lithium-containing metal composite oxide material.

The carbonaceous material used as a negative electrode active material is preferably selected from the following materials, because they maintain the balance between initial irreversible capacity and high-current density charge-discharge characteristics at an adequate level.

(1) natural graphite (2) carbonaceous material produced by heating an artificial carbonaceous substance and an artificial graphite substance at 400° C. to 3200° C. one or more times (3) carbonaceous material that includes a negative electrode active material layer that is composed of at least two or more carbonaceous substances having different crystallinities and/or that includes an interface at which the carbonaceous substances having different crystallinities come into contact with each other (4) carbonaceous material that includes a negative electrode active material layer that is composed of at least two or more carbonaceous substances having different orientations and/or that includes an interface at which the carbonaceous substances having different orientations come into contact with each other The carbonaceous materials (1) to (4) may be used alone. Alternatively, two or more types of the carbonaceous materials (1) to (4) may be used in any combination and ratio.

Examples of the artificial carbonaceous substance and the artificial graphite substance described in (2) above include natural graphite, coal-derived coke, petroleum-derived coke, coal-derived pitch, petroleum-derived pitch, substances produced by oxidizing these pitches, needle coke, pitch coke, carbon materials produced by partially graphitizing these substances, furnace black, acetylene black, substances produced by pyrolysis of an organic substance, such as a pitch-based carbon fiber, carbonizable organic substances and carbides thereof, a solution prepared by dissolving a carbonizable organic substance in a low-molecular-weight organic solvent, such as benzene, toluene, xylene, quinoline, or n-hexane, and carbides thereof.

The alloy material used as a negative electrode active material is not limited and may be any alloy material selected from elemental lithium, an elemental metal and an alloy constituting a lithium alloy, and compounds thereof, such as an oxide, a carbide, a nitride, a silicide, a sulfide, and a phosphide, which is capable of occluding and releasing lithium. The elemental metal and the alloy constituting a lithium alloy are preferably materials including the metal or metalloid element belonging to Group 13 or 14 (i.e., except carbon) and are more preferably elemental metals of aluminum, silicon, and tin (hereinafter, these elements may be referred to simply as "specific metal elements") and alloys or compounds containing these atoms. The above materials may be used alone. Alternatively, two or more types of the above materials may be used in any combination and ratio.

Examples of a negative electrode active material including at least one atom selected from the specific metal elements include an elemental metal that is any one of the specific metal elements; an alloy of two or more of the specific metal elements; an alloy of one or two or more of the specific metal elements with one or two or more of the other metal elements; a compound including one or two or more of the specific metal elements; and a composite compound of the above compound, such as an oxide, a carbide, a nitride, a silicide, a sulfide, or a phosphide of the compound. Using the above elemental metal, alloy, or metal compound as a negative electrode active material may increase the capacity of the battery.

Compounds formed as a result of the above composite compounds being bonded to a few types of elements, such as elemental metals, alloys, or non-metallic elements, in a complicated manner may also be used. Specifically, for example, an alloy of silicon or tin with a metal that does not serve as a negative electrode may be used. For example, when tin is used, a complicated compound including five or six elements selected from tin, a metal that serves as a negative electrode other than silicon, a metal that does not serve as a negative electrode, and a non-metallic element may be used.

Among the above negative electrode active materials, an elemental metal that is any one of the specific metal elements, an alloy of two or more of the specific metal elements, and oxides, carbides, nitrides, etc. of the specific metal elements are preferable in order to increase the capacity of the battery per unit mass. Elemental metals, alloys, oxides, carbides, nitrides, etc. of silicon and/or tin are particularly preferable from the viewpoint of the capacity per unit mass and environmental loads.

The lithium-containing metal composite oxide material used as a negative electrode active material is not limited and may be any lithium-containing metal composite oxide material capable of occluding and releasing lithium. From the viewpoint of high-current density charge-discharge characteristics, a material containing titanium and lithium is preferable. A lithium-containing composite metal oxide material containing titanium is more preferable. Furthermore, a composite oxide of lithium and titanium (hereinafter, may be referred to simply as "lithium titanium composite oxide"). That is, it is particularly preferable to add a lithium titanium composite oxide having a spinel structure to the negative electrode active material of the nonaqueous electrolytic solution secondary battery because, in such a case, the output resistance of the battery may be significantly reduced.

A lithium titanium composite oxide in which lithium or titanium is replaced with another metal element, that is, for example, at least one element selected from the group consisting of Na, K, Co, Al, Fe, Ti, Mg, Cr, Ga, Cu, Zn, and Nb, is also preferable.

It is preferable that the metal oxide be the lithium titanium composite oxide represented by Formula (A) and, in Formula (A), $0.7 \leq x \leq 1.5$, $1.5 \leq y \leq 2.3$, and $0 \leq z \leq 1.6$ because, in such a case, the structure during doping and de-doping of lithium ions is stable.

$$Li_xTi_yM_zO_4 \quad (A)$$

[in Formula (A), M represents at least one element selected from the group consisting of Na, K, Co, Al, Fe, Ti Mg, Cr, Ga, Cu, Zn, and Nb]

Among compositions represented by Formula (A) above, the following structures are particularly preferable in order to maintain the balance among battery performance capabilities at a suitable level.

(a) $1.2 \leq x \leq 1.4$, $1.5 \leq y \leq 1.7$, and $z=0$
(b) $0.9 \leq x \leq 1.1$, $1.9 \leq y \leq 2.1$, and $z=0$
(c) $0.7 \leq x \leq 0.9$, $2.1 \leq y \leq 2.3$, and $z=0$ Particularly preferable, typical compositions of the compound are (a) $Li_{4/3}Ti_{5/3}O_4$, (b) $Li_1Ti_2O_4$, and (c) $Li_{4/5}Ti_{11/5}O_4$. Preferable examples of the structure in which $Z \neq 0$ include $Li_{4/3}Ti_{4/3}Al_{1/3}O_4$.

<Structure of Negative Electrode and Method for Preparing Negative Electrode>

The electrode may be produced using any of known methods which does not significantly impair the advantageous effects of the present invention. The electrode may be formed by, for example, mixing the negative electrode active material with a binder, a solvent, and optionally, a thickener, a conductant agent, a filler, and the like to form a slurry, applying the slurry to a current collector, and performing drying, followed by pressing.

In the case where the alloy material is used, a thin-film layer (negative electrode active material layer) including the above negative electrode active material may be formed by vapor deposition, sputtering, plating, or the like.

(Current Collector)

The current collector on which the negative electrode active material is held may be selected from known current collectors. Examples of the negative electrode current collector include metal materials, such as aluminum, copper, nickel, stainless steel, and nickel-plated steel. Copper is particularly preferable from the viewpoints of ease of working and costs.

Examples of the shape of the current collector made of a metal material include a metal foil, a metal cylinder, a metal coil, a metal plate, a metal thin-film, an expanded metal, a perforated metal, and a metal foam. Among these, a metal thin-film is preferable, and a copper foil is more preferable. A rolled copper foil produced by rolling and an electrolytic copper foil produced by electrolysis are further preferable. Both of the above foils may be used as a current collector.
(Binding Agent)

The binder used for binding the negative electrode active material may be any material stable toward the nonaqueous electrolytic solution and the solvent used for producing the electrode.

Specific examples of the binding agent include resin high-molecular compounds, such as polyethylene, polypropylene, polyethylene terephthalate, polymethyl methacrylate, aromatic polyamide, polyimide, cellulose, and nitrocellulose; rubber-like high-molecular compounds, such as an SBR (styrene butadiene rubber), an isoprene rubber, a butadiene rubber, a fluorine rubber, an NBR (acrylonitrile-butadiene rubber), and an ethylene-propylene rubber; a styrene-butadiene-styrene block copolymer and a hydrogenated styrene-butadiene-styrene block copolymer; thermoplastic elastomer-like high-molecular compounds, such as an EPDM (ethylene-propylene-diene terpolymer), a styrene-ethylene-butadiene-styrene copolymer, a styrene-isoprene-styrene block copolymer, and a hydrogenated product thereof; soft resinous high-molecular compounds, such as syndiotactic-1,2-polybutadiene, polyvinyl acetate, an ethylene-vinyl acetate copolymer, and a propylene-α-olefin copolymer; fluorine-based high-molecular compounds, such as polyvinylidene fluoride, polytetrafluoroethylene, fluorinated polyvinylidene fluoride, and a polytetrafluoroethylene-ethylene copolymer; and high-molecular compositions conductive to alkali metal ions (in particular, lithium ions). The above binding agents may be used alone. Alternatively, two or more types of the above binding agents may be used in any combination and ratio.

The proportion of the binder to the negative electrode active material is preferably 0.1% by mass or more, is further preferably 0.5% by mass or more, and is particularly preferably 0.6% by mass or more; and is preferably 20% by mass or less, is more preferably 15% by mass or less, is further preferably 10% by mass or less, and is particularly preferably 8% by mass or less. When the proportion of the binder to the negative electrode active material falls within the above range, the battery capacity and the strength of the negative electrode may be maintained at sufficient levels.

In particular, in the case where the rubber-like high-molecular compound, such as SBR, is used as a primary constituent, the proportion of the binder to the negative electrode active material is normally 0.1% by mass or more, is preferably 0.5% by mass or more, and is further preferably 0.6% by mass or more; and is normally 5% by mass or less, is preferably 3% by mass or less, and is further preferably 2% by mass or less. In the case where a fluorine-based high-molecular compound, such as polyvinylidene fluoride, is used as a primary constituent, the proportion of the binder to the negative electrode active material is normally 1% by mass or more, is preferably 2% by mass or more, and is further preferably 3% by mass or more; and is normally 15% by mass or less, is preferably 10% by mass or less, and is further preferably 8% by mass or less.
(Thickener)

The thickener may be used normally for adjusting the viscosity of the slurry. Specific examples of the thickener include, but are not limited to, carboxymethyl cellulose, methyl cellulose, hydroxymethyl cellulose, ethyl cellulose, polyvinyl alcohol, oxidized starch, phosphorylated starch, casein, and salts thereof. The above thickeners may be used alone. Alternatively, two or more types of the above thickeners may be used in any combination and ratio.

In the case where the thickener is optionally used, the proportion of the thickener to the negative electrode active material is normally 0.1% by mass or more, is preferably 0.5% by mass or more, and is further preferably 0.6% by mass or more; and is normally 5% by mass or less, is preferably 3% by mass or less, and is further preferably 2% by mass or less. When the proportion of the thickener to the negative electrode active material falls within the above range, a reduction in the battery capacity and an increase in resistance may be limited while ease of coating is maintained at a suitable level.
(Electrode Density)

The structure of the electrode produced using the negative electrode active material is not limited. The density of the negative electrode active material present on the current collector is preferably 1 g·cm$^{-3}$ or more, is further preferably 1.2 g·cm$^{-3}$ or more, and is particularly preferably 1.3 g·cm$^{-3}$ or more; and is preferably 2.2 g·cm$^{-3}$ or less, is more preferably 2.1 g·cm$^{-3}$ or less, is further preferably 2.0 g·cm$^{-3}$ or less, and is particularly preferably 1.9 g·cm$^{-3}$ or less. When the density of the negative electrode active material present on the current collector falls within the above range, the fracture of particles of the negative electrode active material may be prevented, and consequently, an increase in initial irreversible capacity and the degradation of high-current density charge-discharge characteristics, which may be caused due to a reduction in the permeability of the nonaqueous electrolytic solution to the vicinity of the interface between the current collector and the negative electrode active material, may be limited, while a reduction in the battery capacity and an increase in resistance are limited.
(Thickness of Negative Electrode Plate)

The thickness of the negative electrode plate is not limited and may be determined in accordance with the positive electrode plate used. The thickness of the mixture layer which excludes the thickness of the metal foil used as a core is normally 15 μm or more, is preferably 20 μm or more, and is more preferably 30 μm or more; and is normally 300 μm or less, is preferably 280 μm or less, and is more preferably 250 μm or less.
(Coating of Surface of Negative Electrode Plate)

A substance having a composition different from the composition of the negative electrode plate may be deposited on the surface of the negative electrode plate. Examples of the surface-deposited substance include oxides, such as aluminum oxide, silicon oxide, titanium oxide, zirconium oxide, magnesium oxide, calcium oxide, boron oxide, antimony oxide, and bismuth oxide; sulfate salts, such as lithium sulfate, sodium sulfate, potassium sulfate, magnesium sulfate, calcium sulfate, and aluminum sulfate; and carbonate salts, such as lithium carbonate, calcium carbonate, and magnesium carbonate.

2-1-4. Positive Electrode

<Positive Electrode Active Material>

A positive electrode active material included in the positive electrode is described below.
(Composition)

The positive electrode active material included in a lithium primary battery is not limited and may be any material capable of electrochemically occluding lithium ions. Specific examples of such a material include graphite fluoride, manganese dioxide, thionyl chloride, iron disulfide, and copper oxide.

The positive electrode active material included in a lithium secondary battery is not limited and may be any material capable of electrochemically occluding and releasing metal ions (e.g., lithium ions). For example, a substance containing lithium and at least one transition metal is preferable. Specific examples of such a substance include a lithium-transition metal composite oxide and a lithium-containing transition metal phosphoric acid compound.

The transition metal included in the lithium-transition metal composite oxide is preferably, for example, V, Ti, Cr, Mn, Fe, Co, Ni, or Cu. Specific examples of the lithium-transition metal composite oxide include a lithium-cobalt composite oxide, such as $LiCoO_2$; a lithium-nickel composite oxide, such as $LiNiO_2$; a lithium-manganese composite oxide, such as $LiMnO_2$, $LiMn_2O_4$, or $Li_2MnO_4$; a lithium-nickel-manganese-cobalt composite oxide, such as $LiNi_{1/3}Mn_{1/3}Co_{1/3}O_2$ or $LiNi_{0.5}Mn_{0.3}Co_{0.2}O_2$; and compounds produced by replacing a part of the transition metal atoms primarily constituting the above lithium-transition metal composite oxides with other elements, such as Na, K, B, F, Al, Ti, V, Cr, Mn, Fe, Co, Li, Ni, Cu, Zn, Mg, Ga, Zr, Si, Nb, Mo, Sn, and W. Examples of the compounds produced by the above substitution include $LiNi_{0.5}Mn_{0.5}O_2$, $LiNi_{0.05}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.0}Al_{0.2}O_4$, and $LiMn_{1.5}Ni_{0.5}O_4$.

The transition metal included in the lithium-containing transition metal phosphoric acid compound is preferably, for example, V, Ti, Cr, Mn, Fe, Co, Ni, or Cu. Specific examples of the lithium-containing transition metal phosphoric acid compound include iron phosphates, such as $LiFePO_4$, $Li_3Fe_2(PO_4)_2$, and $LiFeP_2O_7$; cobalt phosphates, such as $LiCoPO_4$; and compounds produced by replacing a part of the transition metal atoms primarily constituting the above lithium transition metal phosphoric acid compounds with other elements, such as Al, Ti, V, Cr, Mn, Fe, Co, Li, Ni, Cu, Zn, Mg, Ga, Zr, Nb, and Si.

It is preferable to add lithium phosphate to the positive electrode active material in order to enhance continuous charge characteristics. The use of lithium phosphate is not limited. It is preferable to mix the positive electrode active material with lithium phosphate. The amount of lithium phosphate is, as for the lower limit, preferably 0.1% by mass or more, is more preferably 0.3% by mass or more, and is further preferably 0.5% by mass or more; and as for the upper limit, is preferably 10% by mass or less, is more preferably 8% by mass or less, and is further preferably 5% by mass or less of the total amount of the positive electrode active material and lithium phosphate.

(Surface Coating)

A substance having a composition different from the composition of the positive electrode active material may be deposited on the surface of the positive electrode active material. Examples of the surface-deposited substance include oxides, such as aluminum oxide, silicon oxide, titanium oxide, zirconium oxide, magnesium oxide, calcium oxide, boron oxide, antimony oxide, and bismuth oxide; sulfate salts, such as lithium sulfate, sodium sulfate, potassium sulfate, magnesium sulfate, calcium sulfate, and aluminum sulfate; carbonate salts, such as lithium carbonate, calcium carbonate, and magnesium carbonate; and carbon.

The above surface-deposited substances may be deposited on the surface of the positive electrode active material by, for example, a method of dissolving or suspending the substance in a solvent, impregnating the positive electrode active material with the resulting solution or suspension, and subsequently performing drying; a method of dissolving or suspending a precursor of the surface-deposited substance in a solvent, impregnating the positive electrode active material with the resulting solution or suspension, and subsequently conducting a reaction by heating or the like; or a method of adding the substance to a precursor of the positive electrode active material and baking the substance and the precursor simultaneously. In the case where carbon is to be deposited on the surface of the positive electrode active material, alternatively, a carbonaceous substance may be mechanically adhered onto the surface in the form of active carbon or the like in the subsequent step.

The amount of the surface-deposited substance is, as for the lower limit, by mass, preferably 0.1 ppm or more, is more preferably 1 ppm or more, and is further preferably 10 ppm or more; and as for the upper limit, is preferably 20% or less, is more preferably 10% or less, and is further preferably 5% or less of the amount of the positive electrode active material. The surface-deposited substance may suppress the oxidation reaction of the electrolytic solution which occurs on the surface of the positive electrode active material and thereby enhance the durability of the battery. If the amount of the surface-deposited substance is excessively small, the above advantageous effects may fail to be produced at a sufficient level. If the amount of the surface-deposited substance is excessively large, the substance may block the entry and exit of lithium ions and consequently increase resistance. In the present invention, a positive electrode active material provided with a substance deposited on the surface of the positive electrode active material, the substance having a composition different from that of the positive electrode active material, is referred to also as "positive electrode active material".

(Shape)

Examples of the shape of particles of the positive electrode active material include the shapes of the particles of common positive electrode active materials, such as block-like, polyhedric, spherical, elliptical sphere-like, plate-like, acicular, and columnar. The primary particles may be aggregated with one another to form secondary particles.

(Tap Density)

The tap density of the positive electrode active material is preferably 0.5 g/cm³ or more, is more preferably 0.8 g/cm³ or more, and is further preferably 1.0 g/cm³ or more. When the tap density of the positive electrode active material falls within the above range, the amounts of disperse medium, conductant agent, and binding agent required for forming the positive electrode active material layer may be reduced and, as a result, the filling ratio of the positive electrode active material and the battery capacity may be maintained at adequate levels. A positive electrode active material layer having a high density may be formed by using a composite oxide powder having a high tap density. Commonly, it is preferable to maximize the tap density. Although the upper limit for the tap density is not specified, the tap density is preferably 4.0 g/cm³ or less, is more preferably 3.7 g/cm³ or less, and is further preferably 3.5 g/cm³ or less. When the tap density falls within the above range, the degradation of rate characteristics may be limited.

In the present invention, the tap density of the positive electrode active material is determined by charging 5 to 10 g of a powder of the positive electrode active material into a 10-ml glass graduated cylinder, tapping the cylinder 200 times at a stroke of about 20 mm, and calculating the pack density of the powder (tap density) in units of g/cc.

(Method for Producing Positive Electrode Active Material)

For producing the positive electrode active material, common methods for producing inorganic compounds may be used. Various methods may be used for preparing, in particular, spherical or elliptical sphere-like active material particles. An example of the methods is a method of dissolving or pulverizing and dispersing a substance that is a raw material for the transition metal in a solvent such as water, adjusting the pH of the resulting solution or dispersion while performing stirring to prepare and recover spherical precursor particles, drying the precursor particles as needed, subsequently adding a Li source, such as LiCH, $Li_2CO_3$, or $LiNO_3$, to the precursor, and baking the resulting mixture at a high temperature to form an active material.

For producing the positive electrode, the above positive electrode active materials may be used alone. Alternatively, one or more types of the positive electrode active materials having different compositions may be used in any combination and ratio. Examples of preferable combinations of positive electrode active materials include a combination of $LiCoO_2$ and $LiMn_2O_4$, such as $LiNi_{0.33}Co_{0.33}Mn_{0.33}O_2$, or a compound formed by replacing a part of the Mn atoms with another transition metal or the like; and a combination of $LiCoO_2$ or a compound formed by replacing a part of the Co atoms with another transition metal or the like.

<Structure of Positive Electrode and Method for Preparing Positive Electrode>

The structure of the positive electrode is described below. In the present invention, the positive electrode may be prepared by forming a positive electrode active material layer that includes the positive electrode active material and a binding agent on a current collector. The positive electrode that includes the positive electrode active material may be produced by the conventional method. Specifically, the positive electrode may be produced by mixing the positive electrode active material with a binding agent and optional constituents, such as a conductant agent and a thickener, by a dry process, forming the resulting mixture into a sheet-like shape, and pressure bonding the sheet-like body to a positive electrode current collector, or by dissolving or dispersing the above materials in a liquid medium to form a slurry, applying the slurry to a positive electrode current collector, and performing drying to form a positive electrode active material layer on the current collector.

The content of the positive electrode active material in the positive electrode active material layer is preferably 80% by mass or more, is more preferably 82% by mass or more, and is particularly preferably 84% by mass or more. As for the upper limit, the above content is preferably 99% by mass or less and is more preferably 98% by mass or less. When the above content falls within the above range, the electric capacity of the positive electrode active material included in the positive electrode active material layer may be maintained at an adequate level while the strength of the positive electrode is maintained. The positive electrode active material layer prepared by coating and drying is preferably subjected to compaction by hand press, roller press, or the like in order to increase the pack density of the positive electrode active material. The density of the positive electrode active material layer is, as for the lower limit, preferably 1.5 $g/cm^3$ or more, is more preferably 2 $g/cm^3$ or more, and is further preferably 2.2 $g/cm^3$ or more; and as for the upper limit, is preferably 5 $g/cm^3$ or less, is more preferably 4.5 $g/cm^3$ or less, and is further preferably 4 $g/cm^3$ or less. When the above density falls within the above range, suitable charge-discharge characteristics may be achieved while an increase in electric resistance is limited.

(Conductant Agent)

Known conductant agents may be used as a conductant agent. Specific examples of the conductant agents include metal materials, such as copper and nickel; and carbon materials (e.g., graphite materials, such as natural graphite and artificial graphite; carbon black materials, such as acetylene black; and amorphous carbon materials, such as needle coke). The above conductant agents may be used alone. Alternatively, two or more types of the conductant agents may be used in any combination and ratio. The content of the conductant agent in the positive electrode active material layer is normally 0.01% by mass or more, is preferably 0.1% by mass or more, and is more preferably 1% by mass or more; and as for the upper limit, is normally 50% by mass or less, is preferably 30% by mass or less, and is more preferably 15% by mass or less. When the above content falls within the above range, a sufficiently high electrical conductivity and a sufficiently high battery capacity may be maintained.

(Binding Agent)

The binding agent used for producing the positive electrode active material layer is not limited. In the case where a coating method is used, the binding agent may be any material capable of being dissolved or dispersed in the liquid medium used in the production of the electrode. Specific examples of the binding agent include resin high-molecular compounds, such as polyethylene, polypropylene, polyethylene terephthalate, polymethyl methacrylate, polyimide, aromatic polyamide, cellulose, and nitrocellulose; rubber-like high-molecular compounds, such as an SBR (styrene butadiene rubber), an NBR (acrylonitrile-butadiene rubber), a fluorine rubber, an isoprene rubber, a butadiene rubber, and an ethylene-propylene rubber; a styrene-butadiene-styrene block copolymer and a hydrogenated styrene-butadiene-styrene block copolymer; thermoplastic elastomer-like high-molecular compounds, such as an EPDM (ethylene-propylene-diene terpolymer), a styrene-ethylene-butadiene-ethylene copolymer, a styrene-isoprene-styrene block copolymer, and the hydrogenated products thereof; soft resinous high-molecular compounds, such as syndiotactic-1,2-polybutadiene, polyvinyl acetate, an ethylene-vinyl acetate copolymer, and a propylene-α-olefin copolymer; fluorine-based high-molecular compounds, such as polyvinylidene fluoride (PVdF), polytetrafluoroethylene, fluorinated polyvinylidene fluoride, and a polytetrafluoroethylene-ethylene copolymer; and high-molecular compositions conductive to alkali metal ions (in particular, lithium ions). The above substances may be used alone. Alternatively, two or more types of the above substances may be used in any combination and ratio.

The proportion of the binding agent in the positive electrode active material layer is normally 0.1% by mass or more, is preferably 1% by mass or more, and is further preferably 1.5% by mass or more; and as for the upper limit, is normally 80% by mass or less, is preferably 60% by mass or less, is further preferably 40% by mass or less, and is most preferably 10% by mass or less. If the proportion of the binding agent is excessively low, the positive electrode active material may fail to be retained in a sufficient manner and consequently, the positive electrode may fail to have a sufficiently high mechanical strength. In such a case, the battery performance, such as cycle characteristics, may become degraded. On the other hand, if the above proportion is excessively large, the battery capacity and electrical conductivity may be reduced.

(Current Collector)

The material constituting the positive electrode current collector is not limited; known materials may be used. Specific examples thereof include metal materials, such as aluminum, stainless steel, nickel-plated, titanium, and tantalum; and carbon materials, such as carbon cloth and carbon paper. Among these, metal materials are preferable. Aluminum are particularly preferable.

(Electrode Area)

In the case where the electrolytic solution according to the present invention is used, the area of the positive electrode active material layer is preferably set to be larger than the area of the outer surface of the package casing of the battery in order to enhance the stability under a high-output high-temperature condition. Specifically, the area ratio of the total area of the positive electrode to the surface area of the package of the secondary battery is preferably 15 times or more and is more preferably 40 times or more. In the case where the package casing has a rectangular shape with a bottom, the area of the outer surface of the package casing is the total area calculated from the height, width, and thickness of a casing portion excluding the protrusions serving as terminals, in which electric power generating components are charged. In the case where the package casing has a cylindrical shape with a bottom, the area of the outer surface of the package casing is the geometric surface area of a cylinder that resembles, in shape, the casing portion excluding the protrusions serving as terminals, in which electric power generating components are charged. The total area of the positive electrode is the geometric surface area of the positive electrode mixture layer arranged to face the mixture layer including the negative electrode active material. In the case where the positive electrode mixture layer is disposed on both sides of the current collector foil, the total area of the positive electrode is the total sum of the areas of the surfaces of the positive electrode mixture layers which are calculated individually.

(Thickness of Positive Electrode Plate)

The thickness of the positive electrode plate is not limited. The thickness of the mixture layer which excludes the thickness of the metal foil used as a core is, as for the lower limit, preferably 10 µm or more and is more preferably 20 µm or more; and as for the upper limit, is preferably 500 µm or less and is more preferably 450 µm or less per side of the current collector in order to increase capacity and output.

(Coating of Surface of Positive Electrode Plate)

A substance having a composition different from the composition of the positive electrode plate may be deposited on the surface of the positive electrode plate. Examples of the surface-deposited substance include oxides, such as aluminum oxide, silicon oxide, titanium oxide, zirconium oxide, magnesium oxide, calcium oxide, boron oxide, antimony oxide, and bismuth oxide; sulfate salts, such as lithium sulfate, sodium sulfate, potassium sulfate, magnesium sulfate, calcium sulfate, and aluminum sulfate; carbonate salts, such as lithium carbonate, calcium carbonate, and magnesium carbonate; and carbon.

2-1-5. Separator

A separator is commonly interposed between the positive and negative electrodes in order to prevent short circuit. In this case, the separator is commonly impregnated with the electrolytic solution according to the present invention.

The material constituting the separator and the shape of the separator are not limited; known separators which do not significantly impair the advantageous effects of the present invention may be used. Among these, a resin, a glass fiber, an inorganic substance, and the like composed of a material stable toward the electrolytic solution according to the present invention may be used. It is preferable to use a separator having the shape of a porous sheet, a nonwoven fabric, or the like, which has a high liquid-retaining capacity.

Examples of the material constituting the resin and glass fiber separators include polyolefins, such as polyethylene and polypropylene; and aromatic polyamide, polytetrafluoroethylene, polyethersulfone, and a glass filter. Among these, a glass filter and polyolefins are preferable. Polyolefins are further preferable. Polypropylene is particularly preferable. The above materials may be used alone. Alternatively, two or more types of the materials may be used in any combination and ratio and may be stacked on top of one another. Specific examples of a separator constituted by two or more materials used in an appropriate combination and stacked on top of one another include a three-layer separator constituted by a polypropylene layer, a polyethylene layer, and a polypropylene layer stacked on top of one another in this order.

The thickness of the separator is not limited; is normally 1 µm or more, is preferably 5 µm or more, and is further preferably 8 µm or more; and is normally 50 µm or less, is preferably 40 µm or less, and is further preferably 30 µm or less. When the above thickness falls within the above range, insulating property and mechanical strength may be maintained while the battery performance, such as rate characteristics, and energy density are maintained.

In the case where a porous separator, such as a porous sheet or a nonwoven fabric, is used, the porosity of the separator is not limited; is normally 20% or more, is preferably 35% or more, and is further preferably 45% or more; and is normally 90% or less, is preferably 85% or less, and is further preferably 75% or less. When the above porosity falls within the above range, insulating property and mechanical strength may be maintained, while the membrane resistance is reduced and suitable rate characteristics are achieved.

As for the shape of the separator, a separator having the shape of a thin-film, such as a nonwoven fabric, a woven fabric, or a microporous film, may be used. When the separator has the shape of a thin-film, a separator having a pore size of 0.01 to 1 µm and a thickness of 5 to 50 µm is suitably used. In addition to the separator having the shape of an independent thin-film, a separator produced by forming a composite porous layer including particles of the inorganic material on the surface layers of the positive electrode and/or the negative electrode using a resin binding agent may also be used. For example, a porous layer including alumina particles having a 90% particle size of less than 1 µm may be formed on both surfaces of the positive electrode using a fluororesin as a binding agent.

2-1-6. Battery Design

<Electrode Group>

The electrode group may be either an electrode group having a multilayer structure including the positive and negative electrode plates and the separator interposed therebetween or an electrode group having a structure formed by winding the positive and negative electrode plates and the separator interposed therebetween in a spiral form. The proportion of the mass of the electrode group to the volume of the battery (hereinafter, this proportion is referred to as "electrode group occupancy") is normally 40% or more and is preferably 50% or more; and is normally 90% or less and is preferably 80% or less. When the electrode group occupancy falls within the above range, the battery capacity may be maintained while the degradation of charge-discharge cycle characteristics and battery characteristics, such as storage at high temperatures, which may be caused due to an increase in inside pressure, is limited. Furthermore, the activation of the gas release valve may be prevented.

<Current Collection Structure>

The current collection structure is not limited. It is preferable to form a current collection structure that reduces the resistances of wire portions and joint portions. In the case where the electrode group has the above multilayer structure, a structure in which the metal cores of the respective electrode layers are welded to the terminal in a bundle is suitably used. In the case where the area of each electrode is large, internal resistance is increased accordingly. Therefore, in such a case, it is suitable to form plural terminals in each electrode in order to reduce resistance. In the case where the electrode group has the above wound structure, the internal resistance may be reduced by forming plural lead structures in each of the positive and negative electrodes and connecting the lead structures to the terminal in a bundle.

<Package Casing>

The material constituting the package casing is not limited and may be any substance stable toward the nonaqueous electrolytic solution used. Specific examples thereof include metals, such as a nickel-plated steel sheet, stainless steel, aluminum, an aluminum alloy, and a magnesium alloy; and a laminated film including a resin and an aluminum foil. Metals, such as aluminum and an aluminum alloy, and a laminated film are suitably used from the viewpoint of weight reduction.

Examples of the package casing composed of a metal include a package casing having a hermetically sealed structure formed by welding metals by laser welding, resistance welding, or ultrasonic welding; and a package casing having a structure caulked using the metals with a resin gasket. Examples of the package casing composed of a laminated film include a package casing having a hermetically sealed structure formed by bonding resin layers to one another by thermal fusion. In order to enhance sealing performance, a resin different from the resin included in the laminated film may be interposed between the resin layers. Since a metal and a resin need to be bonded to each other particularly when the sealed structure is formed by bonding the resin layers to each other by thermal fusion with a current collection terminal interposed therebetween, the resin interposed between the resin layers is suitably a resin including a polar group or a modified resin to which a polar group has been introduced. The shape of the package is also not limited and may be any of cylindrical, rectangular, laminated film-shaped, coin-shaped, large-sized, etc.

<Protection Device>

For example, a PTC (positive temperature coefficient), a temperature fuse, and a thermistor, the resistance of which increases upon anomalous heat being generated or an excessively large current being passed through the device; and a valve (current limiting valve) that interrupts the current passing through the circuit upon the pressure or temperature inside the battery being rapidly increased when anomalous heat is generated may be used as a protection device. It is preferable to select a protection device that does not operate in ordinary use at high currents. It is more preferable to design the battery such that any of the generation of anomalous heat and thermal runaway does not occur even without the protection device.

2-2. Polyvalent Cation Battery

An oxide material or the like is used as a positive electrode. Metals, such as magnesium, calcium, and aluminum, compounds including the metals, and the like are used as a negative electrode. As an electrolyte, a nonaqueous electrolytic solution prepared by dissolving a magnesium salt, a calcium salt, an aluminum salt, or the like in a nonaqueous solvent is used in order to give an element the same as the element included in the active material that reacts on the negative electrode, that is, a magnesium ion, a calcium ion, or an aluminum ion. A nonaqueous electrolytic solution for polyvalent cation batteries may be prepared by dissolving the compound represented by Formula (1) in the nonaqueous electrolytic solution.

2-3. Metal-Air Battery

Metals, such as zinc, lithium, sodium, magnesium, aluminum, and calcium, compounds including the metals, and the like are used as a negative electrode. Since the positive electrode active material is oxygen, the positive electrode is a porous gas-diffusion electrode. The porous material is preferably carbon. As an electrolyte, a nonaqueous electrolytic solution prepared by dissolving a lithium salt, a sodium salt, a magnesium salt, an aluminum salt, a calcium salt, or the like in a nonaqueous solvent is used in order to give an element the same as the element included in the negative electrode active material, that is, lithium, sodium, magnesium, aluminum, calcium, or the like. A nonaqueous electrolytic solution for metal-air batteries may be prepared by dissolving the compound represented by Formula (1) in the nonaqueous electrolytic solution.

2-4. Secondary Battery Including S-Block Metal Other than the Above Secondary Batteries The s-block elements are Group 1 elements (hydrogen and alkali metals), Group 2 elements (beryllium, magnesium, and alkaline-earth metals), and helium. The term "s-block metal secondary battery" used herein refers to a secondary battery that includes the s-block metal as a negative electrode and/or an electrolyte. Specific examples of the s-block metal secondary battery other than the above secondary batteries include a lithium-sulfur battery and a sodium-sulfur battery, which include a positive electrode including sulfur; and a sodium ion battery.

2-5. Lithium Ion Capacitor

A material capable of forming an electric double-layer is used as a positive electrode. A material capable of occluding and releasing lithium ions is used as a negative electrode. The material constituting the positive electrode is preferably active carbon. The material constituting the negative electrode is preferably a carbonaceous material. A nonaqueous electrolytic solution including the compound represented by Formula (1) is used as a nonaqueous electrolytic solution.

2-6. Electric Double-Layer Capacitor

A material capable of forming an electric double-layer is used as positive and negative electrodes. The material constituting the positive and negative electrodes is preferably active carbon. A nonaqueous electrolytic solution including the compound represented by Formula (1) is used as a nonaqueous electrolytic solution.

EXAMPLES

The present invention is described more specifically with reference to Examples and Comparative examples below. The present invention is not limited to Examples below.

The specific evaluation methods are described below.

[Preparation of Positive Electrode]

With 85 parts by mass of lithium nickel manganese cobalt oxide ($LiNi_{1/3}Mn_{1/3}Co_{1/3}O_2$) used as a positive electrode active material, 10 parts by mass of carbon black and 5 parts by mass of polyvinylidene fluoride were mixed. N-methyl-2-pyrrolidone was added to the resulting mixture to form a slurry. The slurry was uniformly applied onto both surfaces of an aluminum foil having a thickness of 15 μm. The resulting coating layers were dried and subsequently pressed. Hereby, a positive electrode was prepared.

[Preparation of Negative Electrode]

A natural graphite powder used as a negative electrode active material, an aqueous dispersion of sodium carboxymethyl cellulose (concentration of sodium carboxymethyl cellulose: 1 mass %) used as a thickener, and an aqueous dispersion of a styrene butadiene rubber (concentration of styrene butadiene rubber: 50 mass %) used as a binder were mixed with one another with a disperser to form a slurry. The slurry was uniformly applied onto one of the surfaces of a copper foil having a thickness of 10 μm. The resulting coating layer was dried and subsequently pressed. Hereby, a negative electrode was prepared. The negative electrode was prepared such that the mass ratio of Natural graphite:Sodium carboxymethyl cellulose:Styrene butadiene rubber in the dried negative electrode was 98:1:1.

[Preparation of Nonaqueous Electrolytic Solution]
Fundamental Electrolytic Solution: 1.0 M $LiPF_6$/EC:DMC: EMC=3:3:4

In a dry argon atmosphere, $LiPF_6$ used as an electrolyte was dissolved in a mixed solvent including ethylene carbonate (EC), dimethyl carbonate (DMC), and ethyl methyl carbonate (EMC) (volume mixing ratio EC:DMC:EMC=3: 3:4) in a proportion of 1.0 mol/L to prepare a fundamental electrolytic solution.

Fundamental Electrolytic Solution 2: 1.2M $LiPF_6$, 0.1 M $LiBF_4$/EC:DEC=2:8

In a dry argon atmosphere, $LiPF_6$ and $LiBF_4$ used as an electrolyte were dissolved in a mixed solvent including ethylene carbonate (EC) and diethyl carbonate (DEC) (volume mixing ratio EC:DEC=2:8) in proportions of 1.2 mol/L and 0.1 mol/L, respectively, to prepare a fundamental electrolytic solution 2.

Fundamental Electrolytic Solution 3: 1.0 M $LiPF_6$/EC: EMC:EP=3:4:3

In a dry argon atmosphere, $LiPF_6$ used as an electrolyte was dissolved in a mixed solvent including ethylene carbonate (EC), ethyl methyl carbonate (EMC), and ethyl propionate (EP) (volume mixing ratio EC:EMC:EP=3:4:3) in a proportion of 1.0 mol/L to prepare a fundamental electrolytic solution 3.

Fundamental Electrolytic Solution 4: 1.0 M $LiPF_6$/EC: EMC:MA=3:4:3

In a dry argon atmosphere, $LiPF_6$ used as an electrolyte was dissolved in a mixed solvent including ethylene carbonate (EC), ethyl methyl carbonate (EMC), and methyl acetate (MA) (volume mixing ratio EC:EMC:MA=3:4:3) in a proportion of 1.0 mol/L to prepare a fundamental electrolytic solution 4.

Fundamental Electrolytic Solution 5: 1.0 M LiFSI/EC:EMC: MA=3:4:3

In a dry argon atmosphere, LiFSI used as an electrolyte was dissolved in a mixed solvent including ethylene carbonate (EC), ethyl methyl carbonate (EMC), and methyl acetate (MA) (volume mixing ratio EC:EMC:MA=3:4:3) in a proportion of 1.0 mol/L to prepare a fundamental electrolytic solution 5.

Each of the nonaqueous electrolytic solutions used in Examples was prepared by adding a specific amount of the compound represented by Formula (1) to the corresponding one of the fundamental electrolytic solutions as described in Tables below. The fundamental electrolytic solutions were also used as a nonaqueous electrolytic solution in some of Comparative examples. The other nonaqueous electrolytic solutions used in Comparative examples were prepared by adding a specific amount of a compound appropriate as a comparative example which is other than the compound represented by Formula (1) to the corresponding one of the fundamental electrolytic solutions as described in Tables below.

[Preparation of Lithium Secondary Battery]

The positive electrode, the negative electrode, and a separator composed of polypropylene were stacked on top of one another in the order of negative electrode, separator, positive electrode, separator, and negative electrode to form a battery element. The battery element was inserted into a package that was a laminated film formed by coating both surface of an aluminum film (thickness: 40 μm) with a resin layer, such that the terminals of the positive and negative electrodes were protruded from the package. Subsequently, the nonaqueous electrolytic solution was charged into the package, which was then vacuum sealed. Hereby, a sheet-like lithium secondary battery was prepared.

[Evaluation of Initial Battery Characteristics]

While the lithium secondary battery was sandwiched between glass plates and pressurized by the glass plates, it was charged to 4.2 V at a constant current corresponding to ⅙C and further charged at a constant voltage until the current decreased to 0.01 C at 25° C. (the above charging method is referred to also as "constant current-constant voltage charging" or "CC-CV charging").

Subsequently, the battery was discharged to 2.5 V at a constant current corresponding to ⅙C. The charge-discharge efficiency of the battery measured after the above charge-discharge cycle is referred to as "initial charge-discharge efficiency".

The battery was then charged to 4.1 V at maximum at a current corresponding to ⅙C until the current decreased to 0.01 C, that is, by constant current-constant voltage charging. Subsequently, the battery was left to stand at 45° C. for 12 hours. Then, the temperature was reduced to 25° C. and the battery was discharged to 2.5 V at a constant current corresponding to ⅙C. The battery was again charged to 4.2 V at maximum at a current corresponding to ⅙C at 25° C. until the current decreased to 0.01 C, that is, by constant current-constant voltage charging. The battery was then discharged to 2.5 V at a constant current corresponding to ⅙C. The discharge capacity of the battery measured after the above charge-discharge cycle is referred to as "initial discharge capacity".

Subsequently, the battery was charged to 3.72 V at maximum at a current corresponding to ⅙C at 25° C. until the current decreased to 0.01 C, that is, by constant current-constant voltage charging. Then, the alternating current impedance was measured at 0° C.

The imaginary component of the resistance at 0.5 Hz was used for comparison.

[High-Temperature Storage Endurance Test]

The battery that had been evaluated in terms of initial characteristics was charged to 4.2 V at maximum at a current corresponding to ⅙C at 25° C. until the current decreased to 0.01 C, that is, by constant current-constant voltage charging. Subsequently, the battery was stored for 2 weeks in a thermostat set at 60° C.

[Evaluation After High-Temperature Storage Endurance Test]

The battery that had been subjected to the high-temperature storage endurance test was cooled to 25° C.

The battery was discharged to 2.5 V at a constant current corresponding to ⅙C. The discharge capacity measured is referred to as "discharge capacity after storage". The battery was again charged to 4.2 V at maximum at a current corresponding to ⅙C at 25° C. until the current decreased to 0.01 C, that is, by constant current-constant voltage charging and then discharged to 2.5 V at a constant current corresponding to ⅙C. The capacity measured is referred to as "capacity recovered after storage".

Subsequently, the battery was charged to 3.72 V at maximum at a current corresponding to ⅙C at 25° C. until the current decreased to 0.01 C, that is, by constant current-constant voltage charging. Then, the battery was cooled to 0° C. and the alternating current impedance was measured.

The imaginary component of the resistance at 0.5 Hz was used for comparison.

[High-Temperature Cycle Endurance Test]

The battery that had been evaluated in terms of initial characteristics was charged to 4.2 V at maximum at a current corresponding to 1 C in a thermostat set at 60° C. until the current decreased to 0.01 C, that is, by constant current-constant voltage charging and subsequently discharged to 2.5 V at a constant current corresponding to 1 C. The above charging and discharging of the battery is considered as one cycle.

[Evaluation after High-Temperature Cycle Endurance Test]

The battery that had been subjected to the high-temperature endurance test was cooled to 25° C.

The battery was discharged to 2.5 V at a constant current corresponding to ⅙C at 25° C. The battery was again charged to 4.2 V at maximum at a current corresponding to ⅙C at 25° C. until the current decreased to 0.01 C, that is, by constant current-constant voltage charging and then discharged to 2.5 V at a constant current corresponding to ⅙C. The capacity measured after the charge-discharge cycles is referred to as "capacity after cycles".

Subsequently, the battery was charged to 3.72 V at maximum at a current corresponding to ⅙ C at 25° C. until the current decreased to 0.01 C, that is, by constant current-constant voltage charging. Then, the battery was cooled to 0° C. and the alternating current impedance was measured.

The imaginary component of the resistance at 0.5 Hz was used for comparison.

[Compounds Used in Evaluations]

The structures of the compounds (compounds corresponding to Formula (1)) added to the electrolytic solutions used in Examples and the compounds (compounds not corresponding to Formula (1)) added to the electrolytic solutions used in Comparative examples are described below. The compound represented by Formula (1) is the compound described in PTL 1, and the compounds used in Comparative examples are the compounds described in PTLs 1 to 5. These compounds were synthesized by the methods described in the respective patent literatures.

Compounds Used in Examples

[Chem. 31]

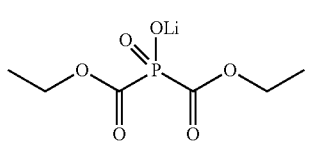

Compound 1

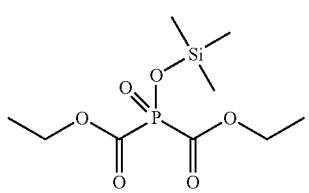

Compound 2

-continued

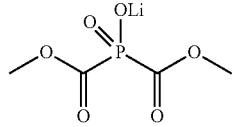

Compound 3

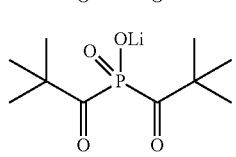

Compound 4

Compounds Used in Comparative Examples

[Chem. 32]

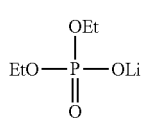

Comparative Compound 1 (PTL 4)

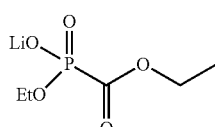

Comparative Compound 2 (PTL 5)

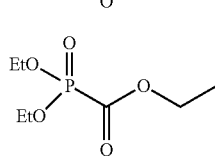

Comparative Compound 3 (PTL 1-3)

<Evaluation 1>

Electrolytic solutions 1 and 2 were prepared by dissolving 0.03 mol (about 0.5 and 0.8 mass %, respectively) of the compounds 1 and 2 per kilogram of the fundamental electrolytic solution in the fundamental electrolytic solution. Comparative electrolytic solutions 1 to 3 were prepared by dissolving 0.03 mol of the comparative compounds 1 to 3, respectively, per kilogram of the fundamental electrolytic solution in the fundamental electrolytic solution.

Batteries were prepared using the above electrolytic solutions and the fundamental electrolytic solution, that is, six electrolytic solutions in total. After the batteries had been evaluated in terms of initial characteristics, they were subjected to the high-temperature storage endurance test. Then, the evaluation after the high-temperature storage endurance test was made. Table 1 summarizes the evaluation results as Examples 1-1 and 1-2 and Comparative examples 1-1 to 1-4.

Initial charge-discharge efficiency, initial capacity, initial impedance, and impedance after storage are shown in relative values with the initial charge-discharge efficiency, the initial capacity, the initial impedance, and the impedance after storage of Comparative example 1-1 being 100. Capacity retained after storage and capacity recovered after storage are shown in relative values with the initial capacity of Comparative example 1-1 being 100. Only as for impedance, the smaller the relative value, the higher the evaluation grade. As for the other items, the higher the relative value, the higher the evaluation grade.

TABLE 1

| | Electrolytic solution used | Initial charge-discharge efficiency | Initial Capacity | Initial Impedance | After storage Retained capacity | After storage Recovered capacity | After storage Impedance |
|---|---|---|---|---|---|---|---|
| Example 1-1 | Electrolytic solution 1 | 100.2 | 100.3 | 80.6 | 91.0 | 94.6 | 65.4 |
| Example 1-2 | Electrolytic solution 2 | 101.0 | 99.8 | 94.4 | 90.5 | 93.9 | 58.3 |
| Comparative example 1-1 | Fundamental electrolytic solution | 100.0 | 100.0 | 100.0 | 88.6 | 92.9 | 100.0 |
| Comparative example 1-2 | Comparative electrolytic solution 1 | 99.1 | 99.4 | 100.1 | 81.9 | 85.0 | 112.7 |
| Comparative example 1-3 | Comparative electrolytic solution 2 | 100.5 | 99.9 | 84.6 | 90.4 | 93.7 | 73.1 |
| Comparative example 1-4 | Comparative electrolytic solution 3 | 98.9 | 100.1 | 98.4 | 88.9 | 93.6 | 94.9 |

The results described in Table 1 reveal the following.

The batteries prepared in Examples 1-1 and 1-2 were comparable to the battery prepared in Comparative example 1-1, while the initial impedances of the batteries prepared in Examples 1-1 and 1-2 were markedly reduced. In this evaluation, the battery prepared in Comparative example 1-2 was poor in terms of initial efficiency and the effect to limit impedance was not confirmed.

The battery prepared in Comparative example 1-3 had results similar to those of the batteries prepared in Examples 1-1 and 1-2, while the battery prepared in Comparative example 1-4, which included a diester having an analogous structure, could not limit impedance to a sufficient degree.

The results obtained after the storage confirm that the retained capacities and the restored capacities of the batteries prepared in Examples 1-1 and 1-2 were enhanced compared with Comparative example 1-1 and that the impedances of the batteries prepared in Examples 1-1 and 1-2 were kept at low levels compared with Comparative example 1-1.

The retained capacity and the restored capacity of the battery prepared in Comparative example 1-2 were reduced, and the impedance of the battery was increased. It was confirmed that, on the contrary, the addition of the compound caused adverse effects.

The capacity retained after the storage and the capacity restored after the storage of the battery prepared in Comparative example 1-3 changed as in Examples 1-1 and 1-2. The impedance of the battery was low, although it was not as low as in Example 1-1 or 1-2.

The capacity retained after the storage and the capacity restored after the storage of the battery prepared in Comparative example 1-4 changed as in Examples 1-1 and 1-2. However, the impedance of the battery was not reduced to a sufficient degree. Since the capacity retained after the storage and the capacity restored after the storage were maintained, it is considered that the impedance of the battery did not become degraded to the same degree as in Comparative example 1-1 because the degradation of the battery was limited. That is, it is considered that these are not the results of evaluating the material that is essentially capable of reducing impedance.

<Evaluation 2>

Batteries having the same structure as in Evaluation 1 were separately prepared using the electrolytic solutions used in Evaluation 1. After the batteries had been evaluated in terms of initial characteristics, they were subjected to the high-temperature cycle endurance test. Then, the evaluation after the high-temperature cycle endurance test was made. Table 2 summarizes the evaluation results as Examples 2-1 and 2-2 and Comparative examples 2-1 to 2-3.

Initial charge-discharge efficiency, initial capacity, initial impedance, impedance after 200 cycles, and impedance after 400 cycles are shown in relative values with the initial charge-discharge efficiency, the initial capacity, the initial impedance, the impedance after 200 cycles, and the impedance after 400 cycles of Comparative example 2-1 being 100. Capacities after 200 cycles and 400 cycles are shown in relative values with the initial capacity of Comparative example 2-1 being 100. Only as for impedance, the smaller the relative value, the higher the evaluation grade. As for the other items, the higher the relative value, the higher the evaluation grade.

The relative values measured in the initial characteristic evaluation differ from those measured in <Evaluation 1> because of the lot-to-lot variations among the batteries prepared.

TABLE 2

| | Electrolytic solution used | Initial charge-discharge efficiency | Initial Capacity | Initial Impedance | After 200 cycles Capacity | After 200 cycles Impedance | After 400 cycles Capacity | After 400 cycles Impedance |
|---|---|---|---|---|---|---|---|---|
| Example 2-1 | Electrolytic solution 1 | 100.0 | 100.1 | 75.1 | 88.6 | 42.4 | 80.0 | 57.1 |
| Example 2-2 | Electrolytic solution 2 | 100.5 | 99.6 | 87.3 | 90.0 | 32.9 | 80.2 | 49.7 |

TABLE 2-continued

|  | Electrolytic solution used | Initial charge-discharge efficiency | Initial | | After 200 cycles | | After 400 cycles | |
| --- | --- | --- | --- | --- | --- | --- | --- | --- |
|  |  |  | Capacity | Impedance | Capacity | Impedance | Capacity | Impedance |
| Comparative example 2-1 | Fundamental electrolytic solution | 100.0 | 100.0 | 100.0 | 86.9 | 100.0 | 76.1 | 100.0 |
| Comparative example 2-2 | Comparative electrolytic solution 1 | 98.8 | 99.0 | 101.4 | 78.9 | 122.3 | 16.2 | 240.6 |
| Comparative example 2-3 | Comparative electrolytic solution 2 | 99.5 | 99.7 | 78.1 | 86.8 | 53.1 | 76.4 | 68.3 |

The results described in Table 2 reveal the following.

The results of the initial evaluation were the same as in <Evaluation 1>.

It was confirmed that the capacities after 200 cycles and 400 cycles of the batteries prepared in Examples 2-1 and 2-2 were enhanced compared with Comparative example 2-1 and that the impedances of the batteries were kept at low levels.

As in Evaluation 1, the capacities of the battery prepared in Comparative example 2-2 were reduced, and the impedances of the battery were increased. It was confirmed that, on the contrary, the addition of the compound caused adverse effects.

The impedances after 200 cycles and 400 cycles of the battery prepared in Comparative example 2-3 were low, although it was not as low as in Example 2-1 or 2-2, similarly to the results obtained in Comparative example 1-3 after the high-temperature storage endurance test. However, the capacities after 200 cycles and 400 cycles of the battery were substantially equal to the results obtained in Comparative example 2-1, where the fundamental electrolytic solution was used.

The results of <Evaluation 1> and <Evaluation 2> confirm that, in the case where the compound represented by Formula (1), which was added to the electrolytic solutions 1 and 2 used in Examples 1-1 and 1-2 and 2-1 and 2-2, is used, both of the characteristics measured after the high-temperature endurance-storage test and the characteristics measured after the high-temperature cycle endurance test may be enhanced, unlike the case where the compounds added to the comparative electrolytic solutions 1 and 2 used in Comparative examples 1-2 and 1-3 and 2-2 and 2-3 are used.

<Evaluation 3>

Electrolytic solutions 3 and 4 were prepared by dissolving 0.03 mol (about 0.5 and 0.7 mass %, respectively) of the compounds 3 and 4 per kilogram of the fundamental electrolytic solution in the fundamental electrolytic solution. In Comparative example 3-1, the fundamental electrolytic solution was used. Batteries having the same structure as in <Evaluation 1> and <Evaluation 2> were separately prepared. After the batteries had been evaluated in terms of initial characteristics, they were subjected to the high-temperature cycle endurance test. Then, the evaluation after the high-temperature cycle endurance test was made. Table 3 summarizes the evaluation results as Examples 3-1 and 3-2 and Comparative example 3-1.

Initial charge-discharge efficiency, initial capacity, initial impedance, and impedance after 200 cycles are shown in relative values with the initial charge-discharge efficiency, the initial capacity, the initial impedance, and the impedance after 200 cycles of Comparative example 3-1 being 100. Capacity after 200 cycles is shown in relative values with the initial capacity of Comparative example 3-1 being 100. Only as for impedance, the smaller the relative value, the higher the evaluation grade. As for the other items, the higher the relative value, the higher the evaluation grade.

TABLE 3

|  | Electrolytic solution used | Initial charge-discharge efficiency | Initial | | After 200 cycles | |
| --- | --- | --- | --- | --- | --- | --- |
|  |  |  | Capacity | Impedance | Capacity | Impedance |
| Example 3-1 | Electrolytic solution 3 | 100.5 | 100.3 | 64.4 | 90.6 | 39.7 |
| Example 3-2 | Electrolytic solution 4 | 100.1 | 100.3 | 74.1 | 90.1 | 67.8 |
| Comparative example 3-1 | Fundamental electrolytic solution | 100.0 | 100.0 | 100.0 | 86.9 | 100.0 |

It was confirmed that the initial charge-discharge efficiencies and initial capacities of the batteries prepared in Examples 3-1 and 3-2 were comparable to those determined in Comparative example 3-1, while the initial impedances of the batteries were markedly reduced.

It was confirmed that the capacities after 200 cycles of the batteries prepared in Examples 3-1 and 3-2 were enhanced compared with Comparative example 3-1 and that the impedances of the batteries were kept at low levels.

The above results suggest that the addition of the compound represented by Formula (1) limited the decomposition of the nonaqueous electrolytic solution and the occurrence of the electrochemical side reaction of the decomposed product on the electrode. Furthermore, it is considered that the impedances kept at low levels suggest the stabilization mechanisms of the compound represented by Formula (1) which had been adsorbed at an early stage.

<Evaluation 4>

Electrolytic solutions 5 and 6 were prepared by dissolving 0.06 and 0.12 mol (about 1.0 and 2.0 mass %, respectively) of the compound 1 per kilogram of the fundamental electrolytic solution in the fundamental electrolytic solution. Furthermore, the electrolytic solution 1 was again used. In Comparative example 4-1, the fundamental electrolytic solution was used.

Batteries having the same structure as in <Evaluation 1> to <Evaluation 3> were separately prepared. After the batteries had been evaluated in terms of initial characteristics, they were subjected to the high-temperature cycle endurance test. Then, the evaluation after the high-temperature cycle endurance test was made. Table 4 summarizes the evaluation results as Examples 4-1 to 4-3 and Comparative example 4-1.

Initial charge-discharge efficiency, initial capacity, initial impedance, impedance after 100 cycles, and impedance after 200 cycles are shown in relative values with the initial charge-discharge efficiency, the initial capacity, the initial impedance, impedance after 100 cycles, and the impedance after 200 cycles of Comparative example 4-1 being 100. Capacities after 100 cycles and 200 cycles are shown in relative values with the initial capacity of Comparative example 4-1 being 100. Only as for impedance, the smaller the relative value, the higher the evaluation grade. As for the other items, the higher the relative value, the higher the evaluation grade.

TABLE 4

|  | Electrolytic solution used | Initial charge-discharge efficiency | Initial Initial charge-discharge capacity ratio | Impedance ratio | After 100 cycles | | After 200 cycles | |
|---|---|---|---|---|---|---|---|---|
|  |  |  |  |  | Capacity retention factor | Impedance ratio | Capacity retention factor | Impedance ratio |
| Example 4-1 | Electrolytic solution 1 | 101.1 | 100.8 | 74.2 | 95.5 | 23.7 | 86.7 | 31.3 |
| Example 4-2 | Electrolytic solution 5 | 101.0 | 100.7 | 79.7 | 96.8 | 13.3 | 91.0 | 15.7 |
| Example 4-3 | Electrolytic solution 6 | 101.2 | 100.5 | 99.4 | 97.2 | 10.6 | 91.5 | 14.9 |
| Comparative example 4-1 | Comparative electrolytic solution 1 | 100.0 | 100.0 | 100.0 | 93.7 | 100.0 | 85.4 | 100.0 |

The initial charge-discharge efficiencies and initial capacities of the batteries prepared in Examples 4-1 to 4-3 were comparable to those determined in Comparative example 4-1. The initial impedances of the batteries prepared in Examples 4-1 and 4-2 were markedly reduced. The initial impedance of the battery prepared in Example 4-3 was not so different from that measured in Comparative example 4-1. This is presumably because of the strong impacts of the resistance component having a time constant at higher frequencies.

It was confirmed that the capacities after 100 cycles and 200 cycles of the batteries prepared in Examples 4-1 and 4-2 were enhanced compared with Comparative example 4-1 and that the impedances of the batteries after 100 cycles were reduced with the concentration. It was also confirmed the advantageous effects were maintained even after 200 cycles.

The above results suggest that, the larger the amount of the compound represented by Formula (1) added to the nonaqueous electrolytic solution, the larger the effect to decompose the nonaqueous electrolytic solution and the higher the degree of reduction in the occurrence of the electrochemical side reaction of the decomposed product on the electrode. Furthermore, it is considered that the impedances kept at low levels after the cycles suggest that the stabilization effect of the compound represented by Formula (1) which had been adsorbed at an early stage increases with the concentration.

<Evaluation 5>

Electrolytic solutions 7 and 8 were prepared by adding 0.6% by mass of the compound 1 and 0.8% by mass of the compound 2, respectively, to the fundamental electrolytic solution 2. A comparative electrolytic solution 4 was prepared by adding 0.45% by mass of the comparative compound 1 to the fundamental electrolytic solution 2.

Batteries were prepared using the above electrolytic solutions and the fundamental electrolytic solution 2, that is, four electrolytic solutions in total. After the batteries had been evaluated in terms of initial characteristics, they were subjected to the high-temperature cycle endurance test. Then, the evaluation after the high-temperature cycle endurance test was made. Table 5 summarizes the evaluation results as Examples 5-1 and 5-2 and Comparative examples 5-1 and 5-2.

Initial capacity, initial impedance, and impedance after 100 cycles are shown in relative values with the initial charge-discharge efficiency, the initial capacity, the initial impedance, and the impedance after 100 cycles of Comparative example 5-1 being 100. Capacity after 100 cycles is shown in relative values with the initial capacity of Comparative example 5-1 being 100. Only as for impedance, the smaller the relative value, the higher the evaluation grade. As for the other items, the higher the relative value, the higher the evaluation grade.

TABLE 5

| | Electrolytic solution used | Initial | | After 100 cycles | |
|---|---|---|---|---|---|
| | | Capacity | Impedance | Capacity | Impedance |
| Example 5-1 | Electrolytic solution 7 | 101.6 | 87.3 | 87.5 | 97.1 |
| Example 5-2 | Electrolytic solution 8 | 100.5 | 83.4 | 86.2 | 93.8 |
| Comparative example 5-1 | Fundamental electrolytic solution 2 | 100.0 | 100.0 | 85.3 | 100.0 |
| Comparative example 5-2 | Comparative electrolytic solution 4 | 99.1 | 121.1 | 82.5 | 98.8 |

The initial capacities of the batteries prepared in Examples 5-1 and 5-2 were enhanced compared with Comparative example 5-1. In contrast, the initial capacity of the battery prepared in Comparative example 5-2 was reduced compared with Comparative example 5-1. The initial impedances of the batteries prepared in Examples 5-1 and 5-2 were significantly reduced compared with the Comparative example 5-1, while the initial impedance was increased in Comparative example 5-2.

The capacities of the batteries prepared in Examples 5-1 and 5-2 after 100 cycles were enhanced compared with Comparative example 5-1. The impedances of the batteries after 100 cycles were low compared with Comparative example 5-1. This confirms that an increase in resistance kept being limited even after 100 cycles. In contrast, the impedance of the battery prepared in Comparative example 5-2 after 100 cycles was lower than in Comparative example 5-1 but not as low as in Example 5-1 or 5-2. The capacity of the battery prepared in Comparative example 5-2 after 100 cycles was lower than in Comparative example 5-1. This confirms that, on the contrary, adverse effects were caused.

The above results suggest that the addition of the compound represented by Formula (1) to the fundamental electrolytic solution 2 also limited the decomposition of the nonaqueous electrolytic solution and the occurrence of the electrochemical side reaction of the decomposed product on the electrode. Furthermore, it is considered that the impedances kept at low levels suggest that the stabilization mechanisms of the compound represented by Formula (1) which had been adsorbed at an early stage may be maintained even when the composition of the fundamental electrolytic solution is changed.

electrolytic solutions in total. After the batteries had been evaluated in terms of initial characteristics, they were subjected to the high-temperature cycle endurance test. Then, the evaluation after the high-temperature cycle endurance test was made. Table 6 summarizes the evaluation results as Examples 6-1 to 6-6 and Comparative examples 6-1 to 6-3.

Initial charge-discharge efficiency, initial capacity, initial impedance, and impedance after 200 cycles are shown in relative values with the initial charge-discharge efficiency, the initial capacity, the initial impedance, and the impedance after 200 cycles of Comparative example 6-1 being 100. Capacity after 200 cycles is shown in relative values with the initial capacity of Comparative example 6-1 being 100. Only as for impedance, the smaller the relative value, the higher the evaluation grade. As for the other items, the higher the relative value, the higher the evaluation grade.

Although the electrolytic solutions 2 and 12 had the same composition, the relative values measured in the initial characteristic evaluation and the relative values of the characteristics measured after the high-temperature cycle endurance test differ from those measured in <Evaluation 2>. This is because of the lot-to-lot variations among the batteries prepared.

TABLE 6

| | Electrolytic solution used | Additives Compound represented by Formula (1) | Other additive | Initial charge-discharge efficiency | Initial Capacity | Initial Impedance | After 200 cycles Capacity | After 200 cycles Impedance |
|---|---|---|---|---|---|---|---|---|
| Example 6-1 | Electrolytic solution 9 | Compound 1 | — | 100.5 | 100.4 | 74.1 | 89.1 | 39.5 |
| Example 6-2 | Electrolytic solution 10 | Compound 1 | VC | 101.3 | 100.3 | 83.9 | 92.9 | 38.3 |
| Example 6-3 | Electrolytic solution 11 | Compound 1 | FEC | 101.3 | 100.2 | 82.0 | 92.0 | 50.1 |
| Example 6-4 | Electrolytic solution 12 | Compound 2 | — | 101.4 | 100.3 | 96.1 | 89.0 | 31.8 |
| Example 6-5 | Electrolytic solution 13 | Compound 2 | VC | 101.1 | 100.1 | 104.9 | 91.9 | 30.2 |
| Example 6-6 | Electrolytic solution 14 | Compound 2 | FEC | 101.3 | 100.0 | 87.2 | 90.9 | 38.6 |
| Comparative example 6-1 | Fundamental electrolytic solution | — | — | 100.0 | 100.0 | 100.0 | 86.8 | 100.0 |
| Comparative example 6-2 | Comparative electrolytic solution 5 | — | VC | 101.3 | 100.2 | 105.0 | 90.5 | 99.0 |
| Comparative example 6-3 | Comparative electrolytic solution 6 | — | FEC | 101.5 | 100.0 | 99.1 | 90.0 | 89.9 |

<Evaluation 6>

An electrolytic solution 9 was prepared by adding 0.6% by mass of the compound 1 to the fundamental electrolytic solution. To the electrolytic solution 9, 1.0% by mass of vinylene carbonate (VC) and 1.0% by mass of monofluoroethylene carbonate (FEC) were added to prepare electrolytic solutions 10 and 11, respectively. An electrolytic solution 12 was prepared by adding 0.8% by mass of the compound 2 to the fundamental electrolytic solution. To the electrolytic solution 12, 1.0% by mass of VC and 1.0% by mass of FEC were added to prepare electrolytic solutions 13 and 14, respectively. To the fundamental electrolytic solution, 1.0% by mass of VC and 1.0% by mass of FEC were added to prepare comparative electrolytic solutions 5 and 6, respectively.

Batteries were prepared using the above electrolytic solutions and the fundamental electrolytic solution, that is, nine The initial characteristics of the battery prepared in Example 6-1, where only the compound 1 was added to the fundamental electrolytic solution, and the characteristics of the battery measured after the high-temperature cycle endurance test were enhanced compared with Comparative example 6-1. In Examples 6-2 and 6-3, where VC and FEC were further used, the capacity of the battery after cycles was further enhanced at 200 cycles while an increase in impedance was limited. Similarly, the characteristics of the battery prepared in Example 6-4, where only the compound 2 was added to the fundamental electrolytic solution, were enhanced compared with Comparative example 6-1. In Examples 6-5 and 6-6, where VC and FEC were further used, the capacity of the battery after cycles was further enhanced at 200 cycles while an increase in impedance was limited.

In contrast, in Comparative examples 6-2 and 6-3 where only VC or FEC was added to the fundamental electrolytic solution, although the capacity of the battery after cycles was enhanced to a level equal to or higher than in Comparative example 6-1, they were not as high as the capacity of the battery after cycles measured in Examples 6-2,6-3, 6-5, and 6-6, where the compound 1 or 2 was used in combination with VC or FEC. Furthermore, the degree of limitation of an increase in impedance after cycles was low compared with those examples.

This suggests that using the compound represented by Formula (1) in combination with VC or FEC limits the decomposition of the nonaqueous electrolytic solution and the occurrence of the electrochemical side reaction of the decomposed product on the electrode with further effect compared with the case where the compound 1 or 2, VC, or FEC is used alone. Furthermore, it is considered that the impedances kept at low levels suggest that the compound represented by Formula (1) enters the coating film composed of VC or FEC and becomes adsorbed to the electrode to maintain the stabilization mechanisms on the surface of the electrode.

<Evaluation 7>

To the fundamental electrolytic solution 3, 0.6% by mass of the compound 1 and 0.8% by mass of the compound 2 were added to prepare electrolytic solutions 15 and 16, respectively. To the fundamental electrolytic solution 3, 0.45% by mass of the comparative compound 1 was added to prepare a comparative electrolytic solution 7.

Batteries were prepared using the above electrolytic solutions and the fundamental electrolytic solution 3, that is, four electrolytic solutions in total. After the batteries had been evaluated in terms of initial characteristics, they were subjected to the high-temperature cycle endurance test. Then, the evaluation after the high-temperature cycle endurance test was made. Table 7 summarizes the evaluation results as Examples 7-1 and 7-2 and Comparative examples 7-1 and 7-2.

Initial charge-discharge efficiency, initial capacity, initial impedance, and impedance after 200 cycles are shown in relative values with the initial charge-discharge efficiency, the initial capacity, the initial impedance, and the impedance after 200 cycles of Comparative example 7-1 being 100. Capacity after 200 cycles is shown in relative values with the initial capacity of Comparative example 7-1 being 100. Only as for impedance, the smaller the relative value, the higher the evaluation grade. As for the other items, the higher the relative value, the higher the evaluation grade.

TABLE 7

| | Electrolytic solution used | Initial charge-discharge efficiency | Initial Capacity | Initial Impedance | After 200 cycles Capacity | After 200 cycles Impedance |
|---|---|---|---|---|---|---|
| Example 7-1 | Electrolytic solution 15 | 104.5 | 102.5 | 46.9 | 83.0 | 54.4 |
| Example 7-2 | Electrolytic solution 16 | 105.5 | 101.9 | 53.5 | 83.5 | 47.5 |
| Comparative example 7-1 | Fundamental electrolytic solution 3 | 100.0 | 100.0 | 100.0 | 19.5 | 100.0 |
| Comparative example 7-2 | Comparative electrolytic solution 7 | 99.9 | 99.9 | 92.8 | 58.6 | 91.6 |

In Examples 7-1 and 7-2, the initial charge-discharge efficiency of the battery was markedly enhanced compared with Comparative example 7-1. In contrast, in Comparative example 7-2, an increase in initial charge-discharge efficiency was not confirmed. While the initial impedance of the battery was markedly reduced in Examples 7-1 and 7-2, the effect to reduce initial impedance was small in Comparative example 7-2.

In Examples 7-1 and 7-2, the capacity of the battery after 200 cycles was markedly increased compared with Comparative example 7-1. The impedance of the battery after 200 cycles was low compared with Comparative example 7-1. This confirms that an increase in resistance kept being limited even after 200 cycles. In contrast, in Comparative example 7-2, the capacity and impedance of the battery after 200 cycles were enhanced compared with Comparative example 7-1 but not as high as in Example 7-1 or 7-2.

The above results suggest that the addition of the compound represented by Formula (1) to the fundamental electrolytic solution 3, in which a part of the chain carbonate had been replaced with a chain carboxylate ester, also limited the decomposition of the nonaqueous electrolytic solution and the occurrence of the electrochemical side reaction of the decomposed product on the electrode. Furthermore, it is considered that the impedances kept at low levels suggest that the stabilization mechanisms of the compound represented by Formula (1) which had been adsorbed at an early stage may be maintained also when the electrolytic solution includes a chain carboxylate ester.

<Evaluation 8>

To the fundamental electrolytic solution 4, 0.6% by mass of the compound 1 was added to prepare an electrolytic solution 17. To the electrolytic solution 17, 1.0% by mass of VC was added to prepare an electrolytic solution 18.

Batteries were prepared using the above electrolytic solutions and the fundamental electrolytic solution 4, that is, three electrolytic solutions in total. After the batteries had been evaluated in terms of initial characteristics, they were subjected to the high-temperature cycle endurance test. Then, the evaluation after the high-temperature cycle endurance test was made. Table 8 summarizes the evaluation results as Examples 8-1 and 8-2 and Comparative example 8-1.

Initial charge-discharge efficiency, initial capacity, initial impedance, and impedance after 100 cycles are shown in relative values with the initial charge-discharge efficiency, the initial capacity, the initial impedance, and the impedance after 100 cycles of Comparative example 8-1 being 100. Capacity after 100 cycles is shown in relative values with the initial capacity of Comparative example 8-1 being 100. Only as for impedance, the smaller the relative value, the higher the evaluation grade. As for the other items, the higher the relative value, the higher the evaluation grade.

TABLE 8

|  | Electrolytic solution used | Additives Compound represented by Formula (1) | Other additive | Initial charge-discharge efficiency | Initial Capacity | Impedance | After 200 cycles Capacity | Impedance |
|---|---|---|---|---|---|---|---|---|
| Example 8-1 | Electrolytic solution 17 | Compound 1 | — | 104.2 | 100.6 | 74.6 | 92.4 | 63.3 |
| Example 8-2 | Electrolytic solution 18 | Compound 1 | VC | 105.4 | 100.5 | 80.7 | 95.8 | 41.1 |
| Comparative example 8-1 | Fundamental electrolytic solution 4 | — | — | 100.0 | 100.0 | 100.0 | 81.5 | 100.0 |

In Examples 8-1, the initial charge-discharge efficiency of the battery was markedly enhanced compared with Comparative example 8-1. In Examples 8-2, where VC was further added to the electrolytic solution, the initial charge-discharge efficiency was further increased. The initial impedance of the battery was markedly reduced in Examples 8-1 and 8-2.

In Example 8-1, the capacity of the battery after 100 cycles was markedly increased compared with Comparative example 8-1. In Examples 8-2, where VC was further added to the electrolytic solution, the capacity of the battery after cycles was further increased. In Examples 8-1 and 8-2, the impedance of the battery after 100 cycles was low compared with Comparative example 8-1. This confirms that an increase in resistance kept being limited even after 100 cycles.

The above results suggest that the addition of the compound represented by Formula (1) to the fundamental electrolytic solution 4 also limited the decomposition of the nonaqueous electrolytic solution and the occurrence of the electrochemical side reaction of the decomposed product on the electrode and that further adding VC to the electrolytic solution limited the decomposition of the nonaqueous electrolytic solution and the occurrence of the electrochemical side reaction of the decomposed product on the electrode with further effect. Accordingly, it is considered that the battery characteristics may be enhanced also when the electrolytic solution includes a chain carboxylate ester by using the compound represented by Formula (1) in combination with VC. Furthermore, it is considered that the impedances kept at low levels suggest that the stabilization mechanisms of the compound represented by Formula (1) which had been adsorbed at an early stage may be maintained and that the adsorption-stabilization mechanisms of the compound represented by Formula (1) may be maintained also when the electrolytic solution includes a chain carboxylate ester and the VC coating film is present.

<Evaluation 9>

To the fundamental electrolytic solution 5, 0.6% by mass of the compound 1 was added to prepare an electrolytic solution 19.

Batteries were prepared using the above electrolytic solution and the fundamental electrolytic solution 5, that is, two electrolytic solutions in total. After the batteries had been evaluated in terms of initial characteristics, they were subjected to the high-temperature cycle endurance test. Then, the evaluation after the high-temperature cycle endurance test was made. Table 9 summarizes the evaluation results as Example 9-1 and Comparative example 9-1.

Initial charge-discharge efficiency, initial capacity, initial impedance, and impedance after 100 cycles are shown in relative values with the initial charge-discharge efficiency, the initial capacity, the initial impedance, and the impedance after 100 cycles of Comparative example 9-1 being 100. Capacity after 100 cycles is shown in relative values with the initial capacity of Comparative example 9-1 being 100. Only as for impedance, the smaller the relative value, the higher the evaluation grade. As for the other items, the higher the relative value, the higher the evaluation grade.

TABLE 9

|  | Electrolytic solution used | Initial charge-discharge efficiency | Initial Capacity | Impedance | After 100 cycles Capacity | Impedance |
|---|---|---|---|---|---|---|
| Example 9-1 | Electrolytic solution 19 | 100.8 | 100.9 | 87.0 | 60.5 | 64.9 |
| Comparative example 9-1 | Fundamental electrolytic solution 5 | 100.0 | 100.0 | 100.0 | 55.8 | 100.0 |

In Example 9-1, the initial charge-discharge efficiency and initial capacity of the battery were enhanced compared with Comparative example 9-1. It was also confirmed that the initial impedance of the battery was markedly reduced in Example 9-1.

In Example 9-1, the capacity of the battery after 100 cycles was increased compared with Comparative example 9-1. The impedance of the battery after 100 cycles was low compared with Comparative example 9-1. This confirms that an increase in resistance kept being limited even after 100 cycles.

The above results suggest that the addition of the compound represented by Formula (1) to the fundamental electrolytic solution 5, which included LiFSI as a primary salt, also limited the decomposition of the nonaqueous electrolytic solution and the occurrence of the electrochemical side reaction of the decomposed product on the electrode. Furthermore, it is considered that the impedances kept at low levels suggest that the stabilization mechanisms of the compound represented by Formula (1) which had been adsorbed at an early stage may be maintained also when the electrolytic solution includes LiFSI as a primary salt.

In Examples and Comparative examples shown in Tables 1 to 9 above, although the endurance tests were conducted for relatively short periods of time as a model, significant differences were confirmed. Since nonaqueous electrolyte solution secondary batteries may be used for several years in reality, it is considered that the differences between the above results may be widened if the batteries are used over a prolonged period of time.

Although the present invention has been described in detail with reference to specific embodiments, it is apparent to a person skilled in the art that various alterations and modifications can be made therein without departing from the spirit and scope of the present invention.

The present application is based on a Japanese patent application (Japanese Patent Application No. 2018-060482) filed on Mar. 27, 2018, which is incorporated herein by reference in its entirety.

INDUSTRIAL APPLICABILITY

The nonaqueous electrolytic solution according to the present invention may improve the cycle capacity retention factor of an electrical storage device that includes the nonaqueous electrolytic solution and the input-output characteristics of the battery after cycles. Thus, the nonaqueous electrolytic solution according to the present invention is useful. Therefore, the nonaqueous electrolytic solution according to the present invention and the electrical storage device may be used in a variety of known applications. Specific examples of the applications include a notebook computer, a pen-input computer, a portable computer, an electronic book player, a cellular mobile phone, a portable facsimile, a portable copier, a portable printer, a headphone stereo, a video movie, a liquid crystal television, a handy cleaner, a portable CD, a minidisc, a transceiver, an electronic personal organizer, an electronic calculator, a memory card, a portable tape recorder, a radio, a backup power source, a motor, an automobile, a motorcycle, a motorized bicycle, a bicycle, lighting equipment, a toy, game instrument, a clock, an electric tool, a stroboscope, a camera, a backup power source for home use, a backup power source for office use, a load-levelling power source, and a nature-energy storing power source.

The invention claimed is:

1. A nonaqueous electrolytic solution comprising a nonaqueous solvent and a compound represented by Formula (1) below:

[Chem. 1]

[Chem. 1]

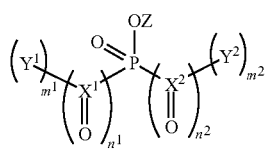

(1)

(wherein, in Formula (1), P and O are not abbreviations but symbols of element;

$X^1$ and $X^2$ each independently represent C, S, or P;

$n^1$ and $n^2$ each independently represent 1 when $X^1$ and $X^2$ represent C or P and 2 when $X^1$ and $X^2$ represent S;

$n^1$ represents 1 when $X^1$ represents C or P and 2 when $X^1$ represents S;

$n^2$ represents 1 when $X^2$ represents C or P and 2 when $X^2$ represents S;

$Y^1$ and $Y^2$ each independently represent a hydrocarbon group that may have a substituent or an —OW group (where W represents a hydrocarbon group that may have a substituent);

$m^1$ represents 1 when $X^1$ represents C or S and 2 when $X^1$ represents P, and $m^2$ represents 1 when $X^2$ represents C or S and 2 when $X^2$ represents P; and Z represents a hydrocarbon group that may have a substituent, an —SiV$_3$ group (where V represents a hydrocarbon group that may have a substituent), an organic onium, or a metal).

2. The nonaqueous electrolytic solution according to claim 1, wherein, in Formula (1), $X^1$ and $X^2$ represent C, $n^1$ and $n^2$ represent 1, and $m^1$ and $m^2$ represent 1.

3. The nonaqueous electrolytic solution according to claim 1, wherein, in Formula (1), $Y^1$ and $Y^2$ each independently represent a group selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms, or an —OW group where W is selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms.

4. The nonaqueous electrolytic solution according claim 1, wherein, in Formula (1), Z represents a group selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms, an —SiV$_3$ group where V is selected from the group consisting of an alkyl group having 1 to 6 carbon atoms the hydrogen atoms of which may be partially replaced with halogen atoms, an alkenyl group having 2 to 6 carbon atoms the hydrogen atoms of which may be partially replaced with halogen atoms, an alkynyl group having 2 to 6 carbon atoms the hydrogen atoms of which may be partially replaced with halogen atoms, an aryl group having 6 to 12 carbon atoms the hydrogen atoms of which may be partially replaced with halogen atoms, and an arylalkyl group having 7 to 13 carbon atoms the hydrogen atoms of which may be partially replaced with halogen atoms, hydrogen, or an alkali metal.

5. The nonaqueous electrolytic solution according to claim 1, wherein the content of the compound represented by Formula (1) is 0.001% by mass or more and 10% by mass or less.

6. The nonaqueous electrolytic solution according to claim 1, the nonaqueous electrolytic solution further comprising an electrolyte.

7. The nonaqueous electrolytic solution according to claim 1, the nonaqueous electrolytic solution further comprising at least one compound selected from the group consisting of a fluorine-containing cyclic carbonate, a sulfur-containing organic compound, a phosphorus-containing organic compound, an organic compound having a cyano group, an organic compound having an isocyanate group, a silicon-containing compound, an aromatic compound, a cyclic carbonate having an unsaturated carbon-carbon bond, a fluorine-free carboxylate ester, a cyclic compound having plural ether linkages, a compound having an isocyanuric acid skeleton, a monofluorophosphate salt, a difluorophosphate salt, a borate salt, an oxalate salt, and a fluorosulfonate salt.

8. The nonaqueous electrolytic solution according to claim 7, wherein the total content of the at least one compound selected from the group consisting of a fluorine-containing cyclic carbonate, a sulfur-containing organic compound, a phosphorus-containing organic compound, an organic compound having a cyano group, an organic compound having an isocyanate group, a silicon-containing compound, an aromatic compound, a cyclic carbonate having an unsaturated carbon-carbon bond, a fluorine-free carboxylate ester, a cyclic compound having plural ether linkages, a compound having an isocyanuric acid skeleton, a monofluorophosphate salt, a difluorophosphate salt, a borate salt, an oxalate salt, and a fluorosulfonate salt is 0.001% by mass or more and 50% by mass or less of the total amount of the nonaqueous electrolytic solution.

9. A nonaqueous electrolytic solution secondary battery, comprising the nonaqueous electrolytic solution according to claim 1.

10. An electrical storage device comprising negative and positive electrodes capable of occluding and releasing a lithium ion, and a nonaqueous electrolytic solution including an electrolyte and a nonaqueous solvent, wherein the nonaqueous electrolytic solution is the nonaqueous electrolytic solution according to claim 1.

11. The electrical storage device according to claim 10, the electrical storage device being a nonaqueous electrolytic solution secondary battery.

* * * * *